(12) United States Patent
Friedlander et al.

(10) Patent No.: US 11,392,717 B1
(45) Date of Patent: Jul. 19, 2022

(54) EVENT-CENTRIC MATCHING SYSTEM UTILIZING PRIVACY-PRESERVING DATA EXCHANGE

(71) Applicant: Yes, Inc., San Diego, CA (US)

(72) Inventors: Jonathan Friedlander, La Jolla, CA (US); Robert McArdle, San Diego, CA (US); Robert Wheat, La Jolla, CA (US); Evgenii Oborin, Khabarovsk Krai (RU)

(73) Assignee: YES, INC., San Diego, CA (US)

( * ) Notice: Subject to any disclaimer, the term of this patent is extended or adjusted under 35 U.S.C. 154(b) by 0 days.

(21) Appl. No.: 17/189,785

(22) Filed: Mar. 2, 2021

(51) Int. Cl.
  *H04L 29/06* (2006.01)
  *G06F 21/62* (2013.01)
  *G01S 19/01* (2010.01)
  *H04L 9/40* (2022.01)
  *H04W 12/02* (2009.01)

(52) U.S. Cl.
  CPC .......... *G06F 21/6245* (2013.01); *G01S 19/01* (2013.01); *H04L 63/0421* (2013.01); *H04W 12/02* (2013.01)

(58) Field of Classification Search
  CPC ............. G06F 21/6245; G06F 16/9535; H04L 63/101; H04L 9/088
  See application file for complete search history.

(56) References Cited

U.S. PATENT DOCUMENTS

| | | |
|---|---|---|
| 9,715,532 B1 | 7/2017 | Hall et al. |
| 9,733,811 B2 | 8/2017 | Rad et al. |
| 9,959,023 B2 | 5/2018 | Rad et al. |
| 10,149,267 B2 | 12/2018 | Burrell et al. |
| 10,203,854 B2 | 2/2019 | Rad et al. |
| 10,333,999 B2 | 6/2019 | Shamma |
| 10,380,158 B2 | 8/2019 | Diaz et al. |
| 10,523,622 B2 | 12/2019 | Barfield, Jr. et al. |
| 10,624,054 B2 | 4/2020 | Burrell et al. |
| 10,924,521 B2 | 2/2021 | Shamma |
| 2007/0162569 A1* | 7/2007 | Robinson .............. H04W 8/186 709/219 |
| 2007/0203776 A1* | 8/2007 | Austin ................... G06Q 10/00 705/321 |
| 2014/0074824 A1* | 3/2014 | Rad ........................ G06Q 10/10 707/722 |
| 2014/0358632 A1* | 12/2014 | Graff .................. G06Q 30/0224 705/7.29 |

* cited by examiner

*Primary Examiner* — Jason K Gee
(74) *Attorney, Agent, or Firm* — Wilson Sonsini Goodrich & Rosati

(57) ABSTRACT

Provided herein are platforms and methods for exchanging escrowed data between multiple users while preserving privacy and systems, methods, and applications for event-centric matching that enables secure communications between users, and event location sharing. Further, the systems, methods, and applications herein enable users to easily find relevant and local events.

16 Claims, 98 Drawing Sheets

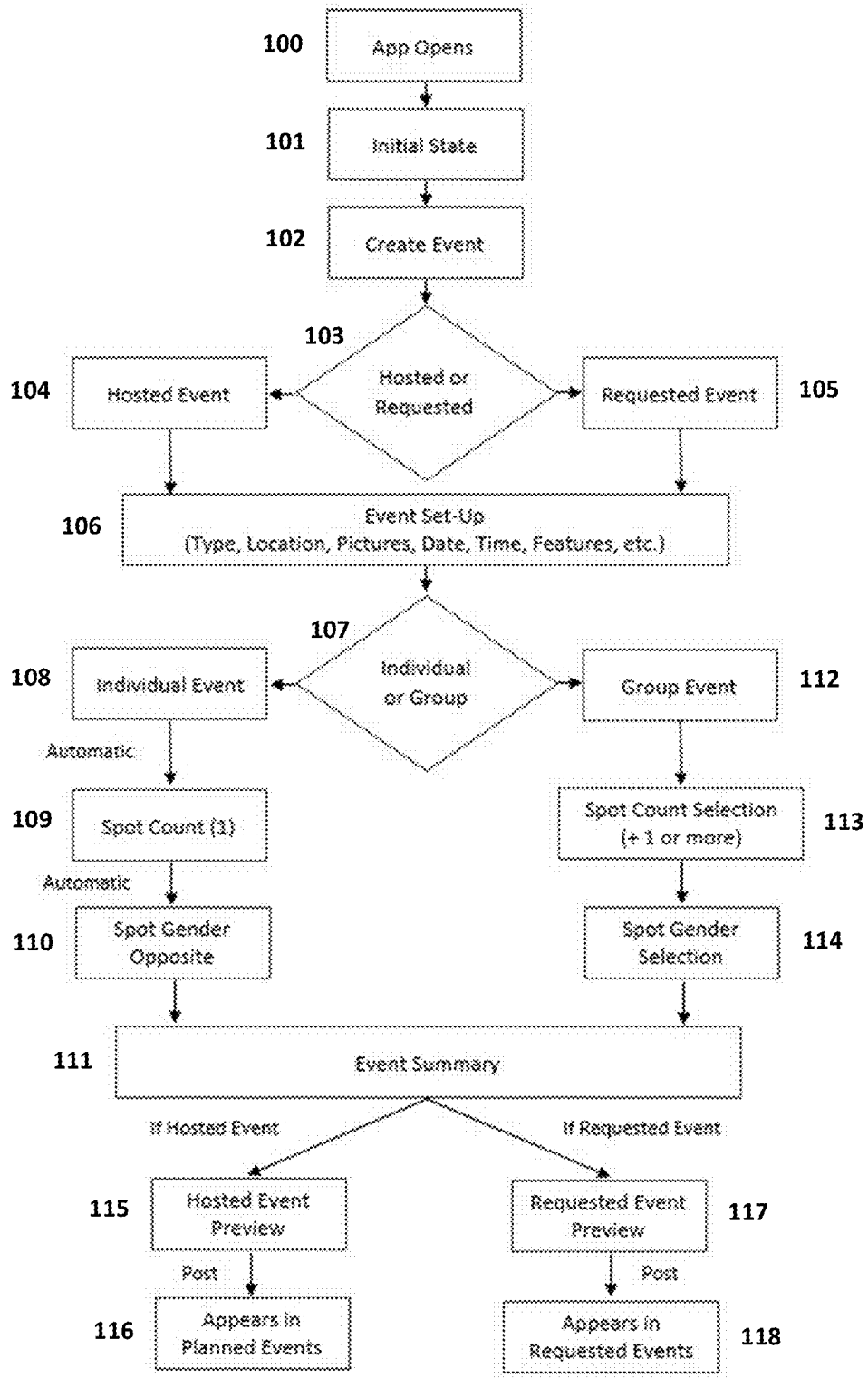

Fig. 16

Go out on the town

2 Spots requested

Bottle service | After Party

Include a message

By pressing "Confirm" button, I agree to provide the above requested features for this date Request: Me Confirm

Fig. 24

Night out on the town...

Me +4

Request confirmed
Host reviewing request, watch for notification

Text Invite Code To Friends

Friends must register with invite code to attend

Go out on the town

Hosting request confirmed
Request being reviewed, watch for notification

EVENT-CENTRIC MATCHING SYSTEM UTILIZING PRIVACY-PRESERVING DATA EXCHANGE

BACKGROUND

Increasingly, individuals meet and interact via websites, mobile applications, and electronic communications. However, these modes of interaction lack usability and efficacy and can introduce risks to privacy and security.

SUMMARY

Chief among the technical problems with existing platforms and applications is the fact that they are limited to profile-based matching. Users are matched based on their characteristics, "likes," and "dislikes." The result is interaction that fundamentally lacks direction and purpose. Provided herein are systems, methods, and applications for event-centric matching that enables secure communications between users, and event location sharing. The platforms, methods, and applications described herein allow users to offer or request event-based experiences. Users are matched on the basis of interest in these events. Therefore, such events provide a nucleus to initiate engagement and around which meaningful interaction can develop. Furthermore, the systems, methods, and applications herein enable users to easily find relevant and local events.

Another core technical problem with existing platforms and applications is that they necessarily and prematurely expose the contact information of users, such as email address, phone number, location, and the like, in order to allow engagement and interaction. Provided herein are platforms, methods, and applications for exchanging escrowed data between multiple users by use of a multi-stage "privacy handshake" procedure. The platforms, methods, and applications described herein allow users to meet and interact without exchanging sensitive contact information. The text chat and video chat features described herein allow users to communicate freely without any contact information risk, reducing any hesitancy to engage with others.

In one aspect, disclosed herein are platforms for exchanging escrowed data between multiple users while preserving privacy comprising: at least one mobile device comprising at least one mobile processor configured to provide a mobile application comprising: a touchscreen interface configured for a user to enter data; a software module accessing a GPS feature of the mobile device to determine a location; a software module transmitting the data and the location, to a remote escrow exchange server via a computer network, wherein at least a portion of the data is marked as public data and at least a portion of the data is marked as private data; and a software module providing a touchscreen interface for the user to generate requests to view private data of other users and to accept or reject requests by other users to view their private data; and at least one server comprising a secure storage device comprising at least one server processor configured to provide an escrow exchange server application comprising: a software module storing the public data and the private data in escrow at the secure storage device; a software module applying an algorithm to match the user to at least one other user based on the location, the stored public data, and the stored private data; and a software module conducting electronic communications with the at least one mobile device via the computer network to conduct a process comprising: pushing the user's public data to the at least one other user matched; receiving a request from the at least one other user to access the user's private data; notifying the user of the request to access their private data; and receiving a signal from the user accepting or rejecting the request to access their private data. In some embodiments, the mobile application further comprises a software module stripping the entered data of embedded information identifying the user. In some embodiments, the escrow exchange server application further comprises a software module pushing via the computer network, if the user accepts the request to access their private data, an electronic transmission of the user's private data to the at least one other user. In further embodiments, one or more features of the platform are restricted unless and until the user accepts the request to access their private data. In still further embodiments, the one or more features of the platform comprise messaging or data exchange between the user and the at least one other user matched. In various embodiments, the messaging comprises text messaging, audio messaging, video messaging, image exchange, document exchange, location exchange, or a combination thereof. In particular embodiments, the one or more features of the platform comprise the location.

In another aspect, disclosed herein are methods for exchanging escrowed data between users while preserving privacy comprising: receiving, at a remote escrow exchange server via a computer network, data entered by a user via a touchscreen interface of a mobile device and a location determined by accessing a GPS feature of the mobile device; marking, by the remote escrow exchange server, at least a portion of the data as public data and marking at least a portion of the data as private data; storing, by the remote escrow exchange server, the public data and the private data in escrow at a secure storage device; applying, by the remote escrow exchange server, an algorithm to match the user to at least one other user based on the location, the stored public data, and the stored private data; and conducting, by the remote escrow exchange server, electronic communications via the computer network to conduct a process comprising: pushing the user's public data to the at least one other user matched; receiving a request from the at least one other user to access the user's private data; notifying the user of the request to access their private data; and receiving a signal from the user accepting or rejecting the request to access their private data. In some embodiments, the method further comprises stripping, by the remote escrow exchange server, the entered data of embedded information identifying the user. In some embodiments, the method further comprises pushing, by the remote escrow exchange server via the computer network, if the user accepts the request to access their private data, an electronic transmission of the user's private data to the at least one other user. In further embodiments, one or more features of the mobile device are restricted unless and until the user accepts the request to access their private data. In still further embodiments, the one or more features comprise messaging or data exchange between the user and the at least one other user matched. In various embodiments, the messaging comprises text messaging, audio messaging, video messaging, image exchange, document exchange, location exchange, or a combination thereof. In particular embodiments, the one or more features of the mobile device comprise the location.

In another aspect, disclosed herein are computer-implemented systems comprising: at least one processor, a memory, and instructions executable by the at least one processor to create an event-centric matching application comprising: a software module allowing a user to configure a hosted event, the hosted event comprising: a type selected from the group consisting of individual and group, a location, and one or more attendee characteristics; a software module applying a matching algorithm to identify eligible attendees for the configured hosted event based on at least the location and the one or more attendee characteristics and distribute the hosted event to the eligible attendees; a software module allowing the user to configure a requested event, the requested event comprising: a type selected from the group consisting of individual and group, a location and one or more host characteristics; a software module applying a matching algorithm to identify eligible hosts for the configured requested event based on at least the location and the one or more host characteristics and distribute the requested event to the eligible hosts; and a software module generating an event feed for the user comprising configured hosted events and configured requested events. In some embodiments, the software module generating the event feed allows the user to view hosted events configured by other users and apply to be an attendee. In further embodiments, if a hosted event comprises a group type, the software module generating the event feed allows the user to apply to be an attendee, identify other attendees, and configure the application to be all-or-none. In further embodiments, the software module generating the event feed notifies the user when another user has applied to be an attendee for a hosted event they have configured. In further embodiments, the software module generating the event feed allows the user to view the hosted events they have configured and accept or reject applicant attendees. In some embodiments, the software module generating the event feed allows the user to view requested events configured by other users and apply to be a host. In further embodiments, the software module generating the event feed notifies the user when another user has applied to be a host for a requested event they have configured. In further embodiments, the software module generating the event feed allows the user to view the requested events they have configured and accept or reject applicant hosts. In some embodiments, the application further comprises a software module providing an anonymous communication system, wherein the anonymous communication system provides a first mode of communication between one or more hosts and one or more attendees accepted for an event. In further embodiments, the first mode of communication is text chat. In some embodiments, the anonymous communication system provides a second mode of communication between one or more hosts and one or more attendees accepted for an event after the first mode of communication is utilized. In further embodiments, the second mode of communication is video chat. In some embodiments, the anonymous communication system provides text and/or video communications without revealing the name, phone number, or email address of users. In some embodiments, the hosted event further comprises one or more of: an activity type, a date, and a time. In further embodiments, the software module allowing the user to configure the hosted event automatically identifies and retrieves one or more images relevant to the location and/or the activity type. In particular embodiments, no image curation is required by the user. In some embodiments, the software module allowing the user to configure the hosted event applies standardized image formatting to the one or more retrieved images, and wherein the formatting comprises one or more of: size, resolution, cropping, zoom, file type, and compression. In some embodiments, the software module allowing the user to configure the hosted event automatically identifies and retrieves one or more URIs relevant to the location and/or the activity type. In particular embodiments, no URI curation is required by the user. In some embodiments, if the hosted event comprises a group type, the hosted event further comprises a number of attendees. In some embodiments, the attendee characteristics comprise one or more of: gender, minimum age, maximum age, and location distance. In some embodiments, the requested event further comprises one or more of: an activity type, one or more images, a date, and a time. In some embodiments, the software module allowing the user to configure the requested event automatically identifies and retrieves images relevant to the location and/or the activity type. In particular embodiments, no image curation is required by the user. In some embodiments, the software module allowing the user to configure the requested event applies standardized image formatting to the one or more retrieved images, and wherein the formatting comprises one or more of: size, resolution, cropping, zoom, file type, and compression. In some embodiments, the software module allowing the user to configure the requested event automatically identifies and retrieves one or more URIs relevant to the location and/or the activity type. In particular embodiments, no URI curation is required by the user. In some embodiments, if the requested event comprises a group type, the hosted event further comprises a number of attendees. In some embodiments, the host characteristics comprise one or more of: gender, minimum age, maximum age, and location distance. In some embodiments, the software module applying a matching algorithm to identify eligible attendees and/or the software module applying a matching algorithm to identify eligible hosts acquires the location from a GPS feature of a mobile device. In some embodiments, the application further comprises a software module allowing the user to review completed events. In further embodiments, the reviews are non-public. In some embodiments, the application further comprises a software module allowing the user to create a profile. In further embodiments, the application further comprises a software module providing connectivity to a database of user profiles comprising user characteristics.

In another aspect, disclosed herein are methods for event-centric matching comprising: providing a touchscreen interface allowing a user to configure a hosted event, the hosted event comprising: a type selected from the group consisting of individual and group, a location, and one or more attendee characteristics; applying a matching algorithm to identify eligible attendees for the configured hosted event based on at least the location and the one or more attendee characteristics and distribute the hosted event to the eligible attendees; providing a touchscreen interface allowing the user to configure a requested event, the requested event comprising: a type selected from the group consisting of individual and group, a location and one or more host characteristics; applying a matching algorithm to identify eligible hosts for the configured requested event based on at least the location and the one or more host characteristics and distribute the requested event to the eligible hosts; and generating an event feed for the user comprising configured hosted events and configured requested events. In some embodiments, the event feed allows the user to view hosted events configured by other users and apply to be an attendee. In further embodiments, if a hosted event comprises a group type, the event feed allows the user to apply to be an attendee, identify other attendees, and configure the application to be all-or-none. In further embodiments, the event feed notifies the user when another user has applied to be an attendee for a hosted event they have configured. In further embodiments, the event feed allows the user to view the hosted events they have configured and accept or reject applicant attendees. In some embodiments, the event feed allows the user to view requested events configured by other users and apply to be a host. In further embodiments, the event feed notifies the user when another user has applied to be a host for a requested event they have configured. In further embodiments, the event feed allows the user to view the requested events they have configured and accept or reject applicant hosts. In some embodiments, the method further comprises providing an anonymous communication system, wherein the anonymous communication system provides a first mode of communication between one or more hosts and one or more attendees accepted for an event. In further embodiments, the first mode of communication is text chat. In further embodiments, the anonymous communication system provides a second mode of communication between one or more hosts and one or more attendees accepted for an event after the first mode of communication is utilized. In still further embodiments, the second mode of communication is video chat. In some embodiments, the anonymous communication system provides text and/or video communications without revealing the name, phone number, or email address of users. In some embodiments, the hosted event further comprises one or more of: an activity type, a date, and a time. In further embodiments, the method further comprises automatically identifying and retrieving one or more images relevant to the location and/or the activity type associated with the hosted event. In particular embodiments, no image curation is required by the user. In some embodiments, the method further comprises applying standardized image formatting to the one or more retrieved images, and wherein the formatting comprises one or more of: size, resolution, cropping, zoom, file type, and compression. In some embodiments, the method further comprises automatically identifying and retrieving one or more URIs relevant to the location and/or the activity type associated with the hosted event. In particular embodiments, no URI curation is required by the user. In some embodiments, if the hosted event comprises a group type, the hosted event further comprises a number of attendees. In some embodiments, the attendee characteristics comprise one or more of: gender, minimum age, maximum age, and location distance. In some embodiments, the requested event further comprises one or more of: an activity type, one or more images, a date, and a time. In further embodiments, the method further comprises automatically identifying and retrieving images relevant to the location and/or the activity type associated with the requested event. In particular embodiments, no image curation is required by the user. In some embodiments, the method further comprises applying standardized image formatting to the one or more retrieved images, and wherein the formatting comprises one or more of: size, resolution, cropping, zoom, file type, and compression. In some embodiments, the method further comprises automatically identifying and retrieving one or more URIs relevant to the location and/or the activity type associated with the requested event. In particular embodiments, no URI curation is required by the user. In some embodiments, if the requested event comprises a group type, the hosted event further comprises a number of attendees. In some embodiments, the host characteristics comprise one or more of: gender, minimum age, maximum age, and location distance. In some embodiments, applying the matching algorithm to identify eligible attendees and/or applying the matching algorithm to identify eligible hosts comprise acquiring the location from a GPS feature of a mobile device. In some embodiments, the method further comprises providing a touchscreen interface allowing the user to review completed events. In further embodiments, the reviews are non-public. In some embodiments, the method further comprises providing a touchscreen interface allowing the user to create a profile. In further embodiments, the method further comprises providing connectivity to a database of user profiles comprising user characteristics.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 1 shows a non-limiting example of a process flow diagram; in this case, a process flow diagram illustrating a process for creating an optionally hosted or requested event;

FIGS. 11-21 show non-limiting exemplary GUIs; in this case, GUIs including features for applying to a hosted event as an individual (and optionally being accepted);

FIGS. 22-25 show non-limiting exemplary GUIs; in this case, GUIs including features for applying to a hosted event as a group;

FIGS. 36-48 show non-limiting exemplary GUIs; in this case, GUIs including features for configuring a hosted event;

FIGS. 65-72 show non-limiting exemplary GUIs; in this case, GUIs including features for managing applicants to an event;

DETAILED DESCRIPTION

Event-Centric Matching

Figure 2A:
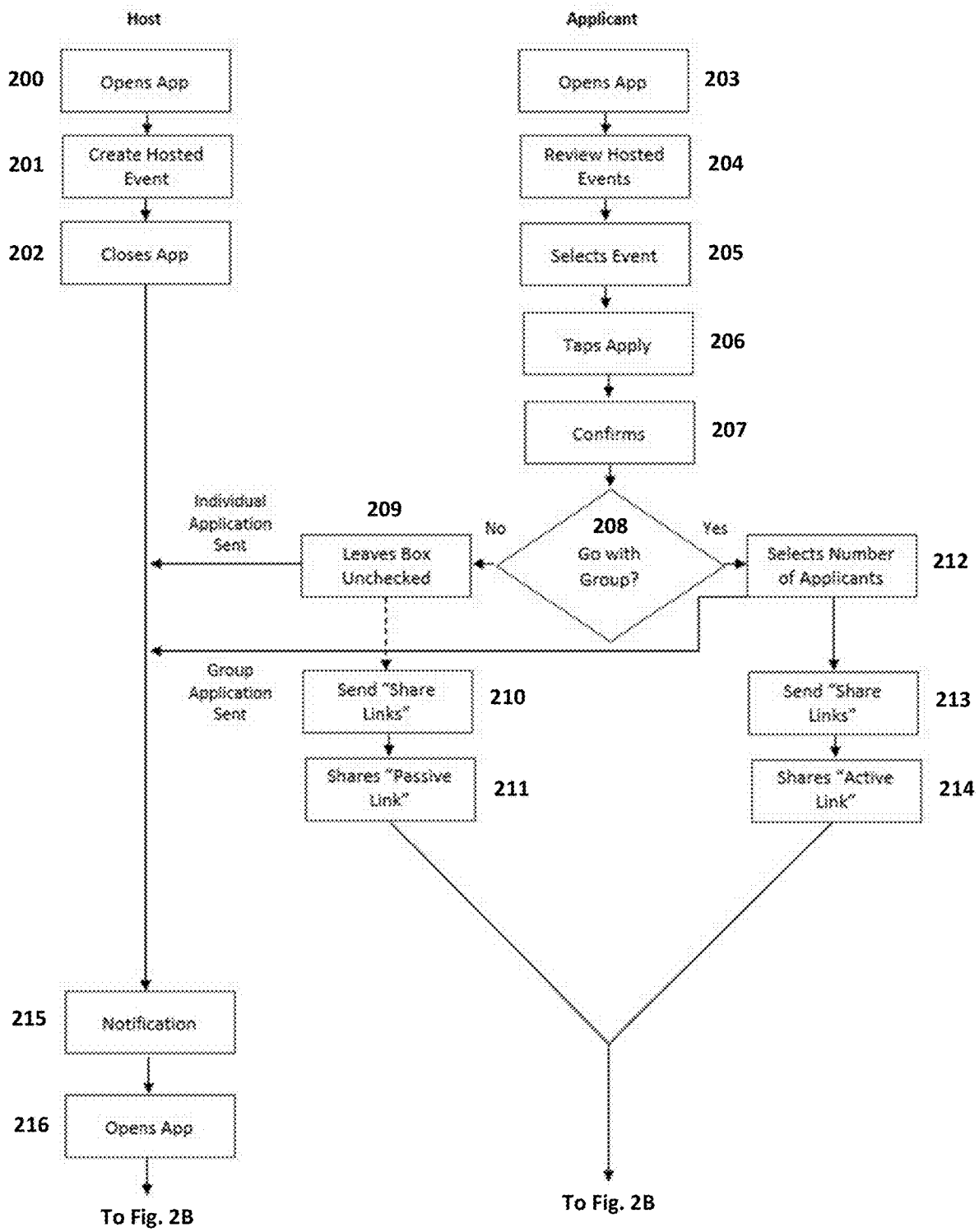
FIGS. 2A and 2B show a non-limiting example of a process flow diagram; in this case, a process flow diagram illustrating a process for negotiating attendance of a hosted event.

Provided herein are systems, methods, and applications for event-centric matching that enables secure communications between users, and event location sharing. The platforms, methods, and applications described herein allow users to offer or request event-based experiences. Users are matched on the basis of interest in these events. Therefore, such events provide a nucleus to initiate engagement and around which meaningful interaction can develop. Furthermore, the systems, methods, and applications herein enable users to easily find relevant and local events.

Described herein, in certain embodiments, are computer-implemented systems comprising: at least one processor, a memory, and instructions executable by the at least one processor to create an event-centric matching application. In some embodiments, comprising: a software module allowing a user to configure a hosted event, the hosted event comprising: a type selected from the group consisting of individual and group, a location, and one or more attendee characteristics; a software module applying a matching algorithm to identify eligible attendees for the configured hosted event based on at least the location and the one or more attendee characteristics and distribute the hosted event to the eligible attendees; a software module allowing the user to configure a requested event, the requested event comprising: a type selected from the group consisting of individual and group, a location and one or more host characteristics; a software module applying a matching algorithm to identify eligible hosts for the configured requested event based on at least the location and the one or more host characteristics and distribute the requested event to the eligible hosts; and a software module generating an event feed for the user comprising configured hosted events and configured requested events. In some embodiments, the software module generating the event feed allows the user to view hosted events configured by other users and apply to be an attendee. In further embodiments, if a hosted event comprises a group type, the software module generating the event feed allows the user to apply to be an attendee, identify other attendees, and configure the application to be all-or-none. In further embodiments, the software module generating the event feed notifies the user when another user has applied to be an attendee for a hosted event they have configured. In further embodiments, the software module generating the event feed allows the user to view the hosted events they have configured and accept or reject applicant attendees. In some embodiments, the software module generating the event feed allows the user to view requested events configured by other users and apply to be a host. In further embodiments, the software module generating the event feed notifies the user when another user has applied to be a host for a requested event they have configured. In further embodiments, the software module generating the event feed allows the user to view the requested events they have configured and accept or reject applicant hosts. In some embodiments, the application further comprises a software module providing an anonymous communication system, wherein the anonymous communication system provides a first mode of communication between one or more hosts and one or more attendees accepted for an event. In further embodiments, the first mode of communication is text chat. In some embodiments, the anonymous communication system provides a second mode of communication between one or more hosts and one or more attendees accepted for an event after the first mode of communication is utilized. In further embodiments, the second mode of communication is video chat. In some embodiments, the anonymous communication system provides text and/or video communications without revealing the name, phone number, or email address of users. In some embodiments, the hosted event further comprises one or more of: an activity type, a date, and a time. In further embodiments, the software module allowing the user to configure the hosted event automatically identifies and retrieves one or more images relevant to the location and/or the activity type. In particular embodiments, no image curation is required by the user. In some embodiments, the software module allowing the user to configure the hosted event applies standardized image formatting to the one or more retrieved images, and wherein the formatting comprises one or more of: size, resolution, cropping, zoom, file type, and compression. In some embodiments, the software module allowing the user to configure the hosted event automatically identifies and retrieves one or more URIs relevant to the location and/or the activity type. In particular embodiments, no URI curation is required by the user. In some embodiments, if the hosted event comprises a group type, the hosted event further comprises a number of attendees. In some embodiments, the attendee characteristics comprise one or more of: gender, minimum age, maximum age, and location distance. In some embodiments, the requested event further comprises one or more of: an activity type, one or more images, a date, and a time. In some embodiments, the software module allowing the user to configure the requested event automatically identifies and retrieves images relevant to the location and/or the activity type. In particular embodiments, no image curation is required by the user. In some embodiments, the software module allowing the user to configure the requested event applies standardized image formatting to the one or more retrieved images, and wherein the formatting comprises one or more of: size, resolution, cropping, zoom, file type, and compression. In some embodiments, the software module allowing the user to configure the requested event automatically identifies and retrieves one or more URIs relevant to the location and/or the activity type. In particular embodiments, no URI curation is required by the user. In some embodiments, if the requested event comprises a group type, the hosted event further comprises a number of attendees. In some embodiments, the host characteristics comprise one or more of: gender, minimum age, maximum age, and location distance. In some embodiments, the software module applying a matching algorithm to identify eligible attendees and/or the software module applying a matching algorithm to identify eligible hosts acquires the location from a GPS feature of a mobile device. In some embodiments, the application further comprises a software module allowing the user to review completed events. In further embodiments, the reviews are non-public. In some embodiments, the application further comprises a software module allowing the user to create a profile. In further embodiments, the application further comprises a software module providing connectivity to a database of user profiles comprising user characteristics.

Also described herein, in certain embodiments, are methods for event-centric matching comprising: providing a touchscreen interface allowing a user to configure a hosted event, the hosted event comprising: a type selected from the group consisting of individual and group, a location, and one or more attendee characteristics; applying a matching algorithm to identify eligible attendees for the configured hosted event based on at least the location and the one or more attendee characteristics and distribute the hosted event to the eligible attendees; providing a touchscreen interface allowing the user to configure a requested event, the requested event comprising: a type selected from the group consisting of individual and group, a location and one or more host characteristics; applying a matching algorithm to identify eligible hosts for the configured requested event based on at least the location and the one or more host characteristics and distribute the requested event to the eligible hosts; and generating an event feed for the user comprising configured hosted events and configured requested events. In some embodiments, the event feed allows the user to view hosted events configured by other users and apply to be an attendee. In further embodiments, if a hosted event comprises a group type, the event feed allows the user to apply to be an attendee, identify other attendees, and configure the application to be all-or-none. In further embodiments, the event feed notifies the user when another user has applied to be an attendee for a hosted event they have configured. In further embodiments, the event feed allows the user to view the hosted events they have configured and accept or reject applicant attendees. In some embodiments, the event feed allows the user to view requested events configured by other users and apply to be a host. In further embodiments, the event feed notifies the user when another user has applied to be a host for a requested event they have configured. In further embodiments, the event feed allows the user to view the requested events they have configured and accept or reject applicant hosts. In some embodiments, the method further comprises providing an anonymous communication system, wherein the anonymous communication system provides a first mode of communication between one or more hosts and one or more attendees accepted for an event. In further embodiments, the first mode of communication is text chat. In further embodiments, the anonymous communication system provides a second mode of communication between one or more hosts and one or more attendees accepted for an event after the first mode of communication is utilized. In still further embodiments, the second mode of communication is video chat. In some embodiments, the anonymous communication system provides text and/or video communications without revealing the name, phone number, or email address of users. In some embodiments, the hosted event further comprises one or more of: an activity type, a date, and a time. In further embodiments, the method further comprises automatically identifying and retrieving one or more images relevant to the location and/or the activity type associated with the hosted event. In particular embodiments, no image curation is required by the user. In some embodiments, the method further comprises applying standardized image formatting to the one or more retrieved images, and wherein the formatting comprises one or more of: size, resolution, cropping, zoom, file type, and compression. In some embodiments, the method further comprises automatically identifying and retrieving one or more URIs relevant to the location and/or the activity type associated with the hosted event. In particular embodiments, no URI curation is required by the user. In some embodiments, if the hosted event comprises a group type, the hosted event further comprises a number of attendees. In some embodiments, the attendee characteristics comprise one or more of: gender, minimum age, maximum age, and location distance. In some embodiments, the requested event further comprises one or more of: an activity type, one or more images, a date, and a time. In further embodiments, the method further comprises automatically identifying and retrieving images relevant to the location and/or the activity type associated with the requested event. In particular embodiments, no image curation is required by the user. In some embodiments, the method further comprises applying standardized image formatting to the one or more retrieved images, and wherein the formatting comprises one or more of: size, resolution, cropping, zoom, file type, and compression. In some embodiments, the method further comprises automatically identifying and retrieving one or more URIs relevant to the location and/or the activity type associated with the requested event. In particular embodiments, no URI curation is required by the user. In some embodiments, if the requested event comprises a group type, the hosted event further comprises a number of attendees. In some embodiments, the host characteristics comprise one or more of: gender, minimum age, maximum age, and location distance. In some embodiments, applying the matching algorithm to identify eligible attendees and/or applying the matching algorithm to identify eligible hosts comprise acquiring the location from a GPS feature of a mobile device. In some embodiments, the method further comprises providing a touchscreen interface allowing the user to review completed events. In further embodiments, the reviews are non-public. In some embodiments, the method further comprises providing a touchscreen interface allowing the user to create a profile. In further embodiments, the method further comprises providing connectivity to a database of user profiles comprising user characteristics.

FIG. 1 shows a non-limiting example of a process flow diagram illustrating a process for creating an optionally hosted or requested event. As shown, in some embodiments, once the application opens 100 and enters an initial state 101 an event can be created 102. In some embodiments, when prompted, a user can select a hosted event 104, or a requested event 105, whereafter the user enters event setup details 106 (i.e., type, location, pictures, date, time, features). In some embodiments, the user is prompted to input whether the event is an individual or group event 107. If an individual event 108 is selected a spot count of 1 109 and a spot gender opposite 110 are automatically generated. Thereafter, in some embodiments, an event summary 111 is displayed and a hosted event preview 115 is posted in the planned events 116. In some embodiments, if a group event 112 is selected a spot count selection 113 of one or more spots and a gender selection 114 are requested. In some embodiments, the event summary 111 is then shown, a requested event preview 117 is generated and the event is posted to requested events 118.

Figure 2B:
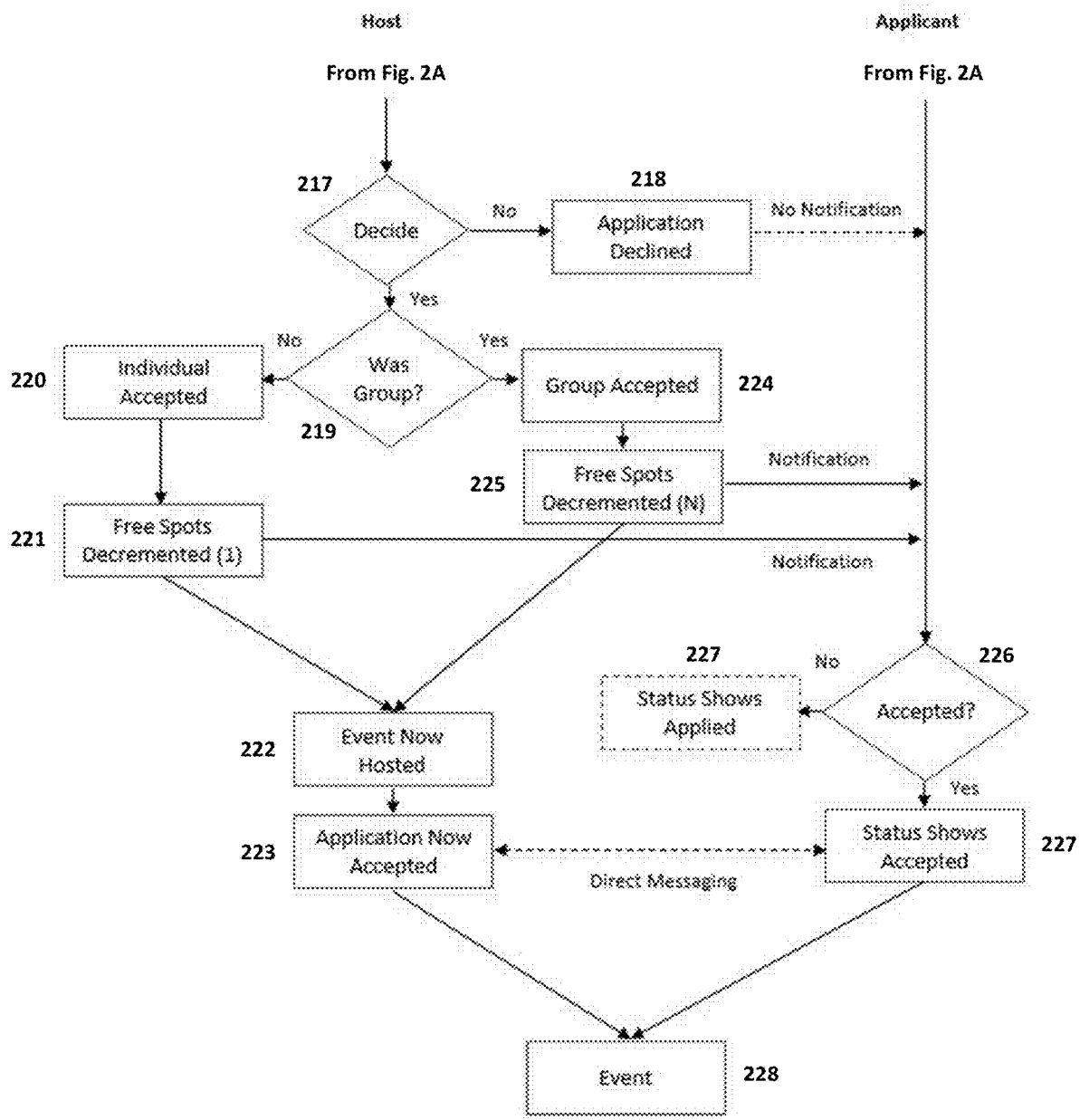

FIGS. 2A and 2B show a non-limiting example of a process flow diagram illustrating a process for negotiating attendance of a hosted event. As shown in FIG. 2A, in some embodiments, a host can open the application 200, create a hosted event 201, and close the application 202. Upon receiving a notification 215, the host can open the application 216 to respond to the notification. Further as shown, in some embodiments, an applicant opens the application 203, reviews hosted events 204, selects one or more of the events 205, taps apply 206 to the one or more events, and confirms 207 the application. Thereafter, in some embodiments, the applicant is prompted to enter whether or not they will be attending with a group 208, whereas a "no" selection leaves boxes unchecked 209, wherein the application is sent to the host through the notification 215, whereafter a "share links" 210 and share "passive link" 211 options are provided to the host. In some embodiments, a "yes" selection to the attending with a group prompt 208 allows the applicant to input a number of applicants 212 and a group application is sent to the host via the notification 215 whereafter a "share links" 213 and share "passive link" 214 options are provided to the host. In this example, when applying to a hosted event, and the applicant includes a group, the applicant optionally selects a features making their application "all-or-none," meaning that the entire group must be accepted or rejected as a whole.

Continuing to FIG. 2B, once the host opens the app 216 to view the notification 215, the host is prompted to decide 217 whether to accept the individual application or the group application. If the host selects "no," the application is declined 218 and no notification is sent to the applicant. If the hosts selects "yes," a determination is made as to whether the application is an individual application or a group application, whereafter the individual is accepted 220, or the group is accepted 224, accordingly. In some embodiments, the number of free spots is decremented by 1 221 if the application is an individual application and the host is notified. In some embodiments, the number of free spots is decremented by the number of attendees (N) in the group 225 and the host is notified. Thereafter, in some embodiments, the event becomes hosted 222 and the event application is accepted 223. Further, in some embodiments, an applied status is displayed 227 if the applicant is not accepted an accepted status is displayed 227 to the applicant if they have been accepted. Thereafter, in some embodiments, direct messaging is enabled between the host and the applicant until the event 228 occurs.

Figure 3:
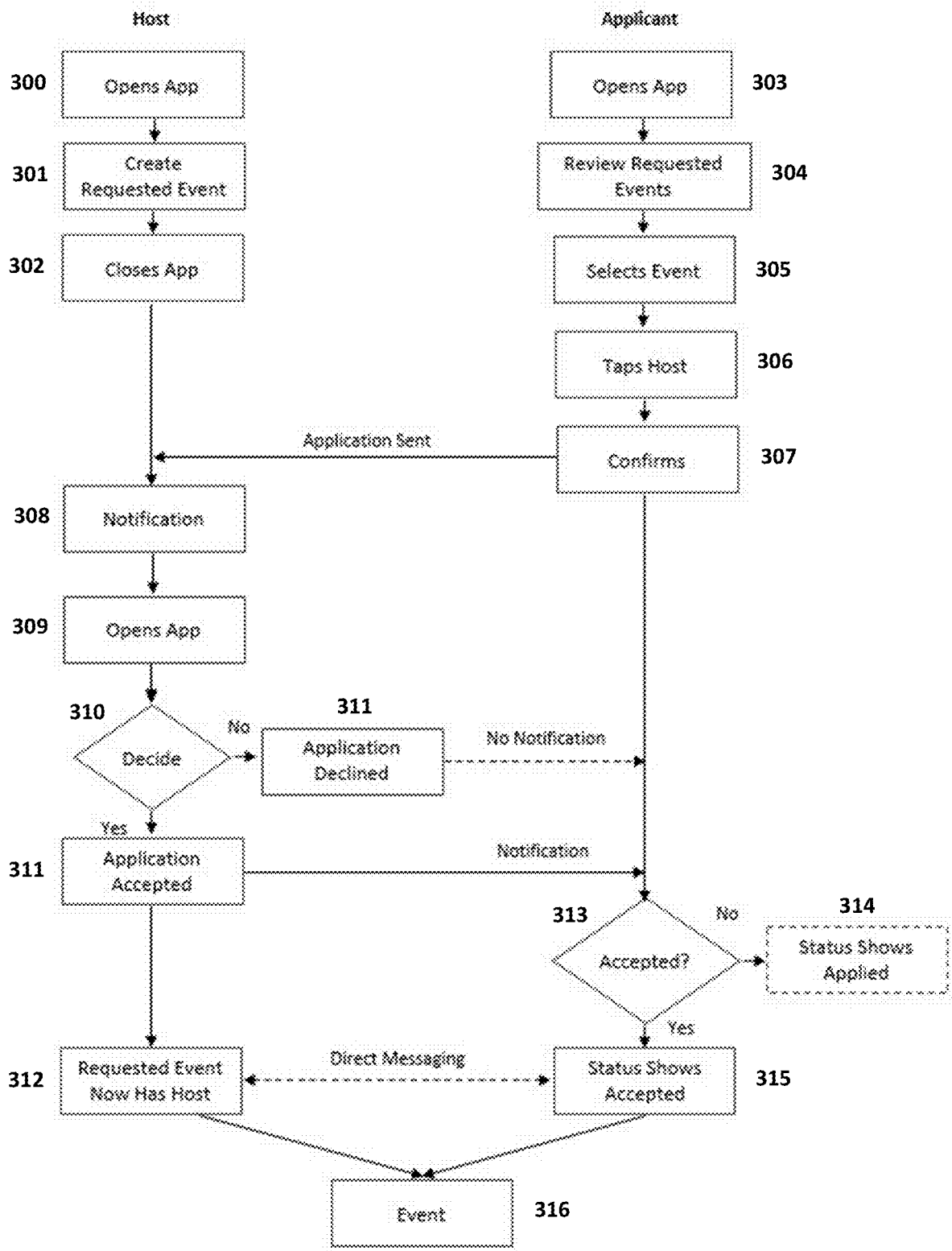
FIG. 3 shows a non-limiting example of a process flow diagram; in this case, a process flow diagram illustrating a process for negotiating hosting of a requested event.
Figure 4:
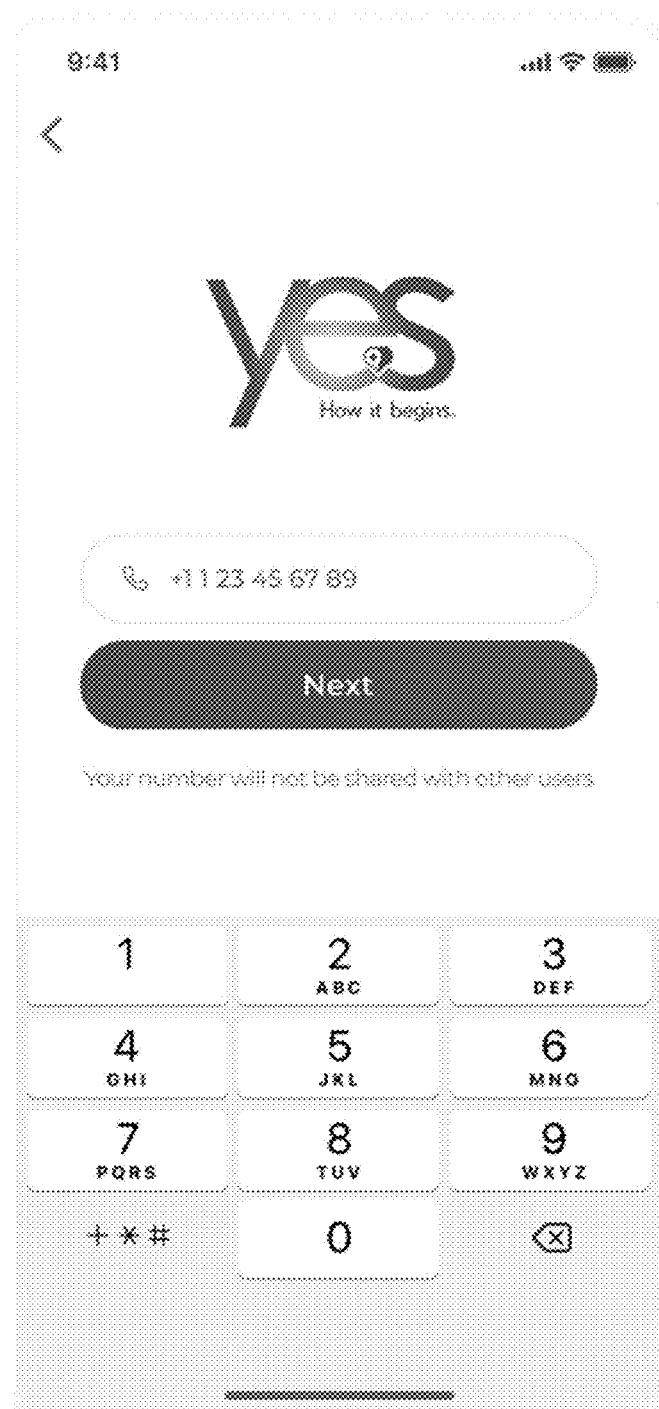
FIGS. 4-10 show non-limiting exemplary GUIs; in this case, GUIs including features for configuring a user profile.
Figure 5:
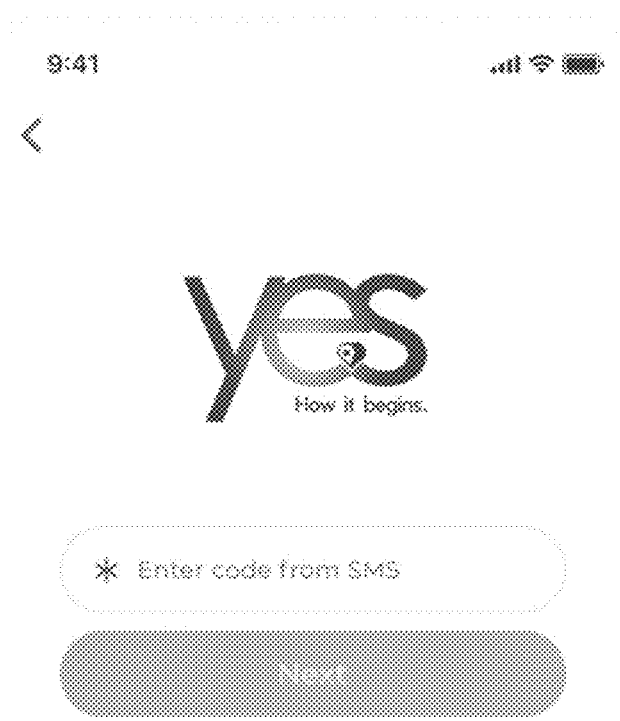
Figure 6:
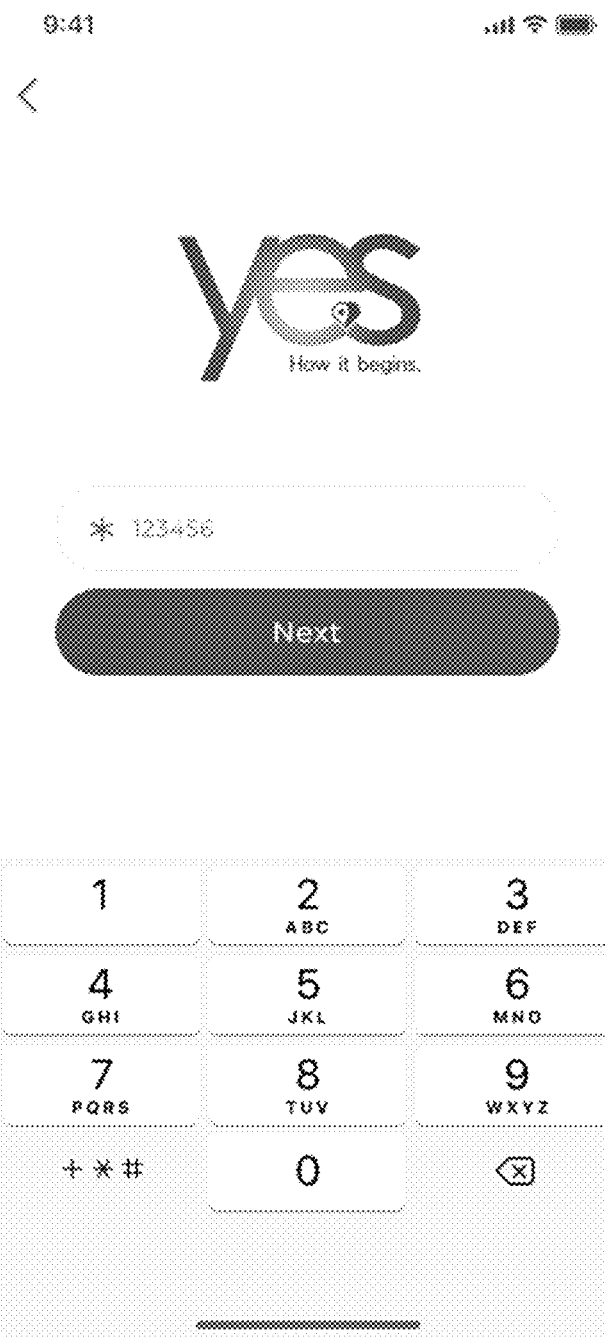

FIG. 3 shows a non-limiting example of a process flow diagram illustrating a process for negotiating hosting of a requested event. As shown, in some embodiments, a host opens the app 300, creates a requested event 301, and closes the app 302. Thereafter, in some embodiments, an applicant opens the app 303, reviews requested events 304, selects an event 305, taps host 306 and confirms 307 their decision to become the host. Thereafter, in some embodiments, the host receives a notification 308, opens the app 309 and decides 310 whether or not to accept the application. In some embodiments, if the application is denied 311, no notification is sent to the applicant. In some embodiments, if the application is accepted 311 a notification is sent to the applicant and a notification is displayed to the host that the requested event now has a host 312. In some embodiments, once the applicant receives the notification they can choose to accept or not accept the event 313. In some embodiments, if the event is not accepted the application status is shown as applied 314, alternatively if the event is accepted, the status is displayed as accepted 315, whereafter the host and the applicant can message each other until the event 316.

User Profiles

Figure 7:
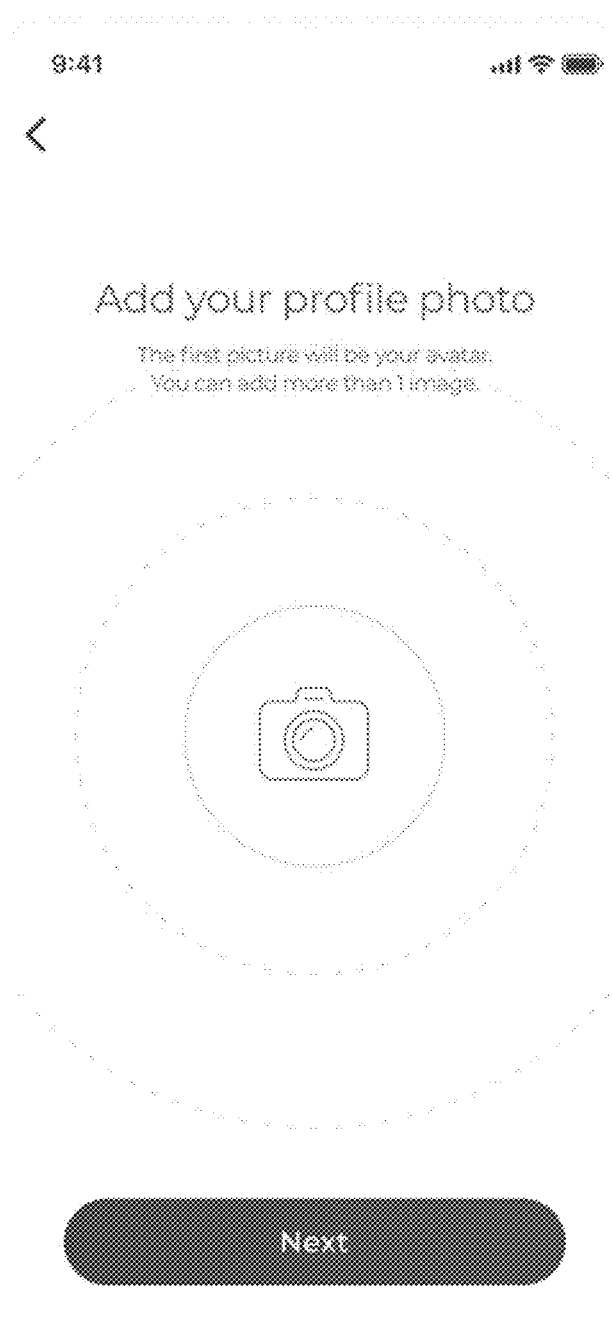
Figure 8:
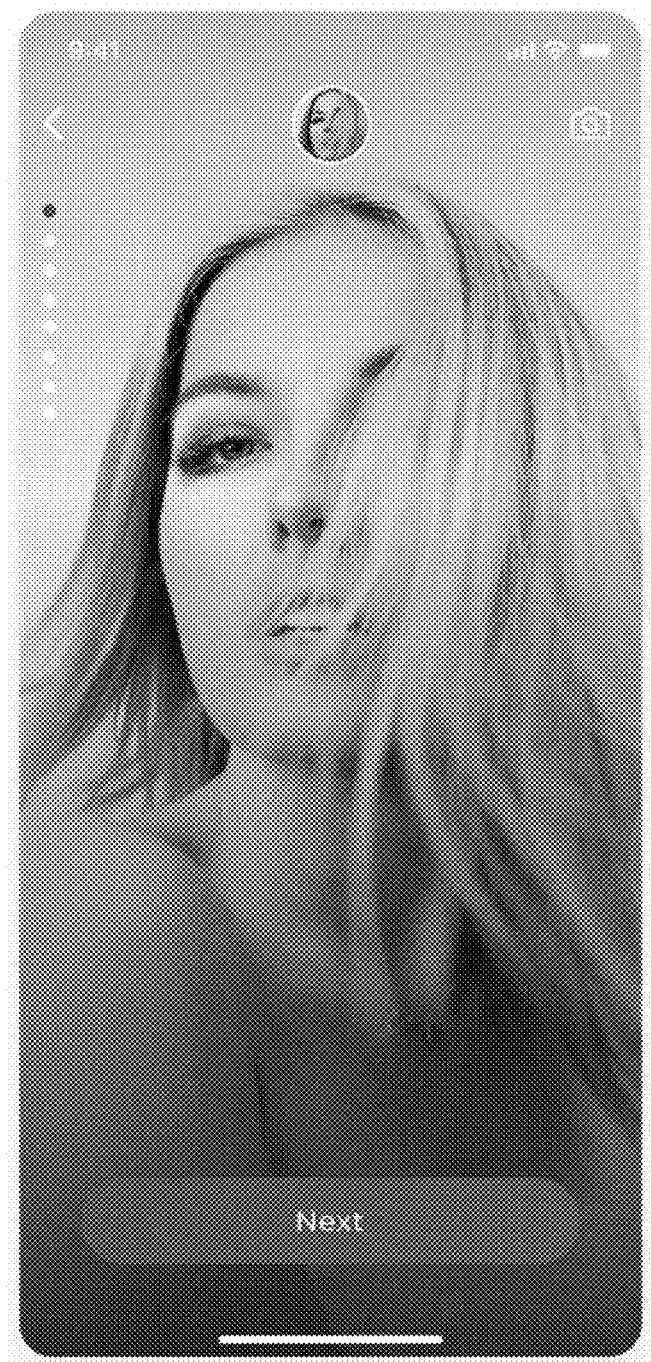
Figure 9:
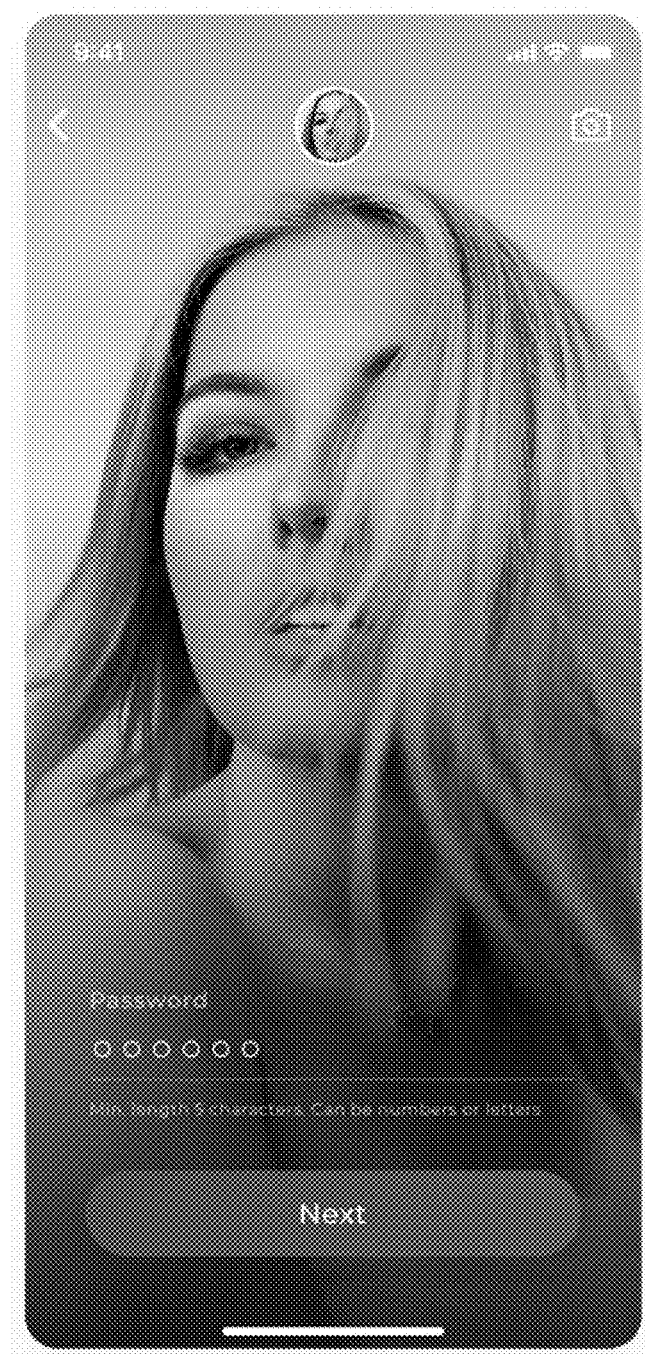
Figure 10:
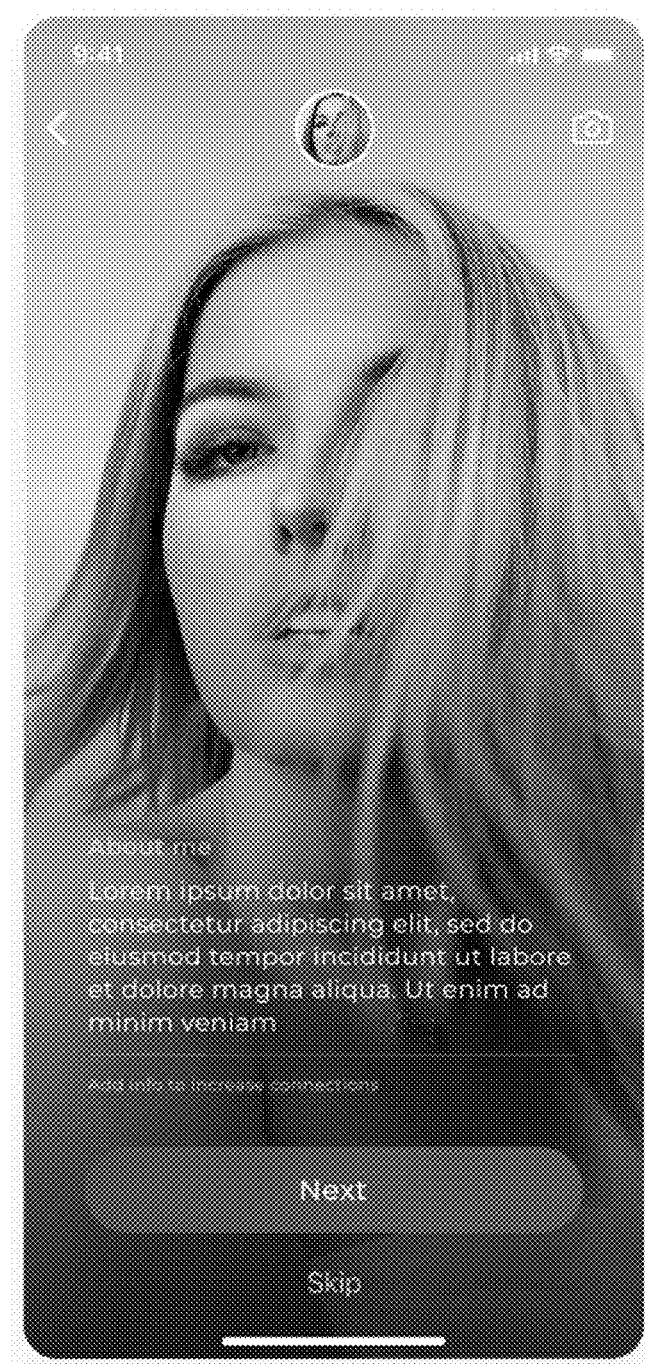

FIGS. 4-10 show non-limiting exemplary GUIs for configuring a user profile. Per FIG. 4, in some embodiments, the GUI registers a new user by requesting their telephone number, which per the notification, is not shared with other users. In some embodiments, per FIGS. 5 and 6, the new user is then prompted to enter, and enters, an authentication code sent by SMS to the phone number input by the user. As shown in FIG. 7, the user is then prompted to add a profile photo by tapping a "next" button, and is notified that, for example, the first picture will be an avatar and more than one image can be added. In some embodiments, per FIGS. 8, 9, and 10, the user is prompted to confirm a sample of their avatar image, is prompted to create a password given a set password complexity requirement, and enter a description about themselves. Alternatively, in some embodiments, the user can elect to enter their description at a later time.

Figure 74:
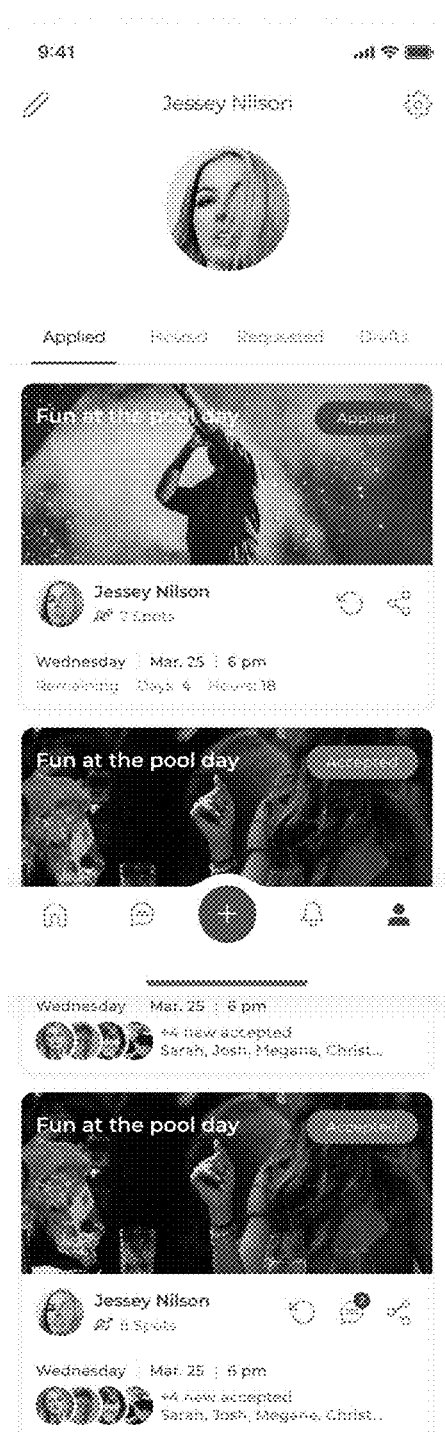
FIGS. 74-75 show non-limiting exemplary GUIs; in this case, GUIs including features for displaying profile activity.
Figure 75:
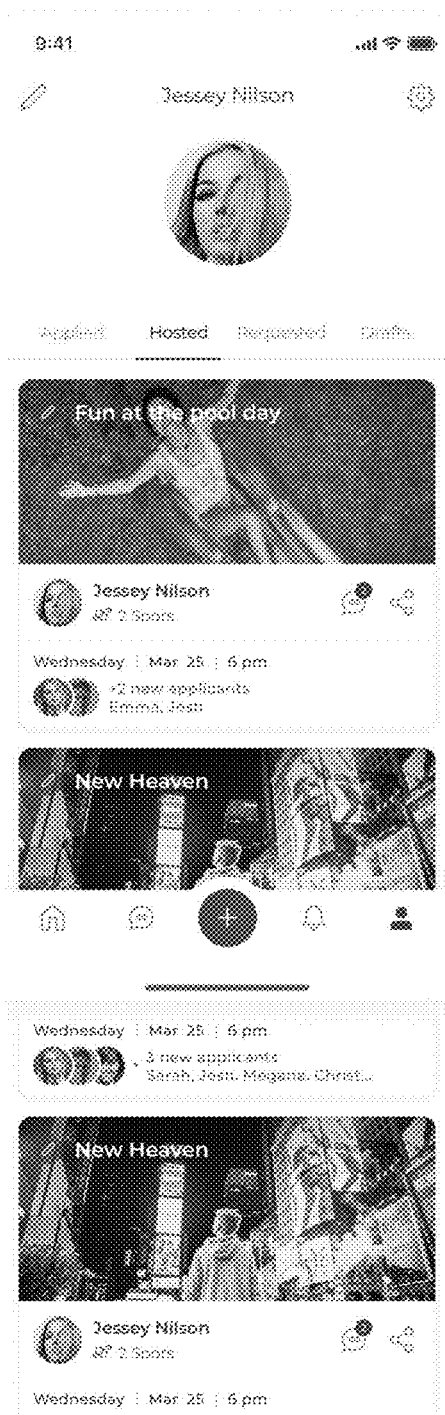
Figure 76:
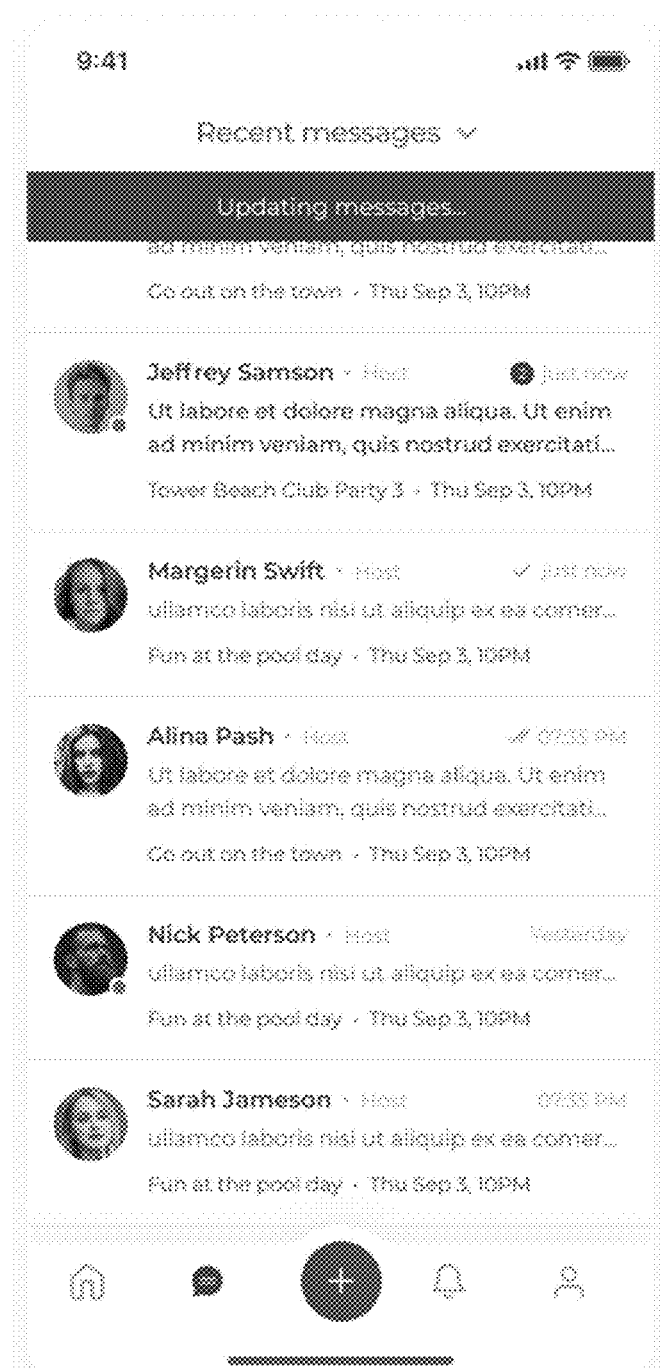
FIGS. 76-79 show non-limiting exemplary GUIs; in this case, GUIs including features for conducting messaging with other users.
Figure 77:
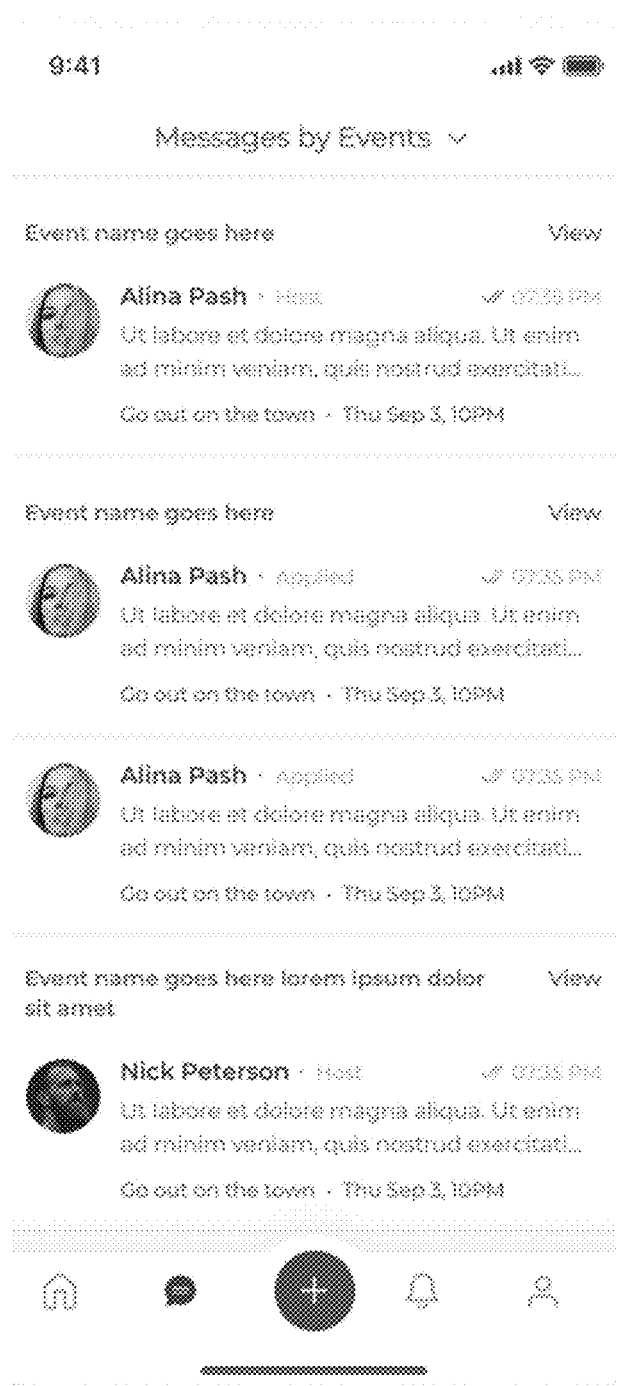
Figure 78:
Figure 79:
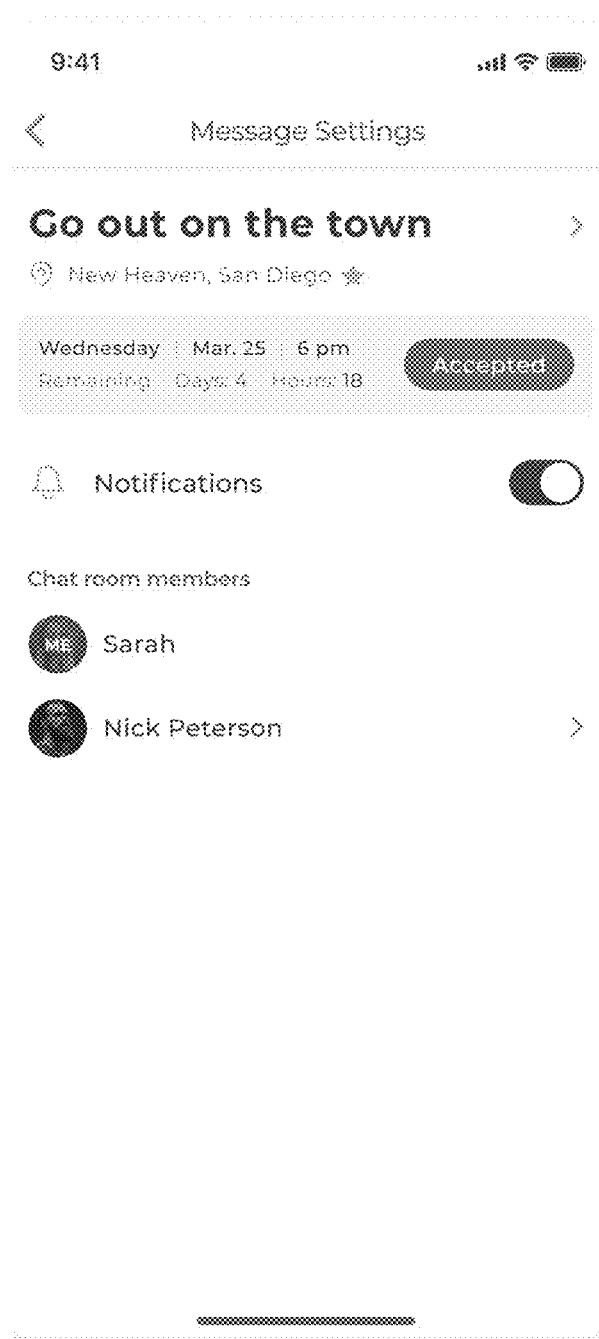
Figure 84:
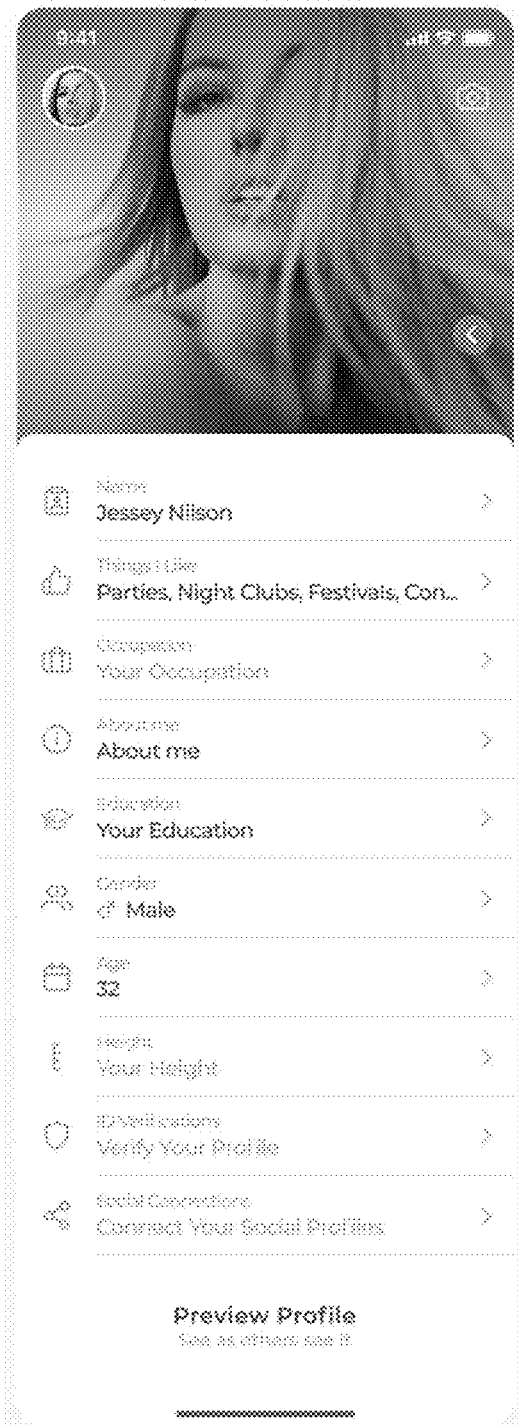
FIGS. 84-85 show non-limiting exemplary GUIs; in this case, GUIs including features for configuring profile settings.
Figure 85:
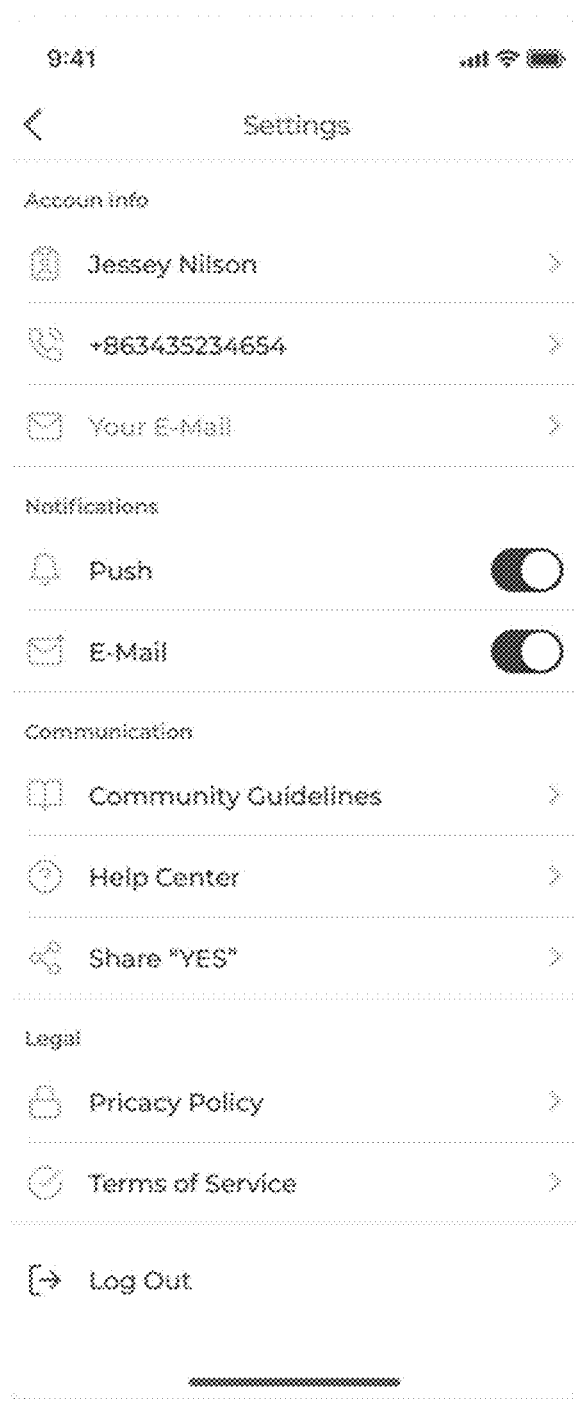

FIGS. 74-75 show non-limiting exemplary GUIs for displaying profile activity. As shown, in some embodiments, the profile activity of a user includes a list of events that they have applied to, hosted, requested, or are currently forming. In some embodiments, each event provides an icon depicting whether that user has applied to the event or been accepted to the event. In some embodiments, the profile activity of hosted events further allows the user to message participants and share the event. FIGS. 84-85 show non-limiting exemplary GUIs for configuring profile settings. In some embodiments, as shown, the profile settings comprise the user's name, likes, occupation, description, education, gender, age, height, identification, social connections, phone number, email address, notification settings, or any combination thereof.

Applying to a Hosted Event

Figure 11:
Figure 12:
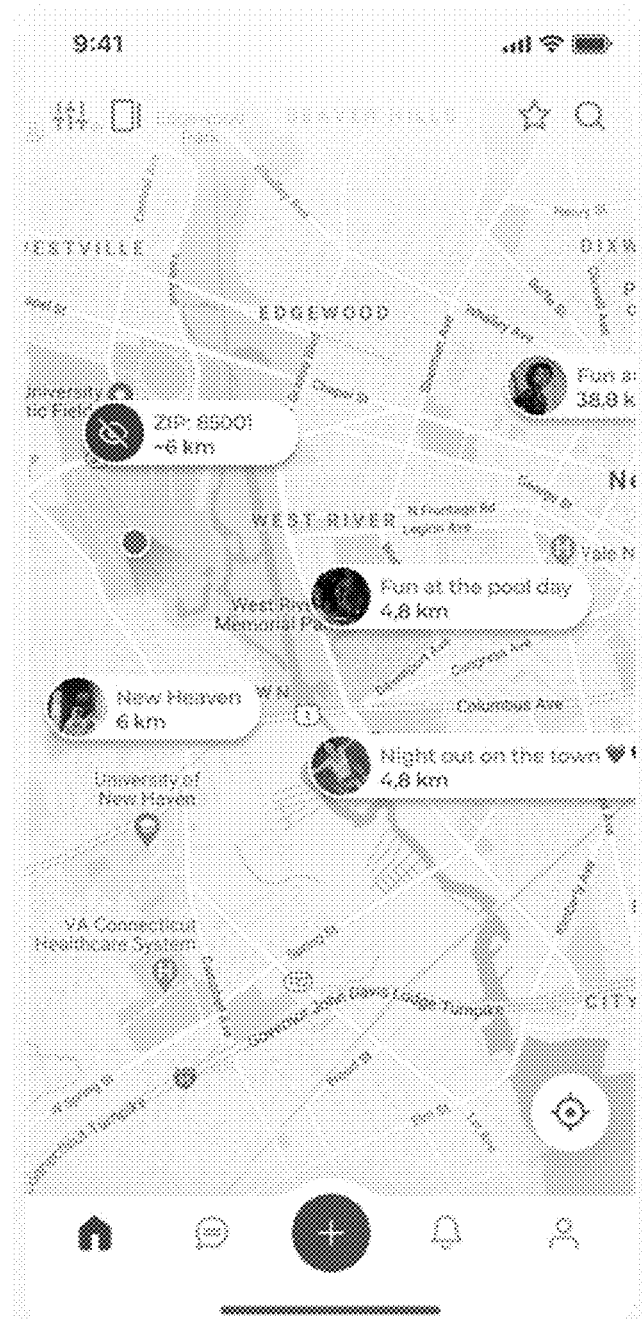
Figure 13:
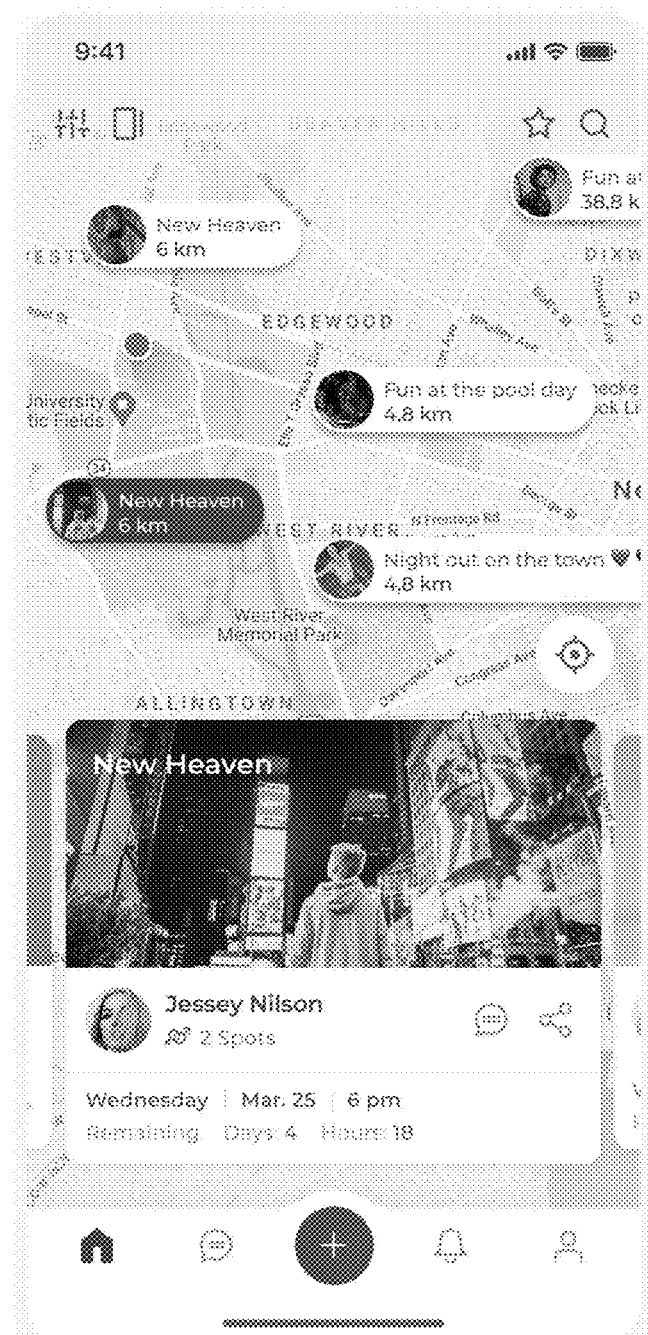
Figure 14:
Figure 15:
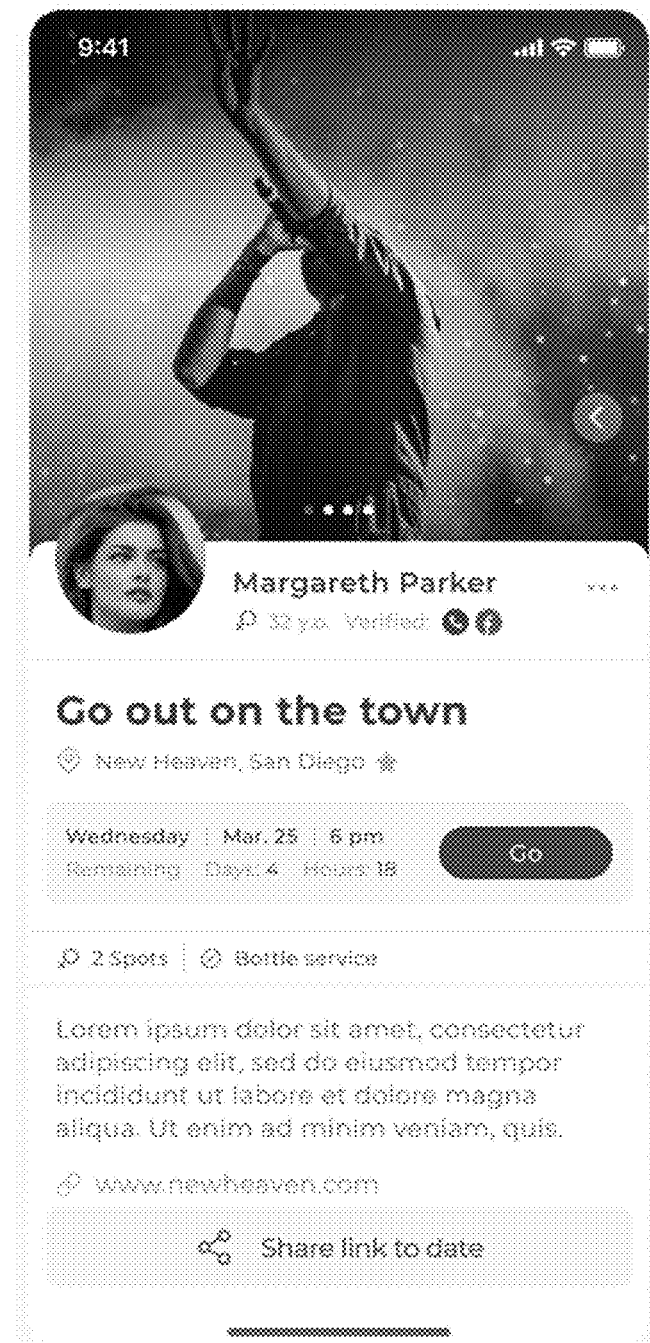
Figure 17:
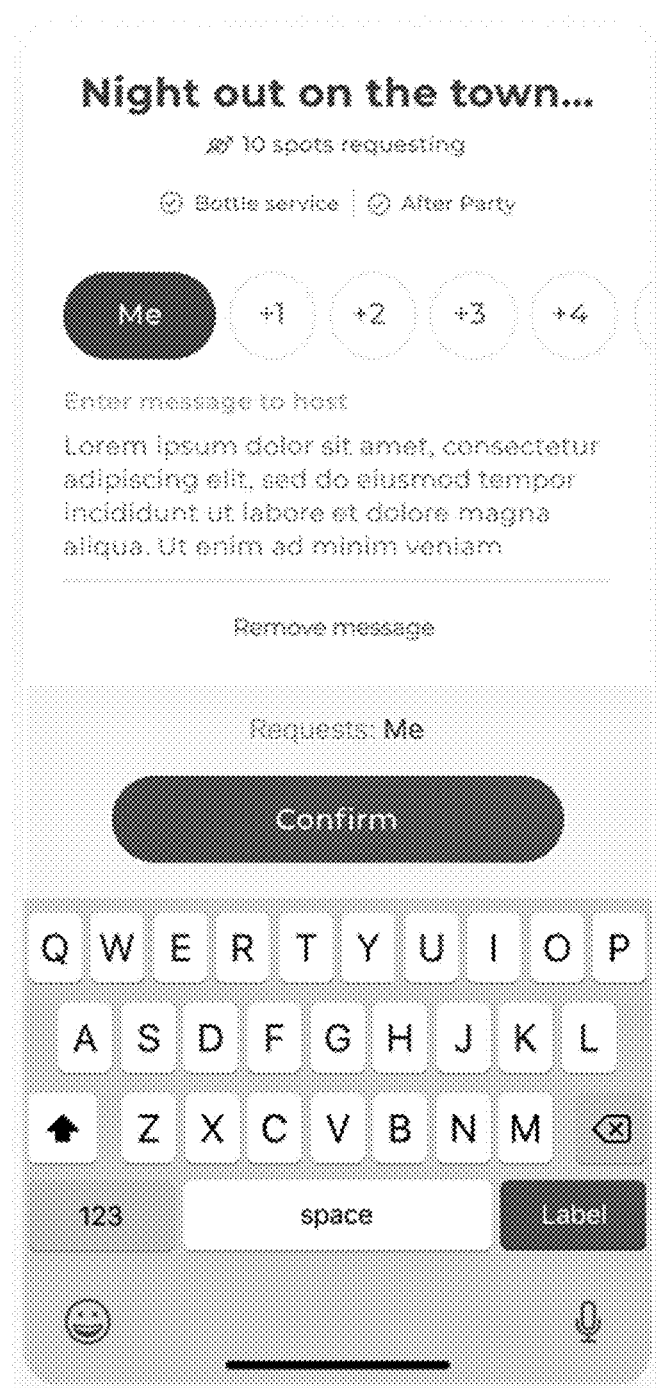
Figure 18:
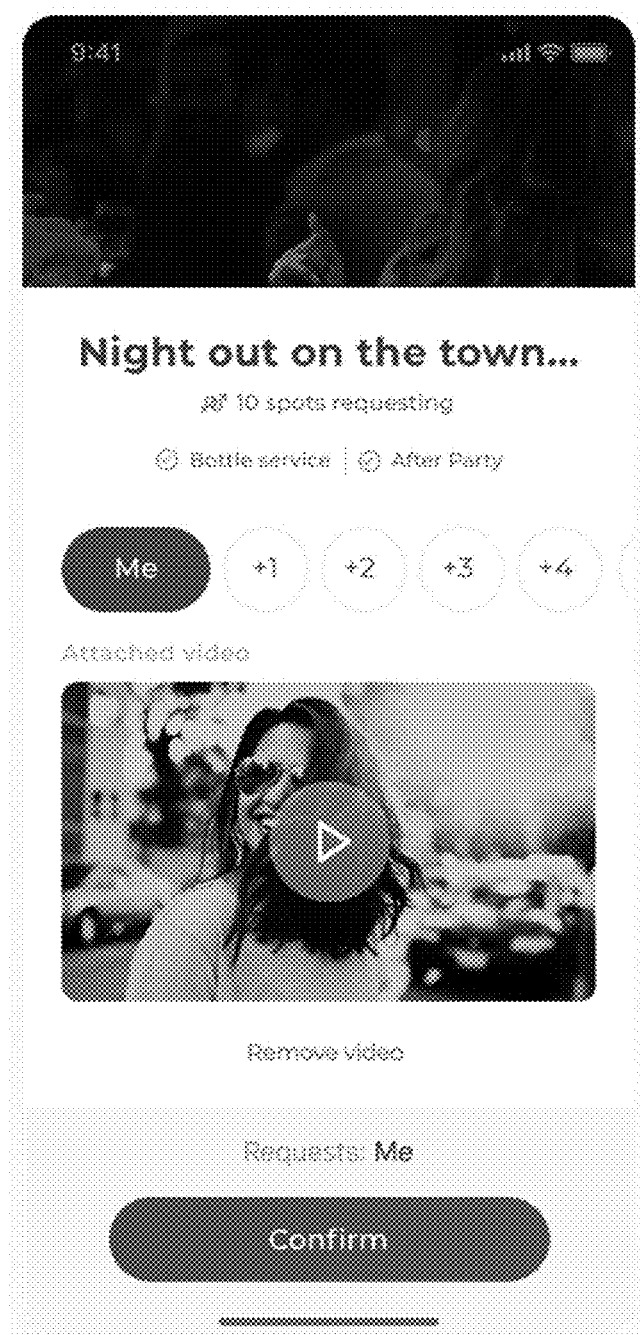
Figure 19:
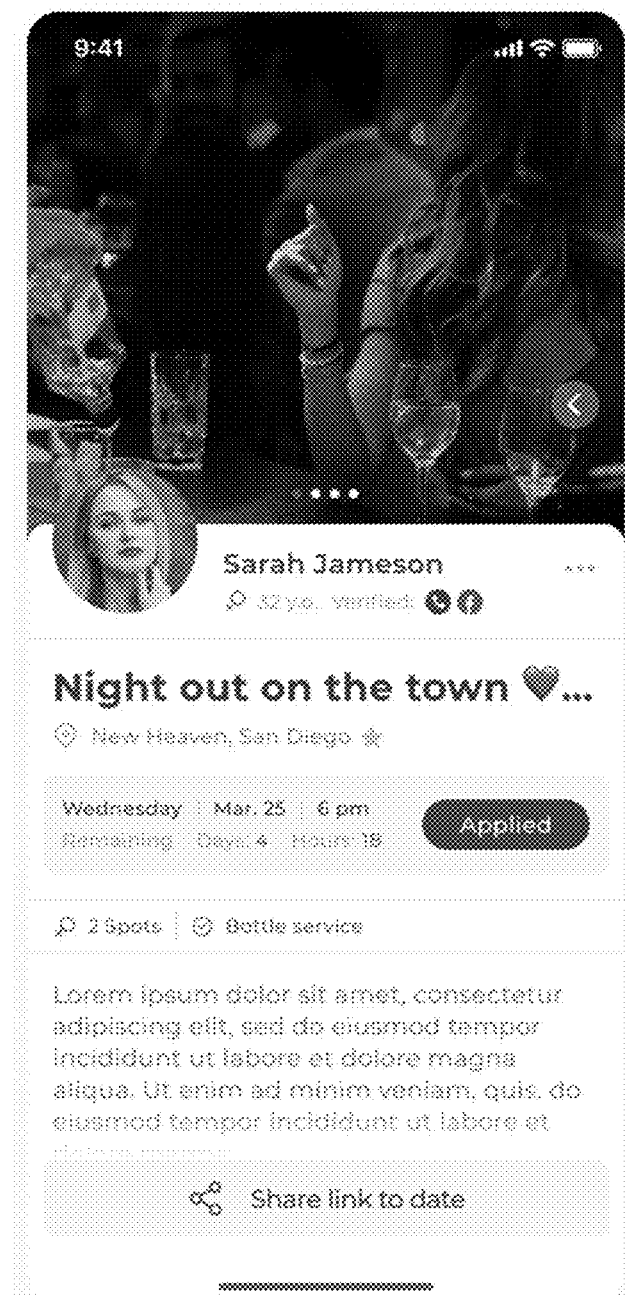
Figure 20:
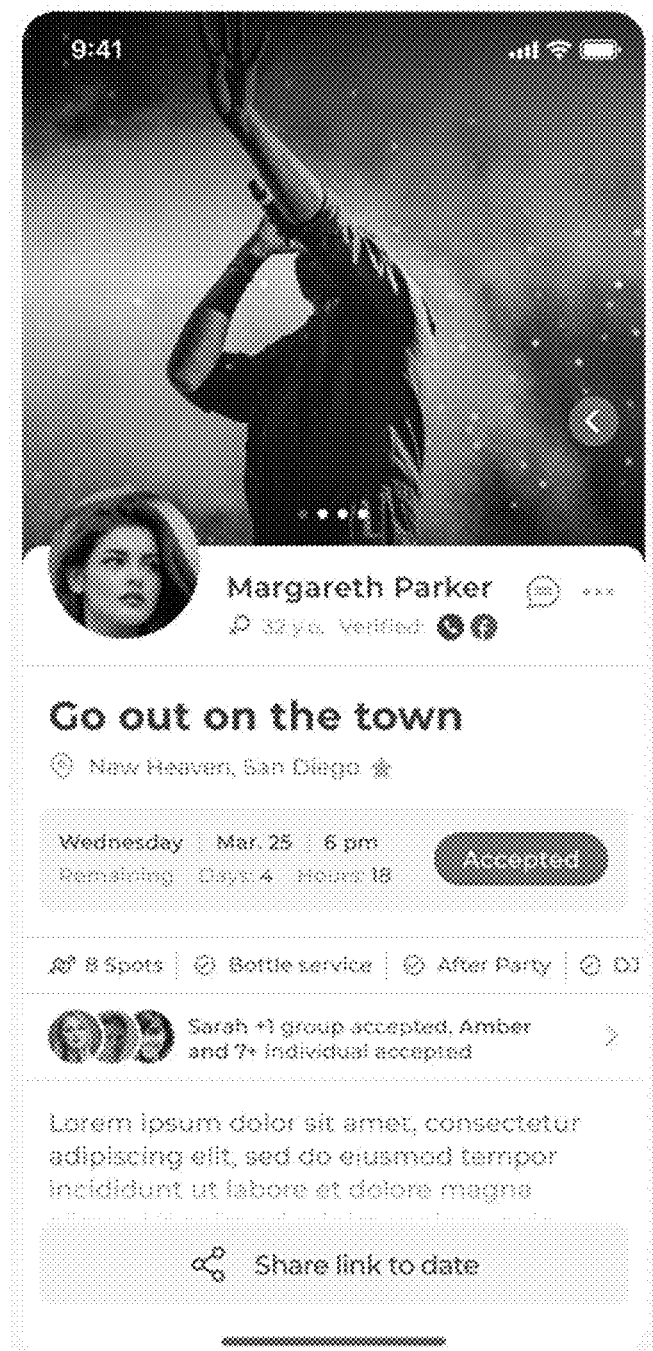
Figure 21:
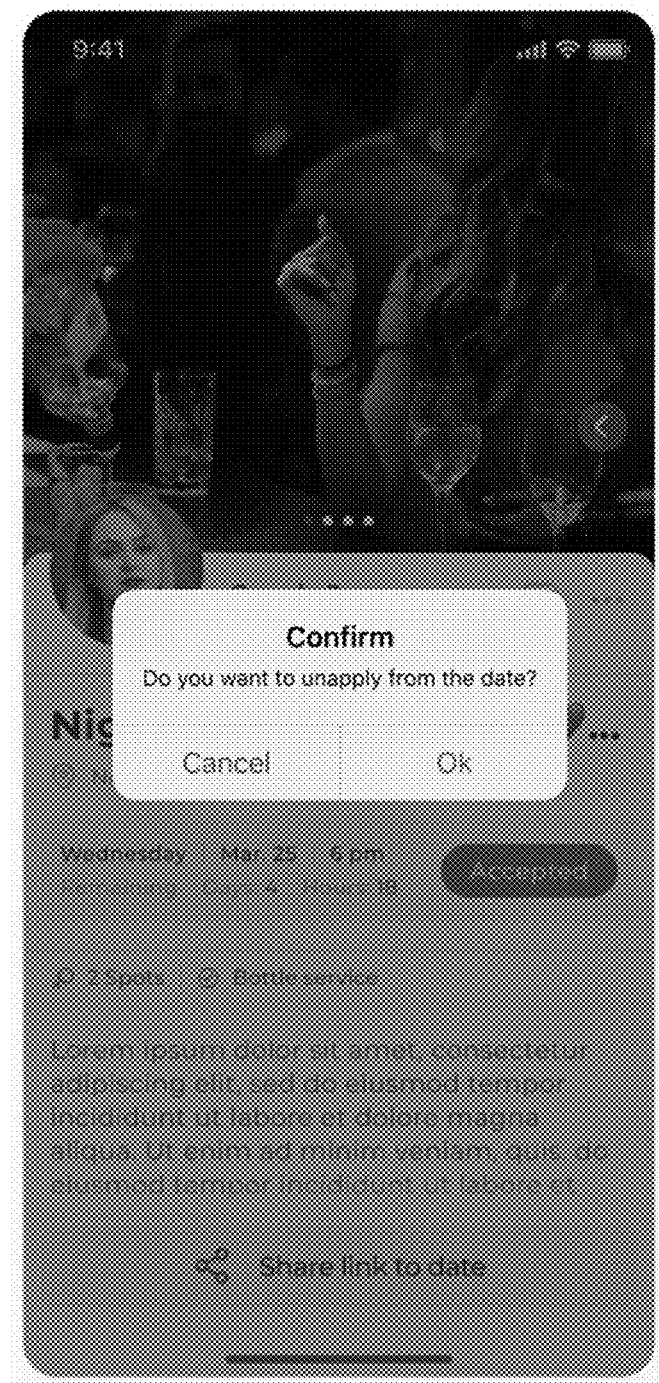
Figure 22:
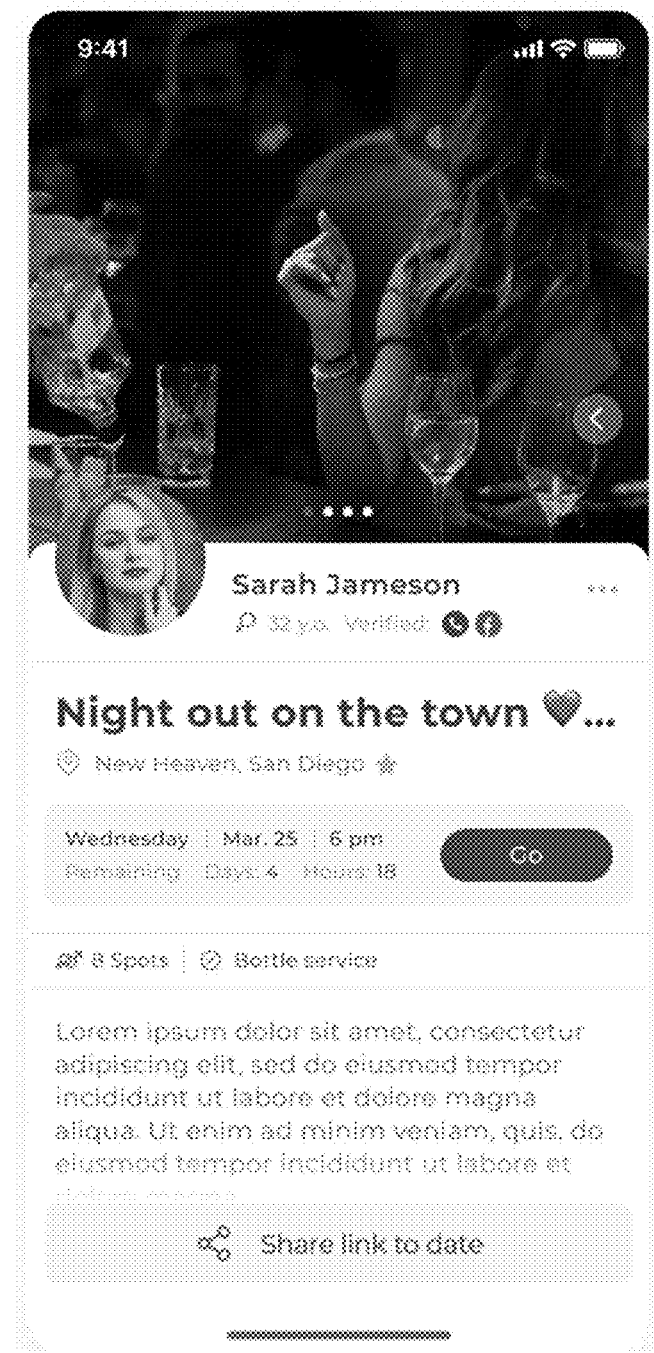

FIGS. 11-21 show non-limiting exemplary GUIs for applying to a hosted event as an individual. As seen in FIG. 11, in some embodiments, the GUI for a hosted event shows a title of the event "night on the town," that two female spots are available, that the event includes bottle service, an after party, and a DJ, that the event is planned for Wednesday April $1^{st}$ at 6:00 pm at the Parq Nightclub, a picture of the event, and a picture of the host. FIG. 12 shows that, in some embodiments, a plurality of events are displayed on a map, wherein each event displays a thumbnail image of the event, the title of the event and a distance from a current location (denoted by the blue mark). In some embodiments, per FIG. 13, selecting an event on the map of FIG. 12 displays a popup with a larger version of the event's image, the name and picture of the host, an indication that two spots are available regardless of gender, that the event is on Wednesday March 25 at 6:00 pm and will begin in 4 days and 18 hours, and offers interfaces to contact the host, share the event, or both. In some embodiments, if a user selects the picture of the host, their profile is displayed per FIG. 14. As shown, in some embodiments, the host's profile comprises their name, verified telephone number, verified Facebook page, gender, age, height, career and profile statement. FIG. 15 shows an exemplary interface for an event, which displays the host's picture, the host's name, the host's gender, the host's age, the host's verified phone number, the host's verified Facebook page, the name of the event, the location of the event, the day, date, and time of the event, an amount of time remaining until to event, a number of female spots available, an indication that bottle service will be available, a description of the event, a button to attend, and a button to share. In some embodiments, once the attend button is selected, the user is shown a confirmation page, per FIG. 16, with the option to include a message, and indicators that two female spots are available, and that bottle service and an after party will be available. As seen in FIG. 17, upon confirmation, in some embodiments, As shown, in some embodiments, a message can be included and the individual or group application confirming for submission. In some embodiments, per FIG. 18, the user can further or alternatively attach a video to their application. Thereafter, per FIG. 19, an indicator appears in the event page that the user has applied to join the event. If and once the individual or group application is accepted by the host, in some embodiments, the icon changes to "accepted," per FIG. 20. Finally, in some embodiments, the user can cancel their application to the event and confirm their application withdrawal per FIG. 21.

Figure 23:
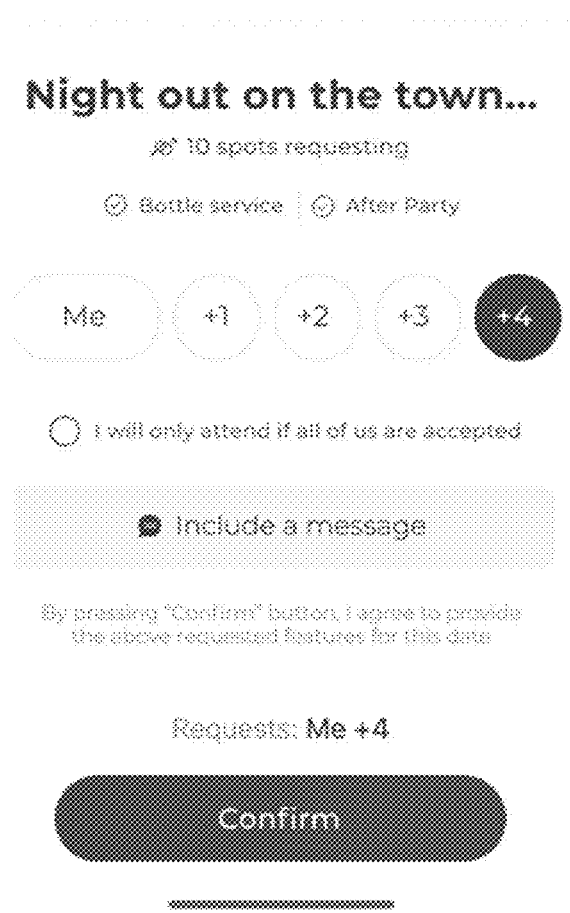
Figure 25:
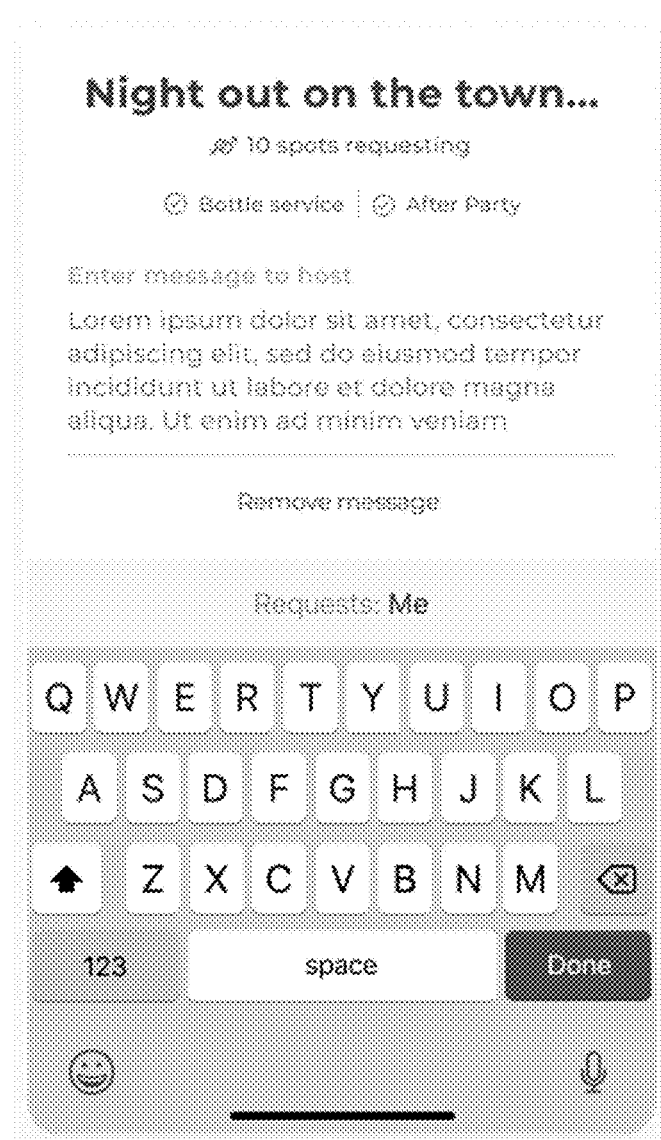

FIGS. 22-25 show non-limiting exemplary GUIs for applying to a hosted event as a group. In some embodiments, upon pressing the "go" button to an event, per FIG. 22, the user can select to invite 1, 2, 3, 4, or more friends to submit a group application. As shown in FIG. 23, the user selected +4 indicating that they and four friend are submitting a group application. Moreover, as shown in FIG. 23, the GUI includes a feature along the user to indicate "I will attend if all of us are accepted." Wherein included, this feature makes a group application to an event "all-or-none," meaning that the host must accept or reject the entire group as a whole (not individuals within the group). Thereafter, in some embodiments per FIG. 24, the group request is confirmed and the user can text an invitation code to their four friends (see button labeled "Test invite code to friends"). As noted therein, in some embodiments, each of the four friends must separately register with the invitation code to attend the event.

Applying for a Requested Event

Figure 26:
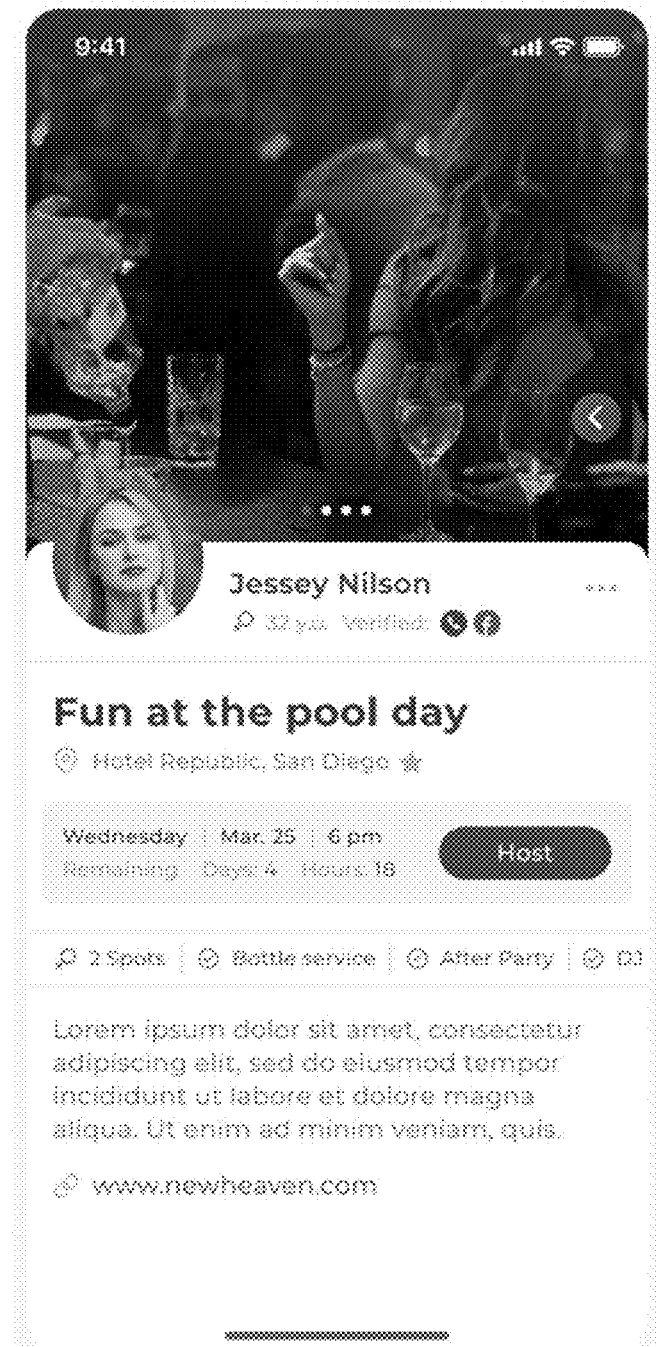
FIGS. 26-27 show non-limiting exemplary GUIs; in this case, GUIs including features for hosting a requested event.
Figure 27:

FIGS. 26-27 show non-limiting exemplary GUIs for applying for a requested event. Per FIG. 26, in some embodiments, a user submits an application for a requested event, wherein the application comprises the user's name, gender, age, requested event day, date, and time, a number of female spots, a number of male spots, requested amenities, a description, or any combination thereof. In some embodiments, upon submission of the requested event application, a confirmation is provided per FIG. 27 that the hosting request has been confirmed.

Creating and Managing Events

Figure 37:
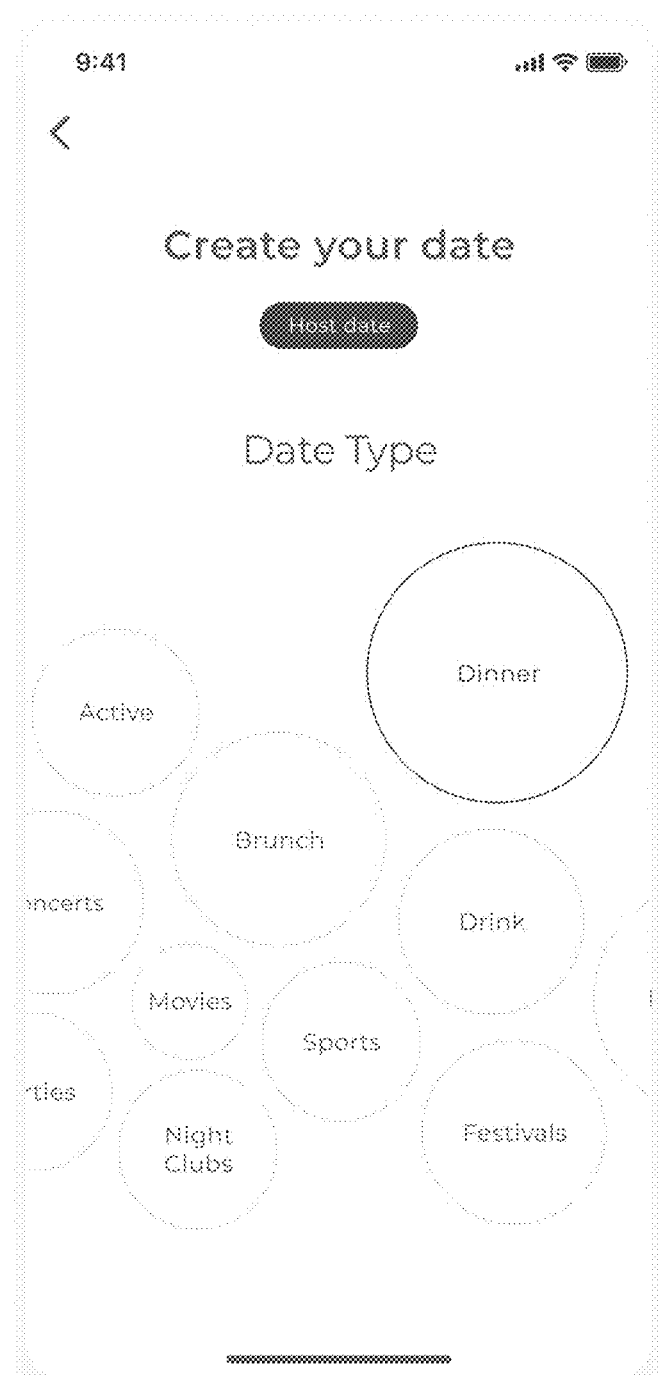
Figure 38:
Figure 39:
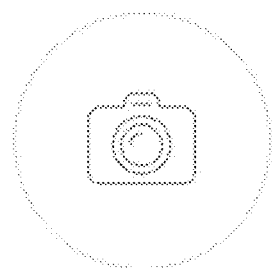
Figure 40:
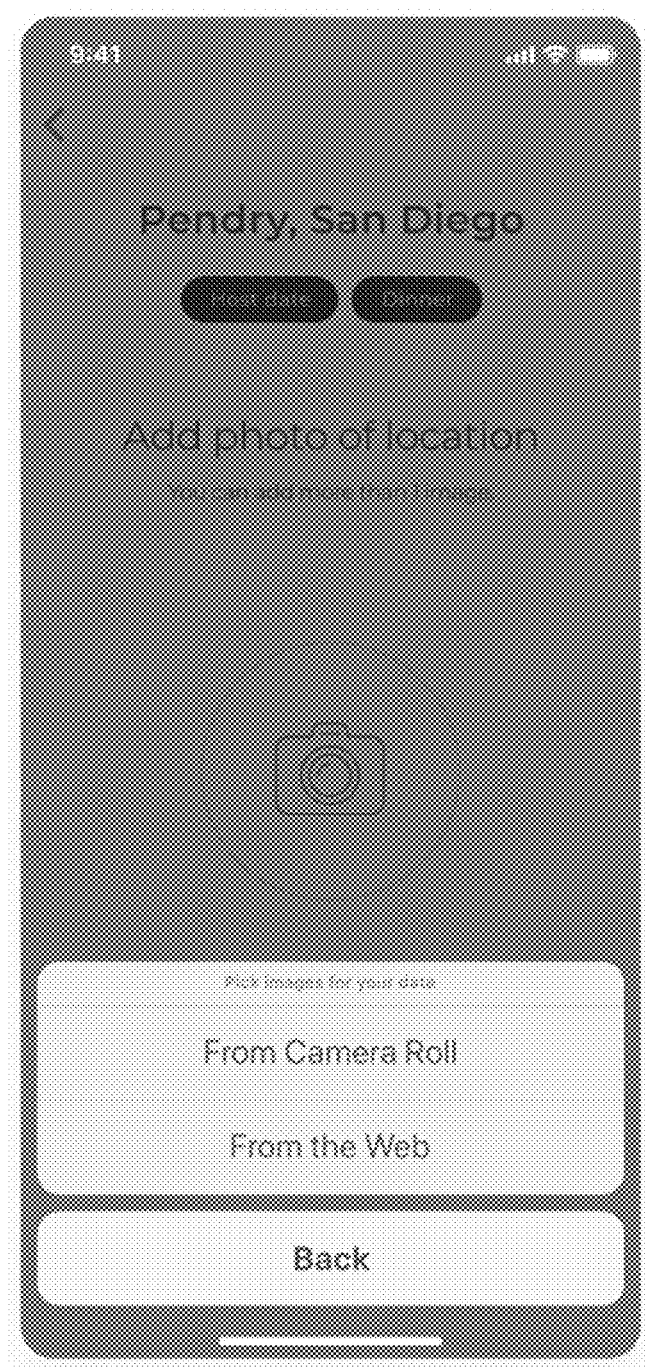
Figure 41:
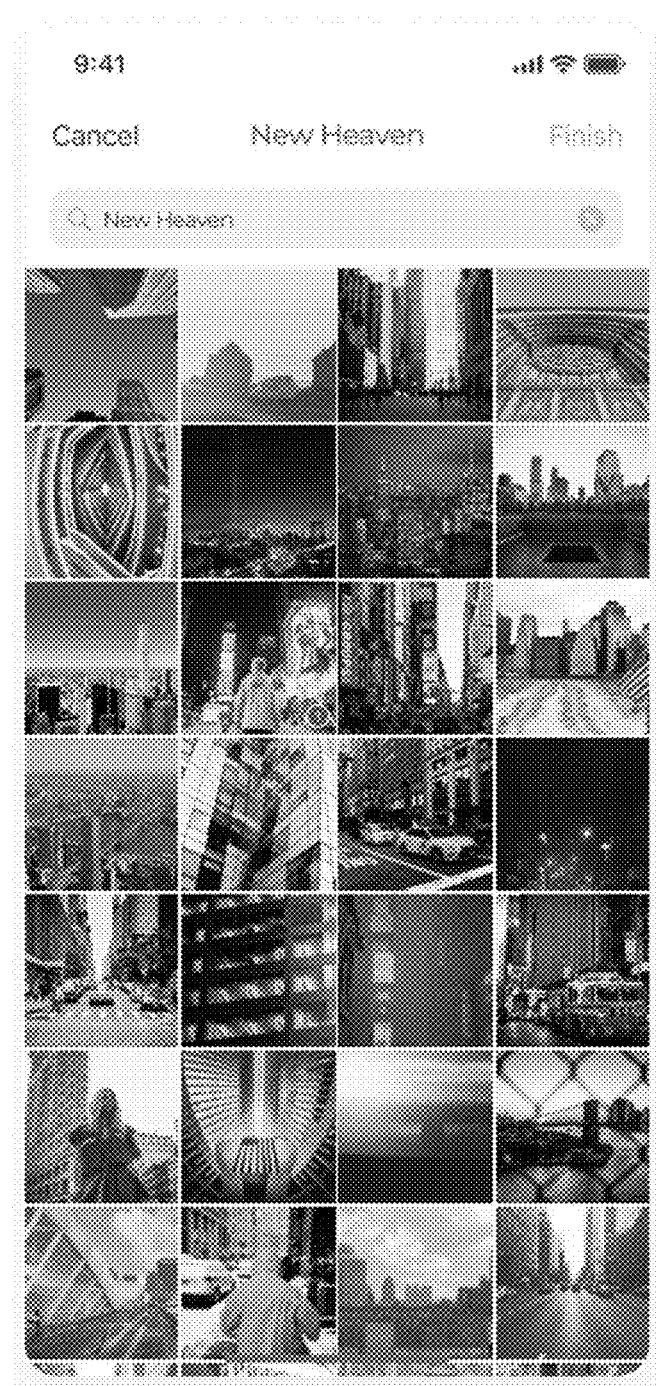
Figure 42:
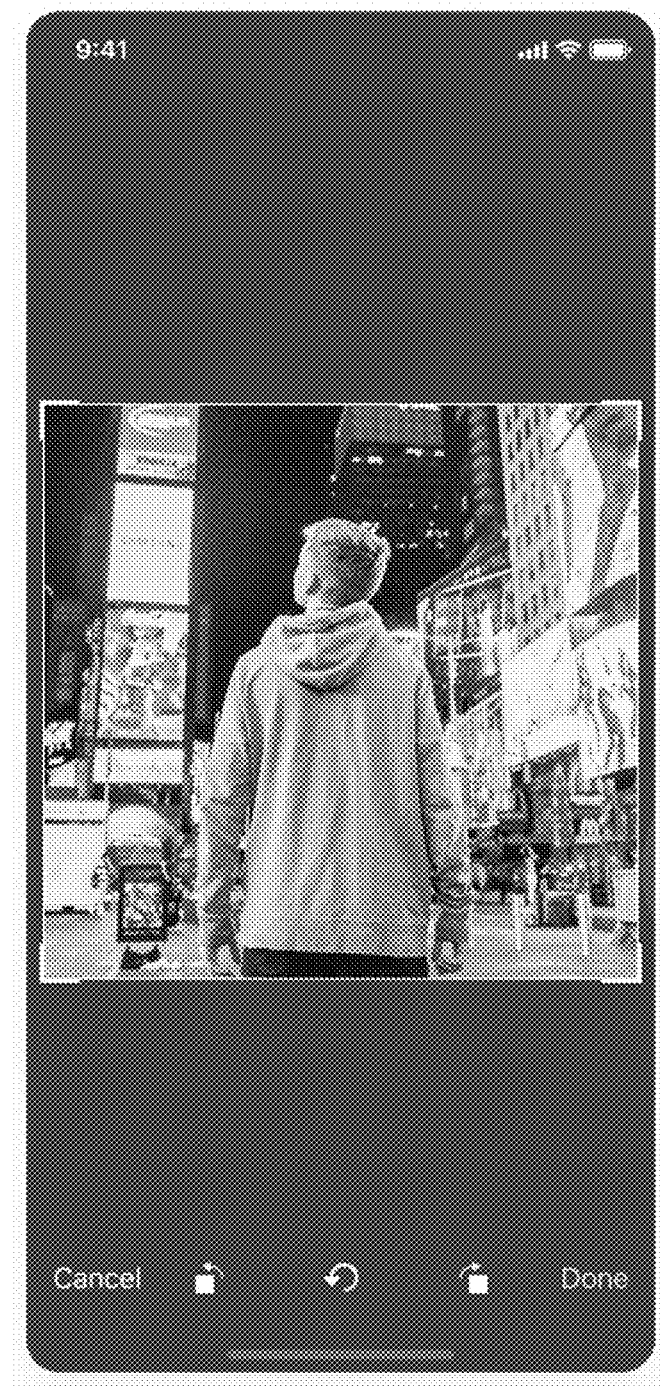
Figure 43:
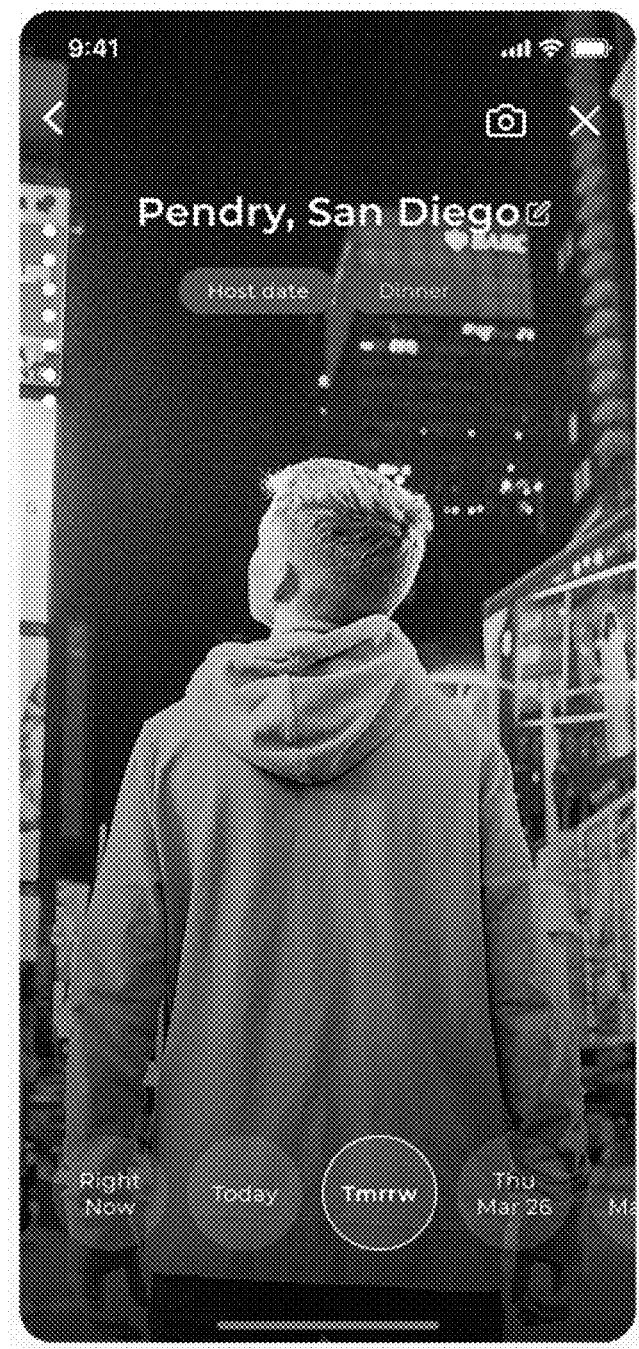
Figure 44:
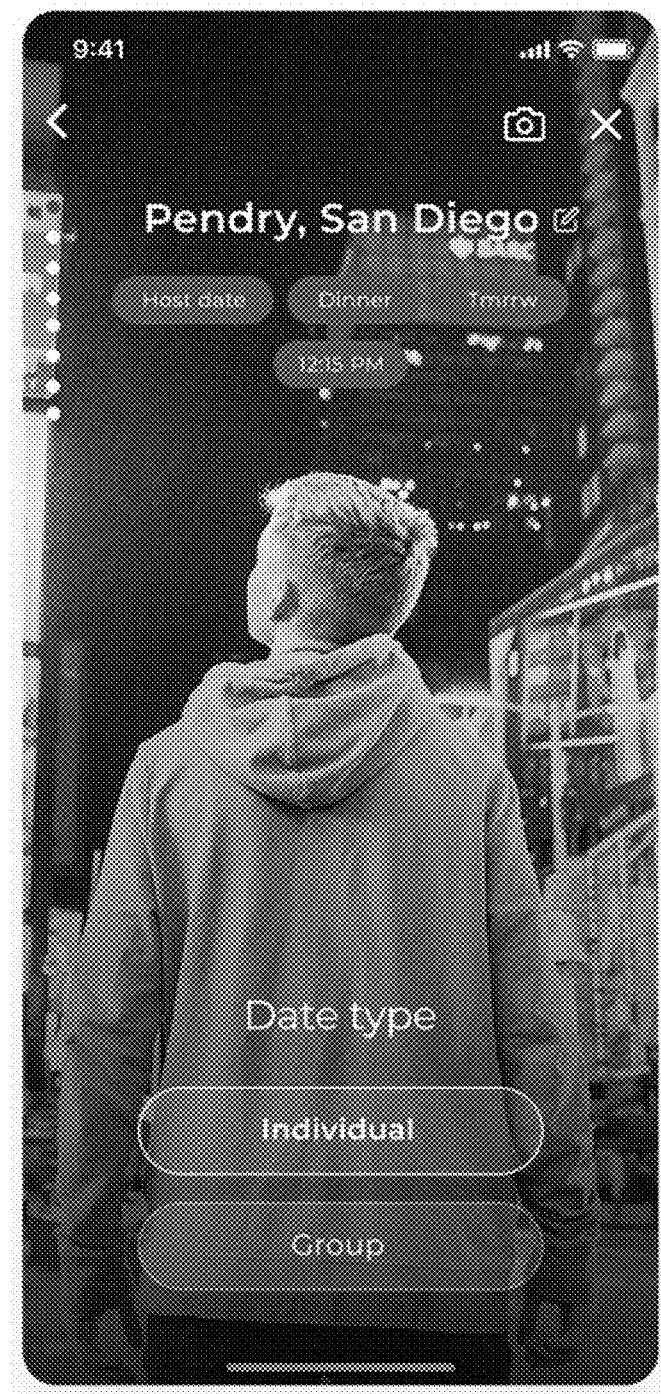
Figure 45:
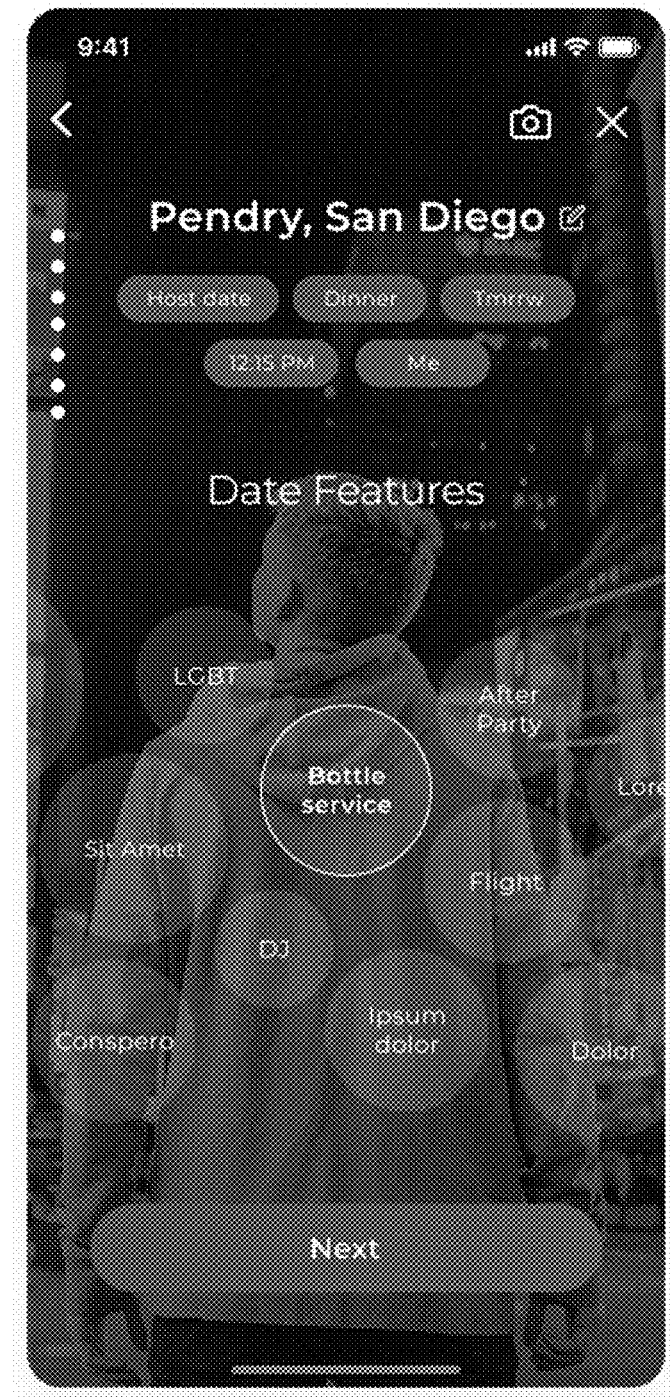
Figure 46:
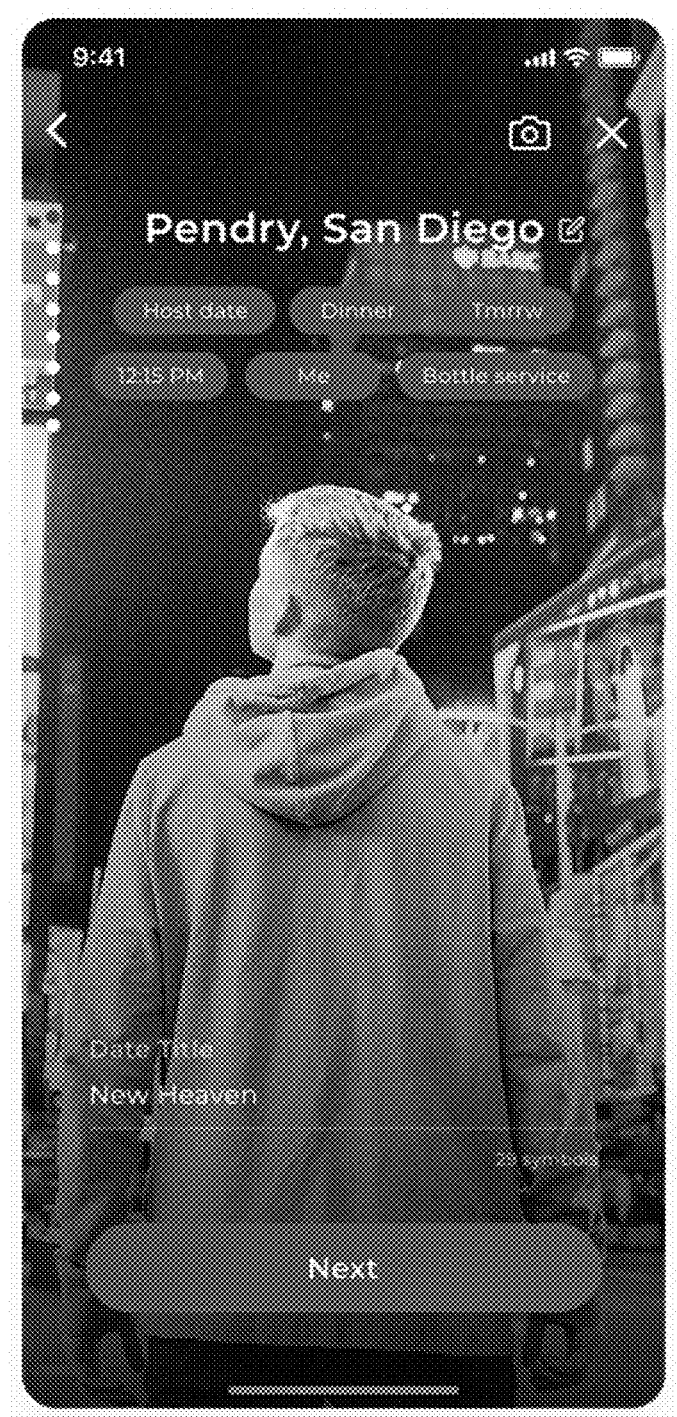
Figure 47:
Figure 48:
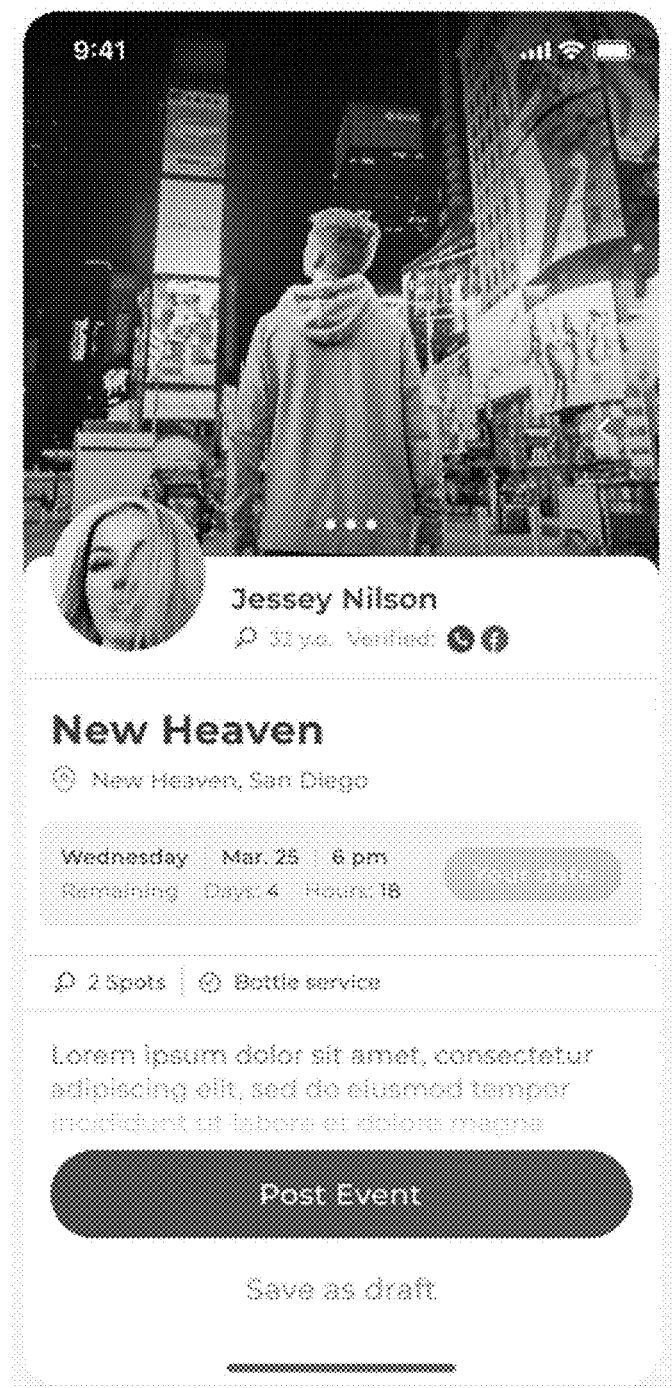

FIGS. 36-48 show non-limiting exemplary GUIs for creating a hosted event. In some embodiments, if "host date" is selected in a date creation interface of FIG. 36, the host is prompted to select an event type per FIG. 37. In some embodiments, per FIG. 38, the event type comprises an active type, a brunch type, a concert type, an art type, a drink type, a festival type, a nightclub type, a sport type, an exercise type, a shopping type, a movie type, a hike type, a picnic type, a travel type, or any combination thereof. In some embodiments, the host can specify a location event by entering an address, placing a pinpoint on a map, or both. In some embodiments, the host can select to make the location private to prevent non-confirmed attendees from viewing the location. In some embodiments, the host can add one or more photos of the location to instruct attendees on how to access the location. FIG. 39 shows an interface for capturing a location image via a camera, or in some embodiments, the host can choose, per FIG. 40, to select an image from the web. FIG. 41 shows an exemplary interface for displaying images from the web, wherein in some embodiments a selected image is edited per FIG. 42. In some embodiments, the web images for host selection are curated based on the event type, the event location, the host's profile, or any combination thereof. In some embodiments, per FIGS. 43-46, the host provides a date of the event, a time of the event, a feature of the event, a description of the event, and whether the event is a group event or an individual event. In some embodiments, the date of the event can be selected and displayed on the event page as a Gregorian date (i.e., day/month/year) or as a shorthand (e.g., tmrrw, right now). Per FIG. 47, in some embodiments the event details are confirmed by the host before being posted per FIG. 48.

Figure 49:
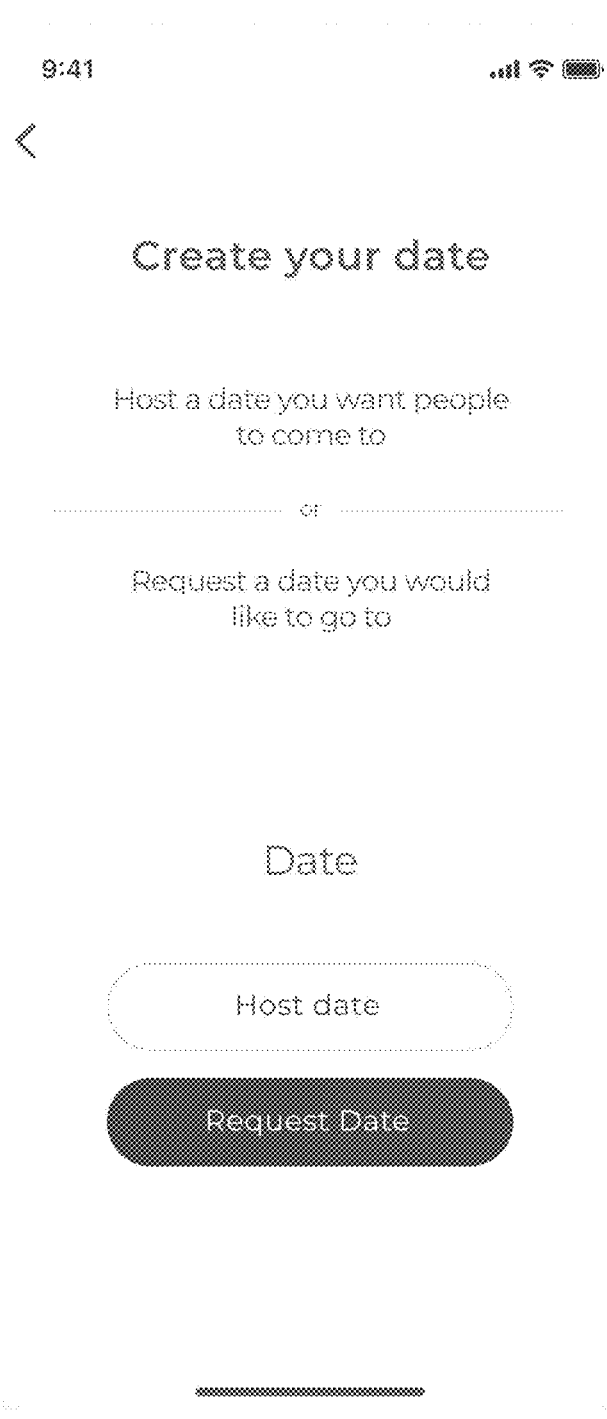
FIGS. 49-64 show non-limiting exemplary GUIs; in this case, GUIs including features for configuring a requested group event.
Figure 50:
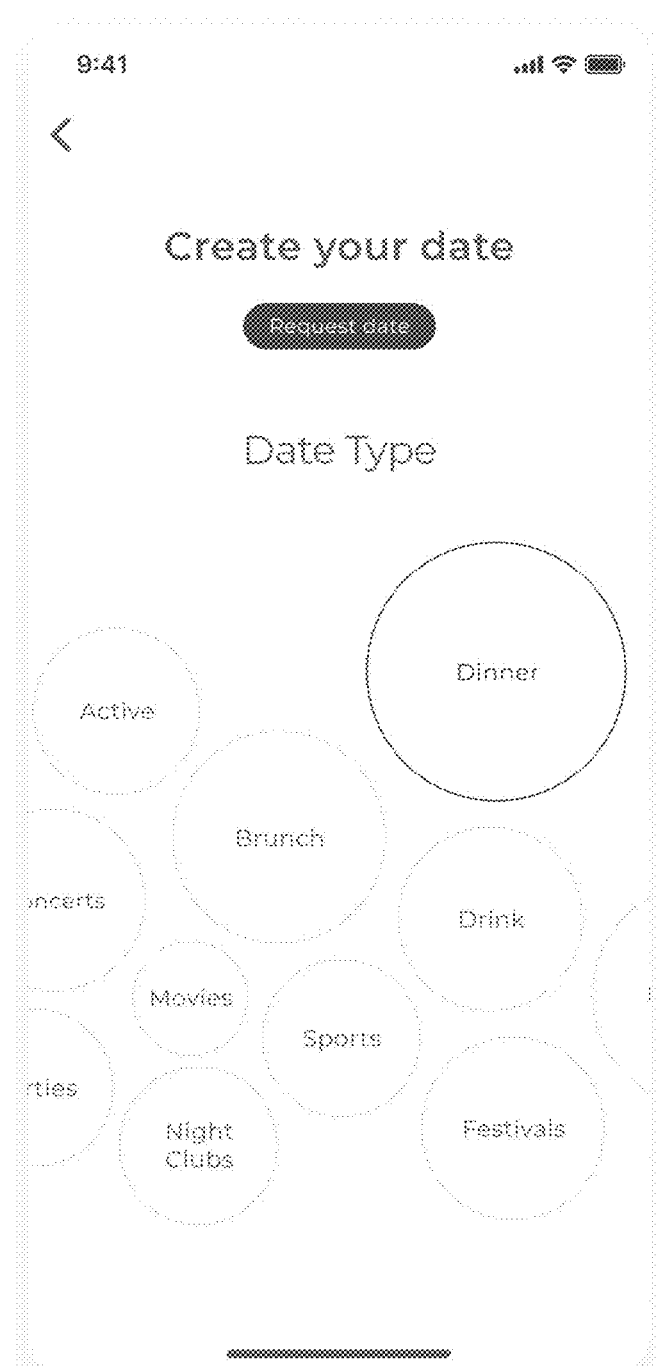
Figure 51:
Figure 52:
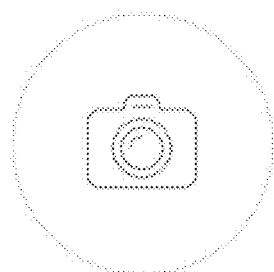
Figure 53:
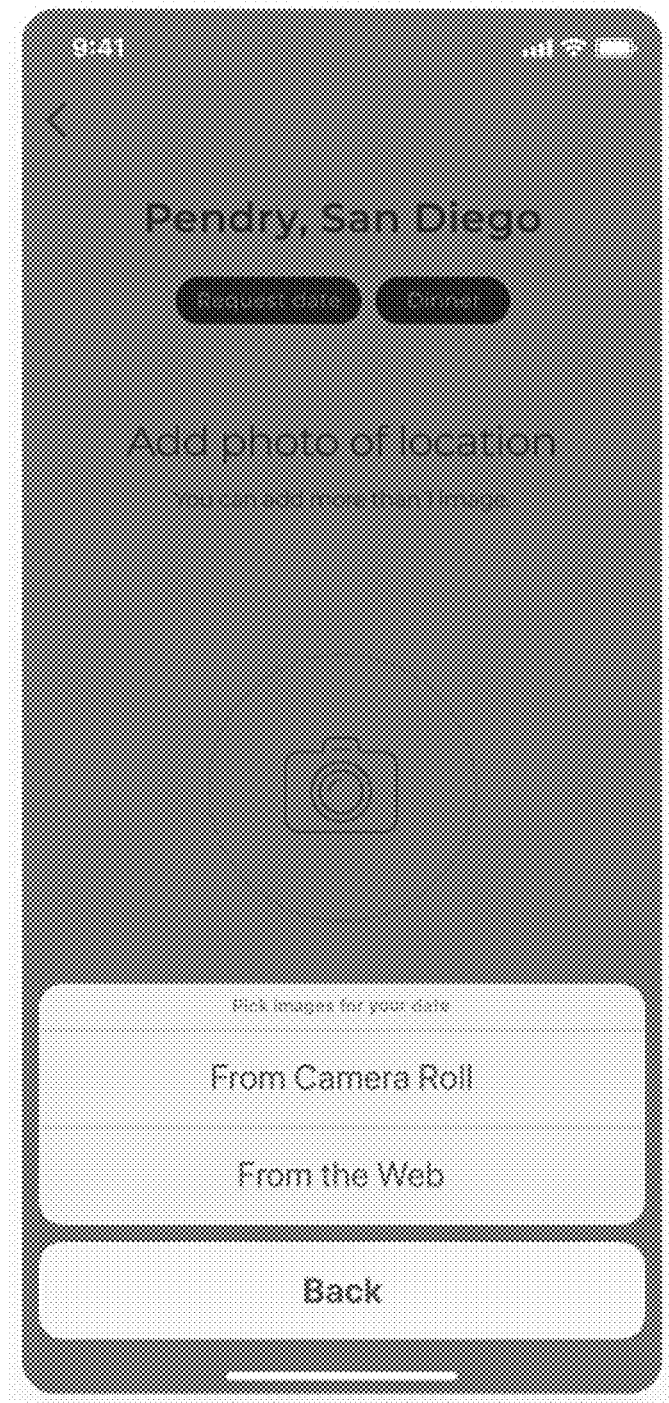
Figure 54:
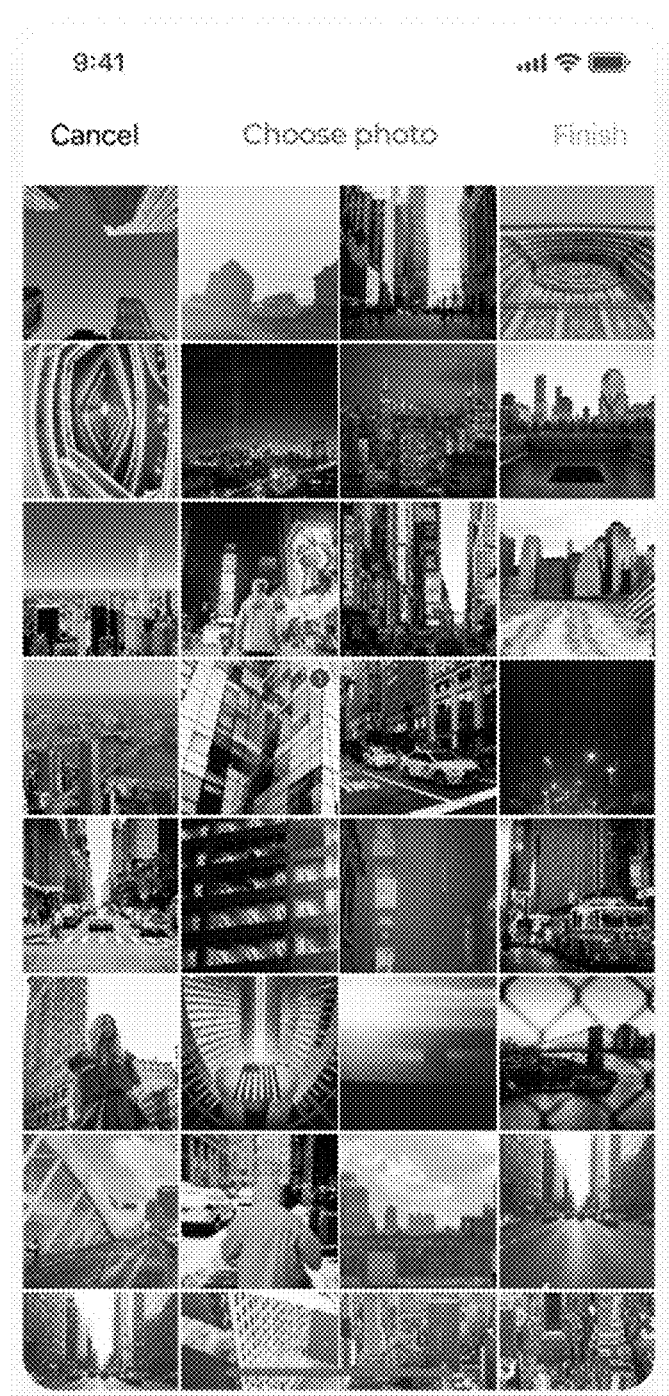
Figure 55:
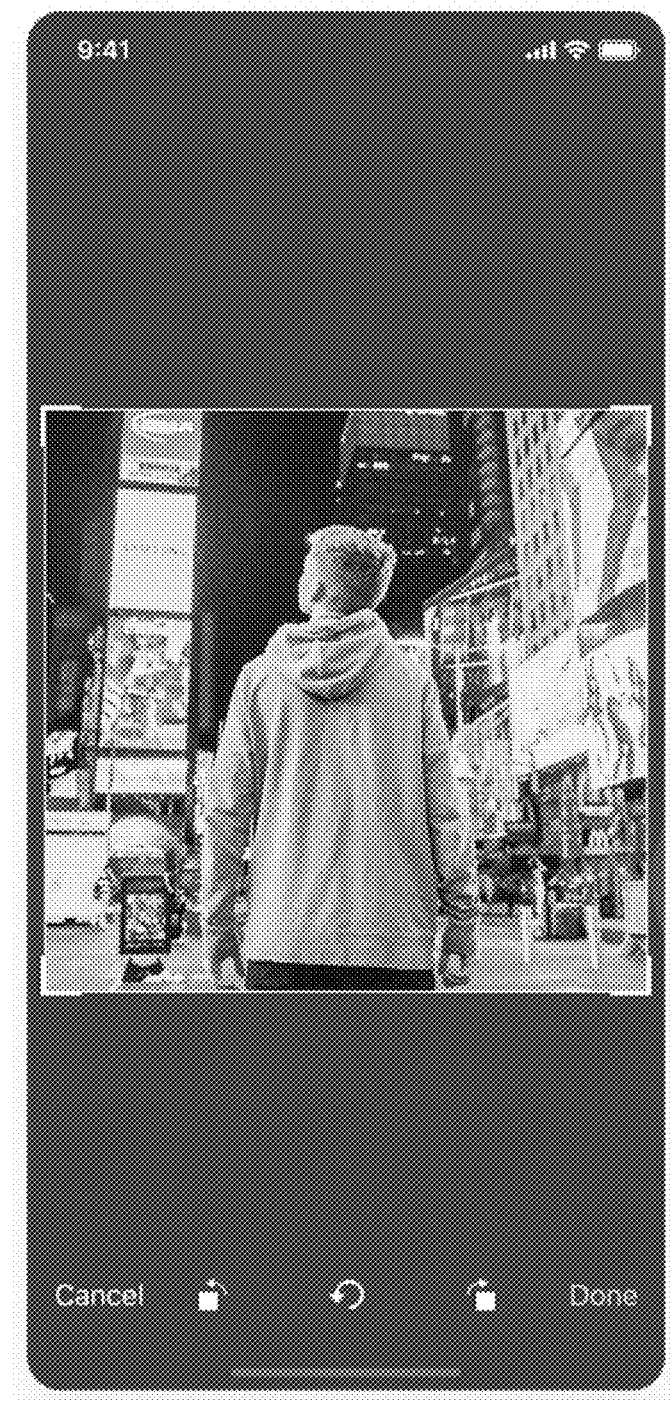
Figure 56:
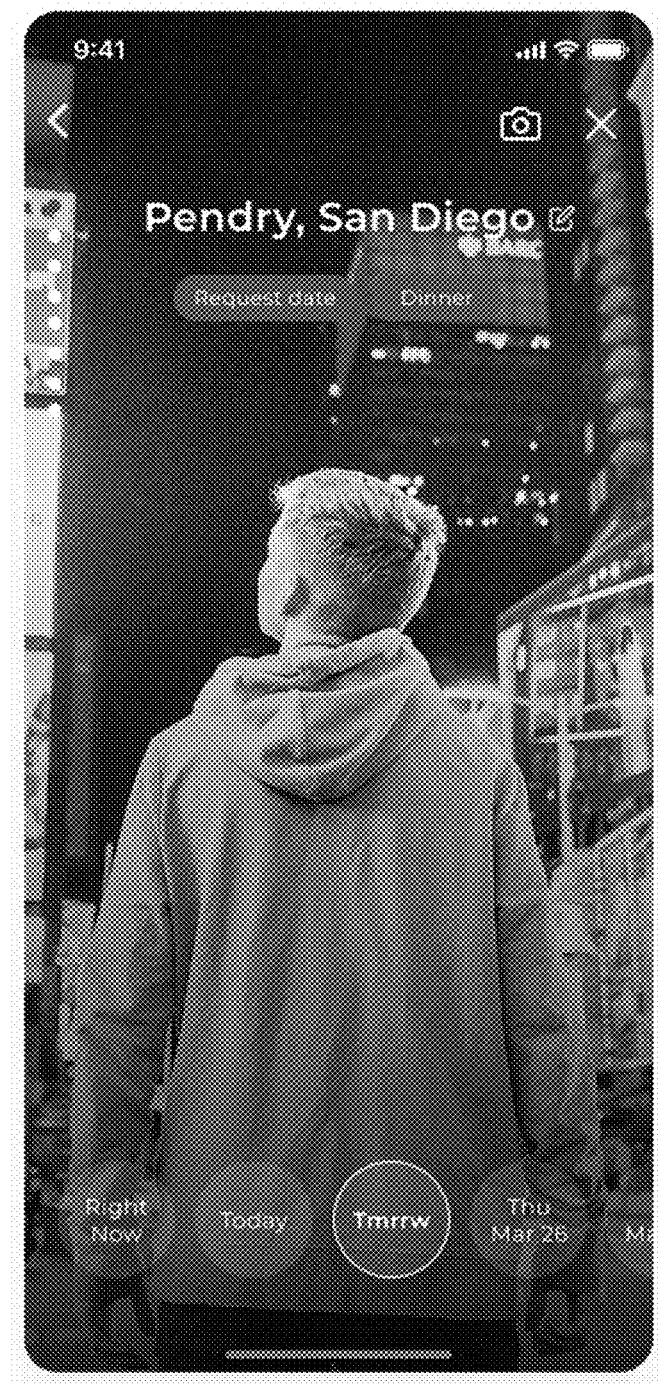
Figure 57:
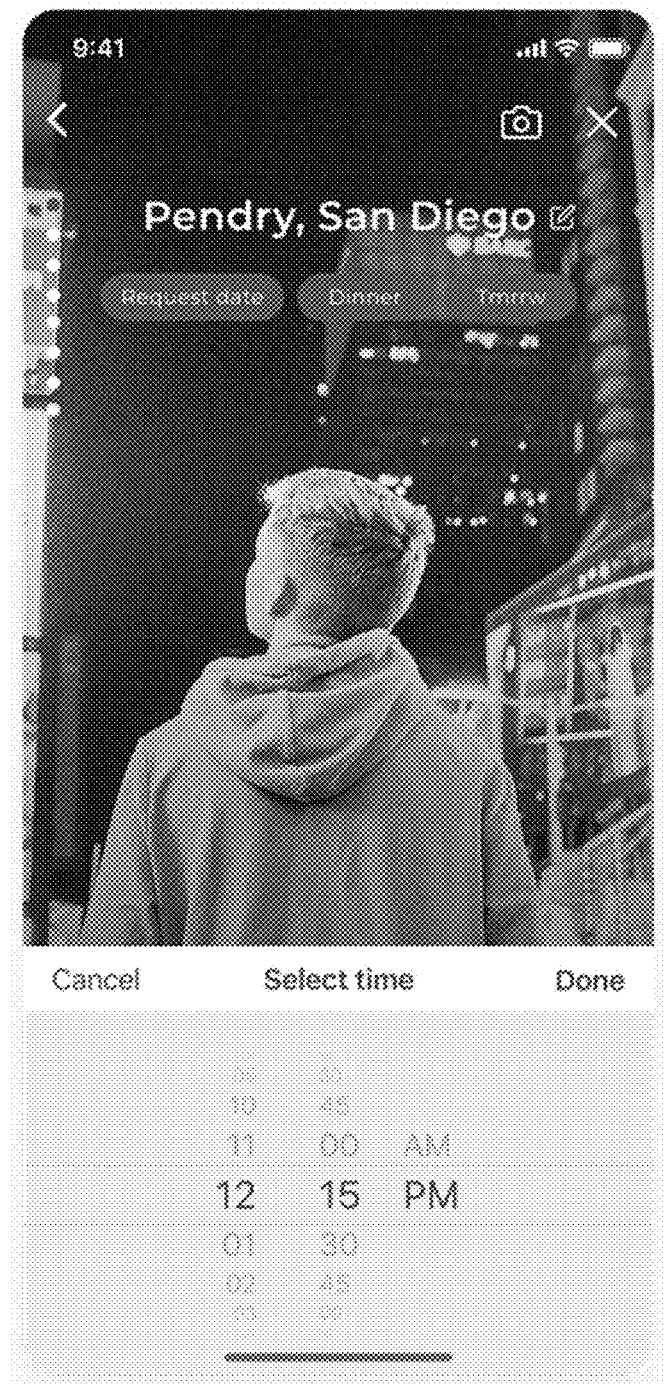
Figure 58:
Figure 59:
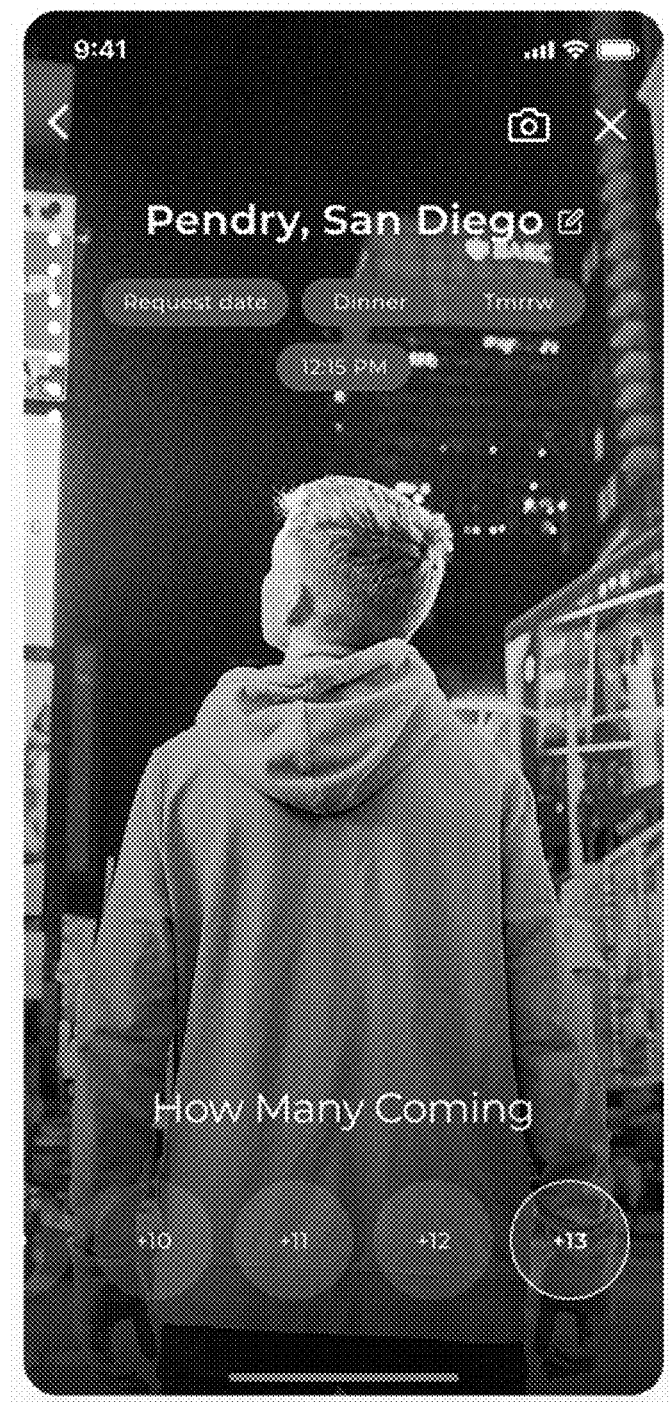
Figure 60:
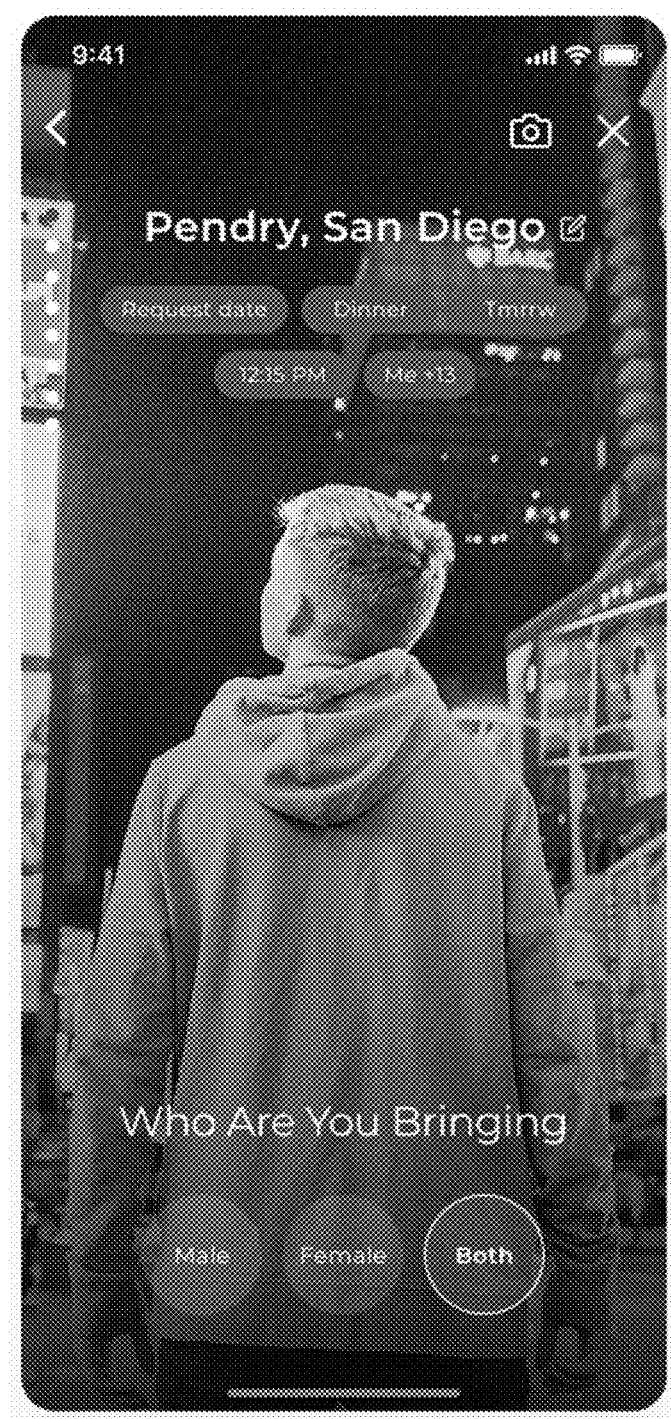
Figure 61:
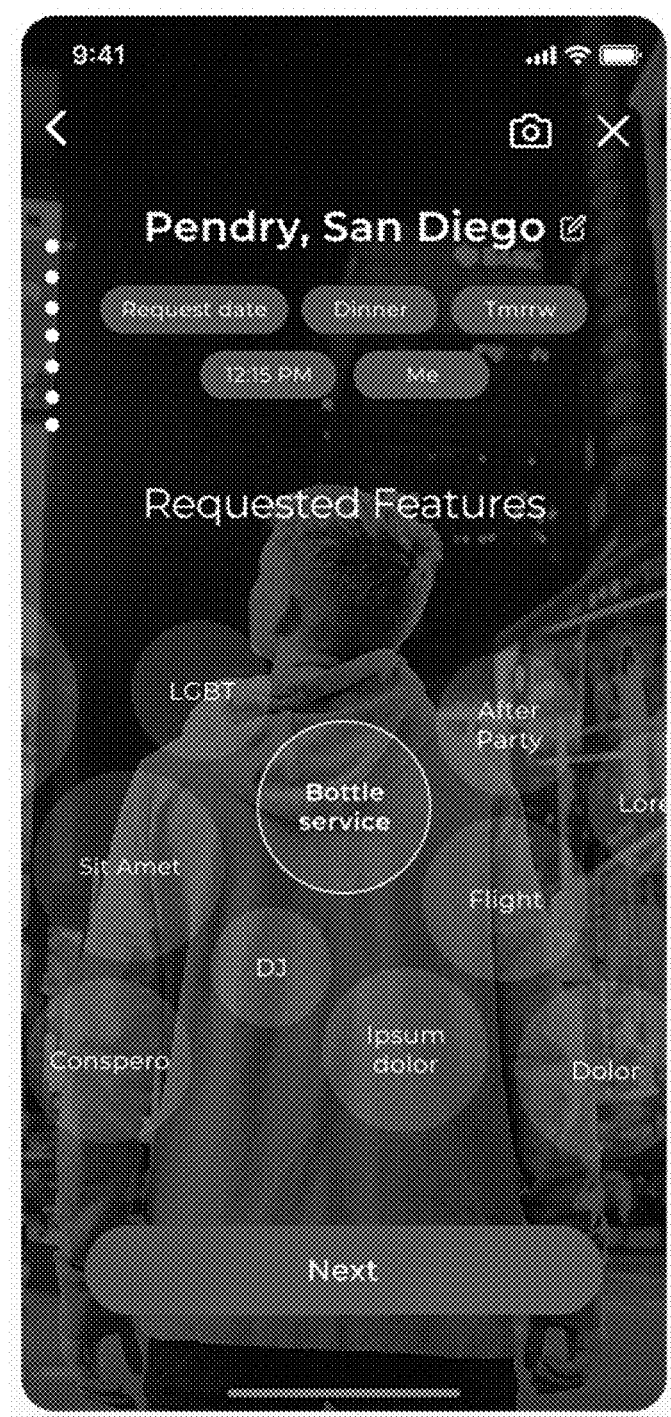
Figure 62:
Figure 63:
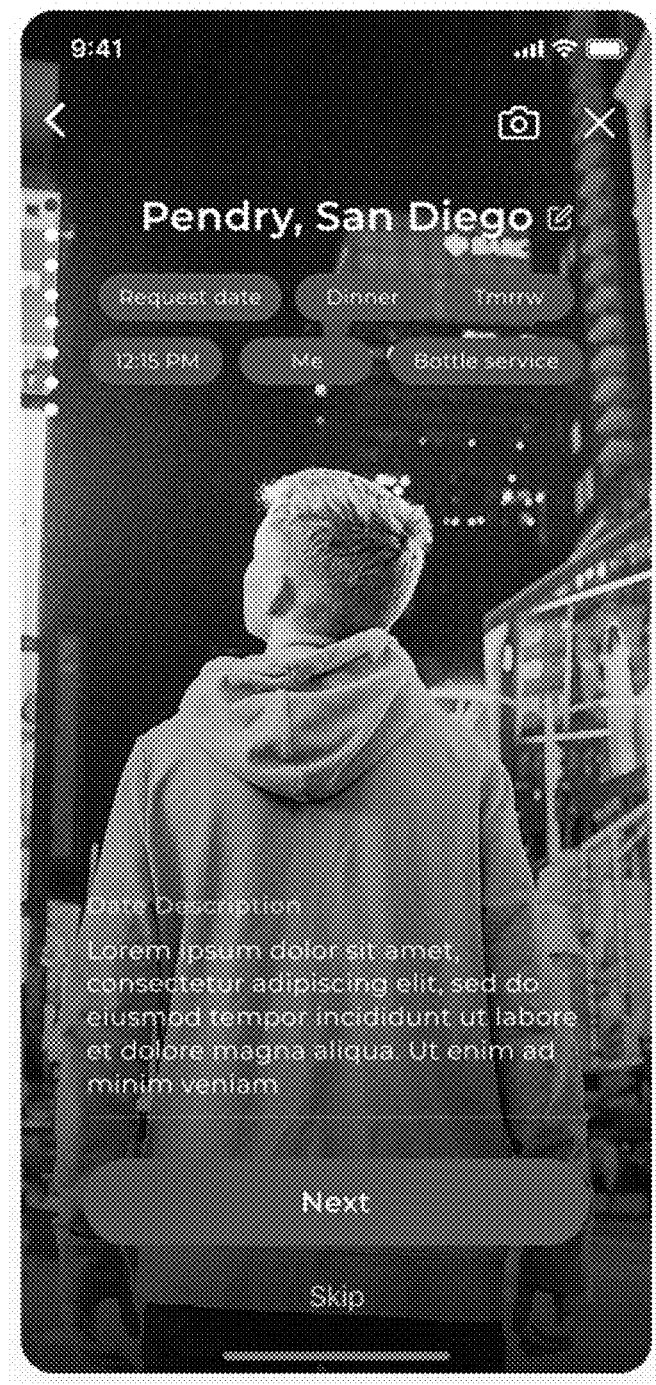
Figure 64:
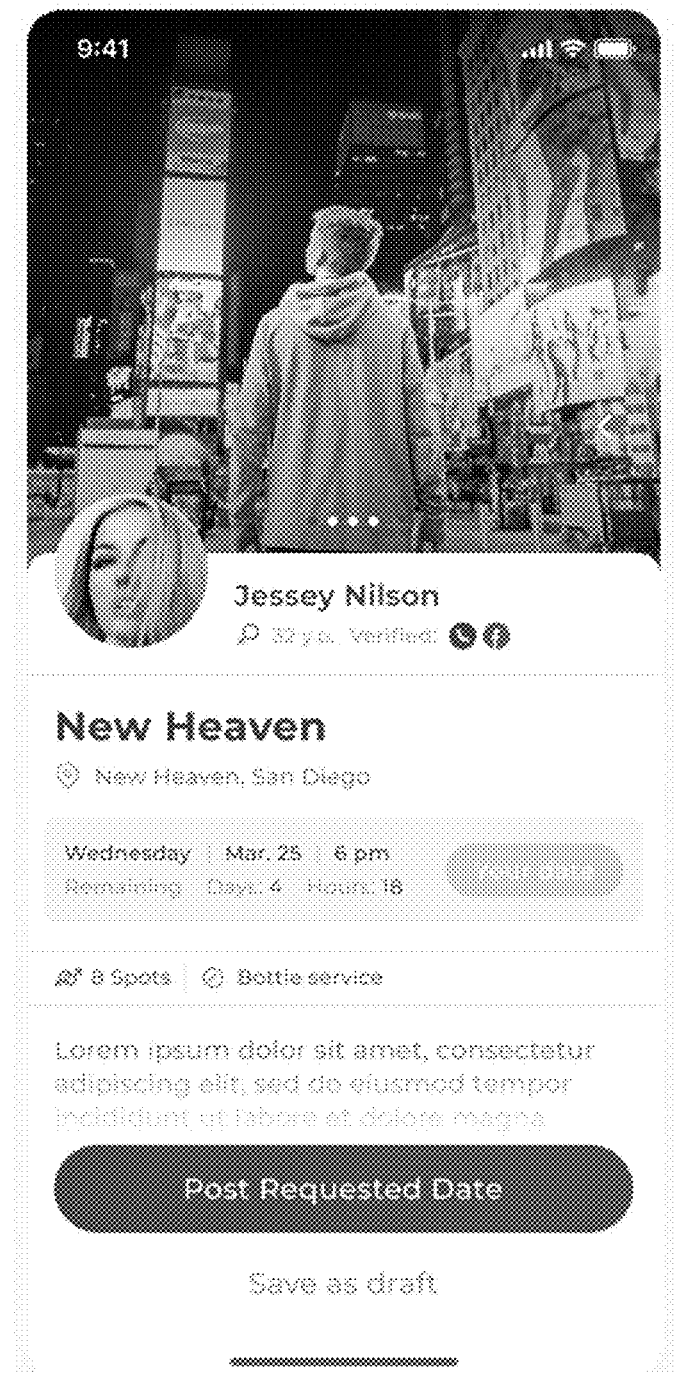
Figure 66:
Figure 67:
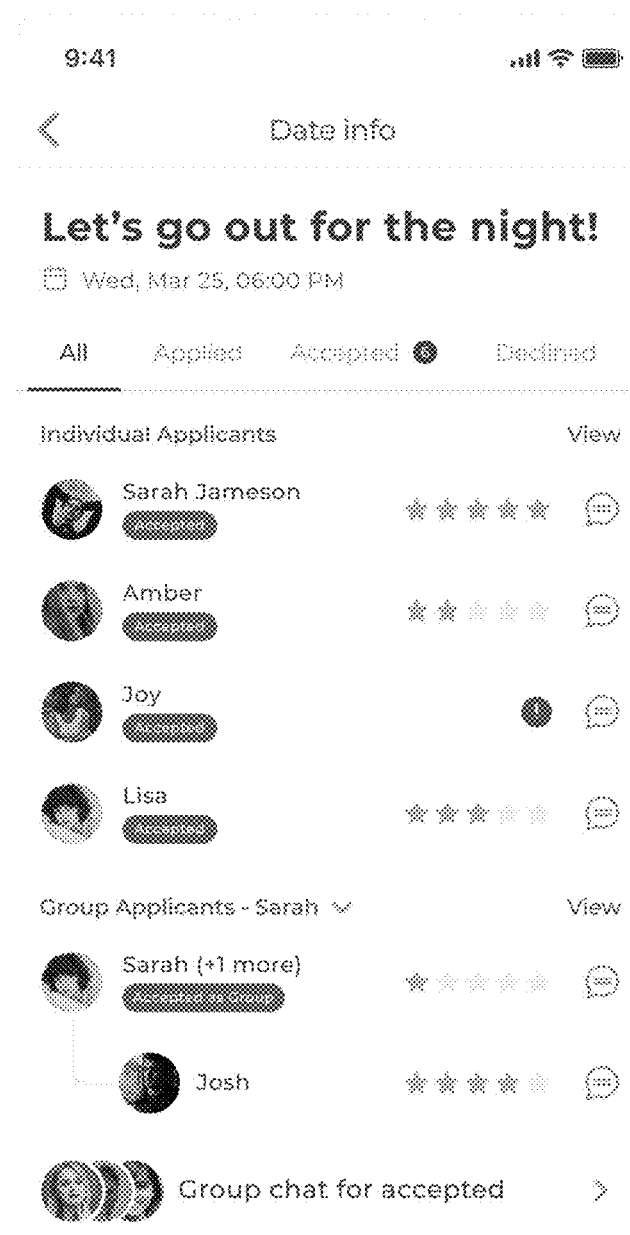

FIGS. 49-64 show non-limiting exemplary GUIs for configuring a requested group event. In some embodiments, if "user date" is selected in a date creation interface of FIG. 49, the user is prompted to select an requested event type per FIG. 50. In some embodiments, per FIG. 51, the requested event type comprises an active type, a brunch type, a concert type, an art type, a drink type, a festival type, a nightclub type, a sport type, an exercise type, a shopping type, a movie type, a hike type, a picnic type, a travel type, or any combination thereof. In some embodiments, the user can specify a location requested event by entering an address, placing a pinpoint on a map, or both. In some embodiments, the user can select to make the location private to non-confirmed attendees from viewing the location. In some embodiments, the user can add one or more photos of the location to instruct attendees on how to access the location. FIG. 52 shows an interface for capturing a location image via a camera, or in some embodiments, the user can choose, per FIG. 53, to select an image from the web. FIG. 54 shows an exemplary interface for displaying images from the web, wherein in some embodiments a selected image is edited per FIG. 55. In some embodiments, the web images for user selection are curated based on the requested event type, the requested event location, the user's profile, or any combination thereof. In some embodiments, per FIGS. 56-63, the user provides a date of the requested event, a time of the requested event, a feature of the requested event, a description of the requested event, a number of requested participants, a gender of requested participants, and whether the requested event is a group requested event or an individual requested event. In some embodiments, the date of the requested event can be selected and displayed on the requested event page as a Gregorian date (i.e., day/month/year) or as a shorthand (e.g., tmrrw, right now). Per FIG. 64, in some embodiments the requested event details are confirmed by the user before being requested.

Figure 65:
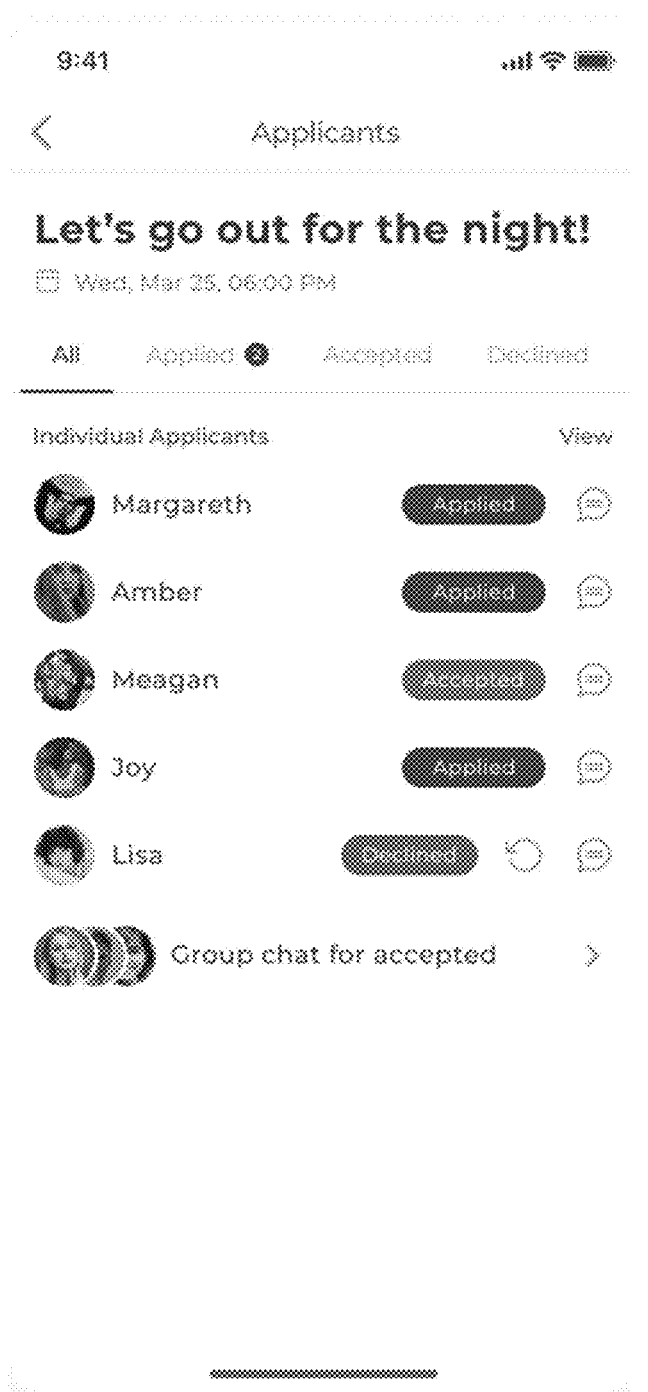

FIGS. 65-72 show non-limiting exemplary GUIs for managing applicants to an event. In some embodiments, a host or requester of an event is presented with a list of individual applicants, per FIG. 65, or a list of individual and group applicants, per FIG. 66, or only a list of group applicants. As shown, in some embodiments, the applicants can be filtered by, and are tagged as, applied, accepted or declined. In some embodiments, once an individual or group applies to join an event, they are either accepted or denied by the host or requestor. In some embodiments, the interface further allows the host or requestor to communicate with each applicant individually, and with all accepted applicants. As shown in FIG. 65, in some embodiments, the GUI includes a group chat feature for accepted applicants. In such embodiments, as individuals are accepted, the chat feature becomes available to them and they can chat about the event with the group of accepted applicants (and the host). In some embodiments, per FIG. 67, each group application can be expanded to show all applicants therein. Further, per FIG.

Figure 68:
Figure 69:
Figure 70:
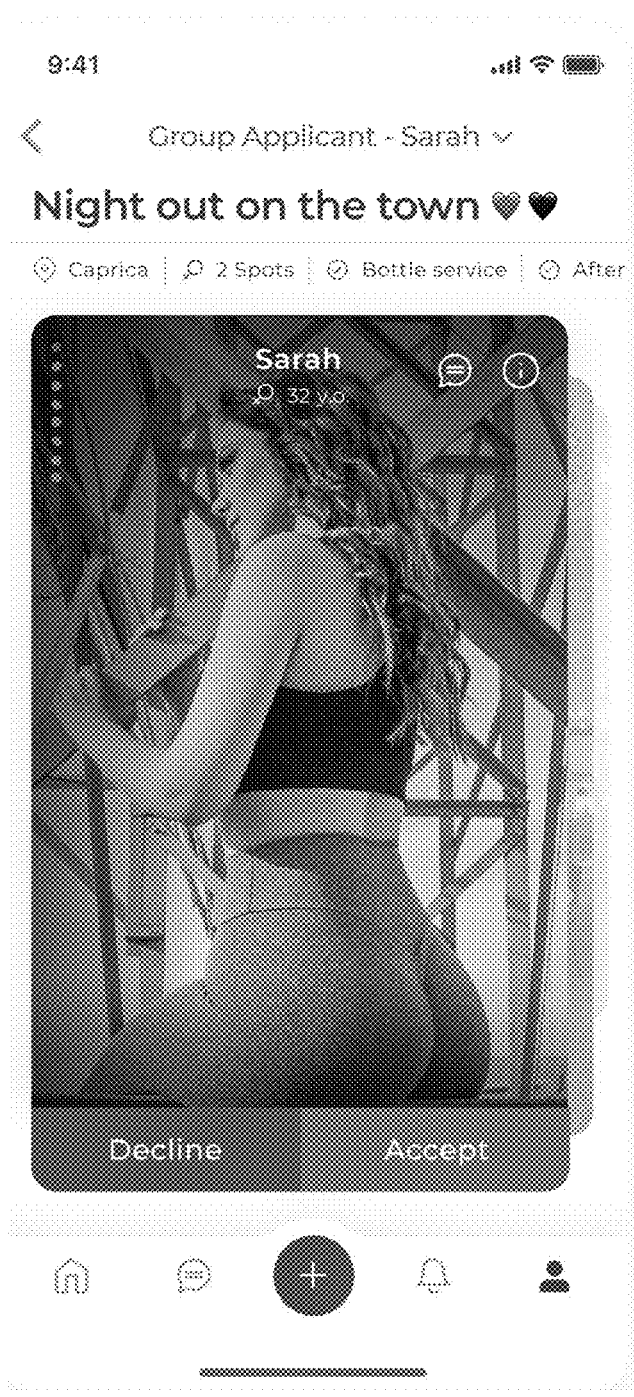
Figure 71:
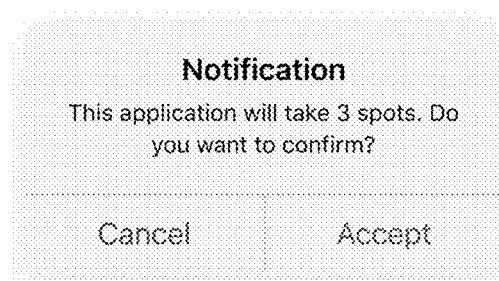
Figure 72:
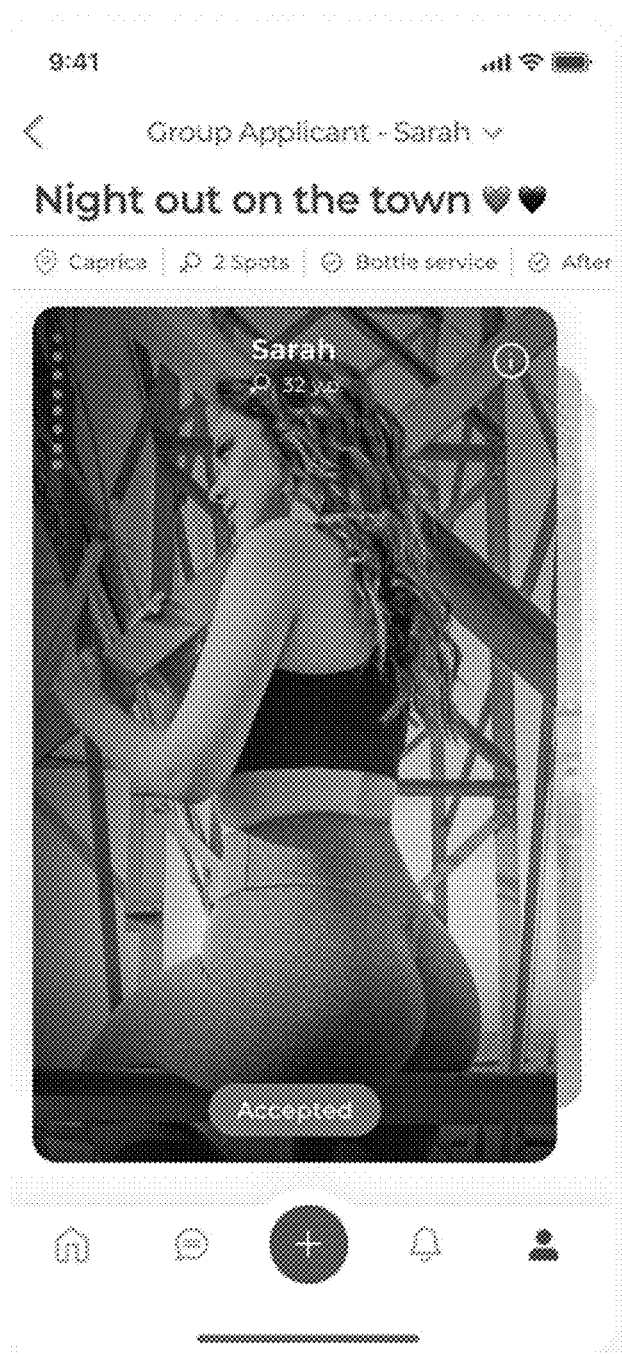

67, in some embodiments, each applicant is associated with an applicant rating of the event, a rating of the applicant by other applicants and/or the host, or both. FIGS. 68-69 show exemplary images of a message sent to an applicant. In some embodiments, as shown, a message sent to an applicant regarding the event displays properties of the event such as, for example, the name of the event, a location of the event, a number of spots available, and an event amenity.

Figure 82:
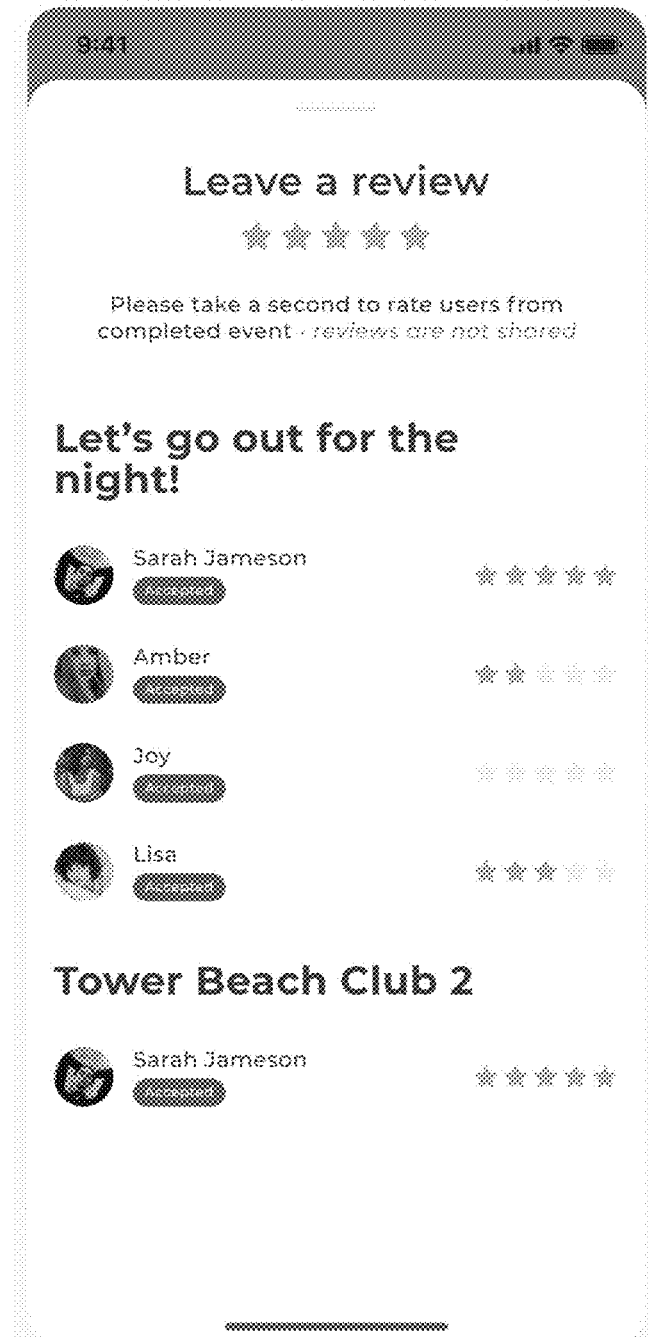
FIGS. 82-83 show non-limiting exemplary GUIs; in this case, GUIs including features for providing reviews pertaining to completed events.
Figure 83:
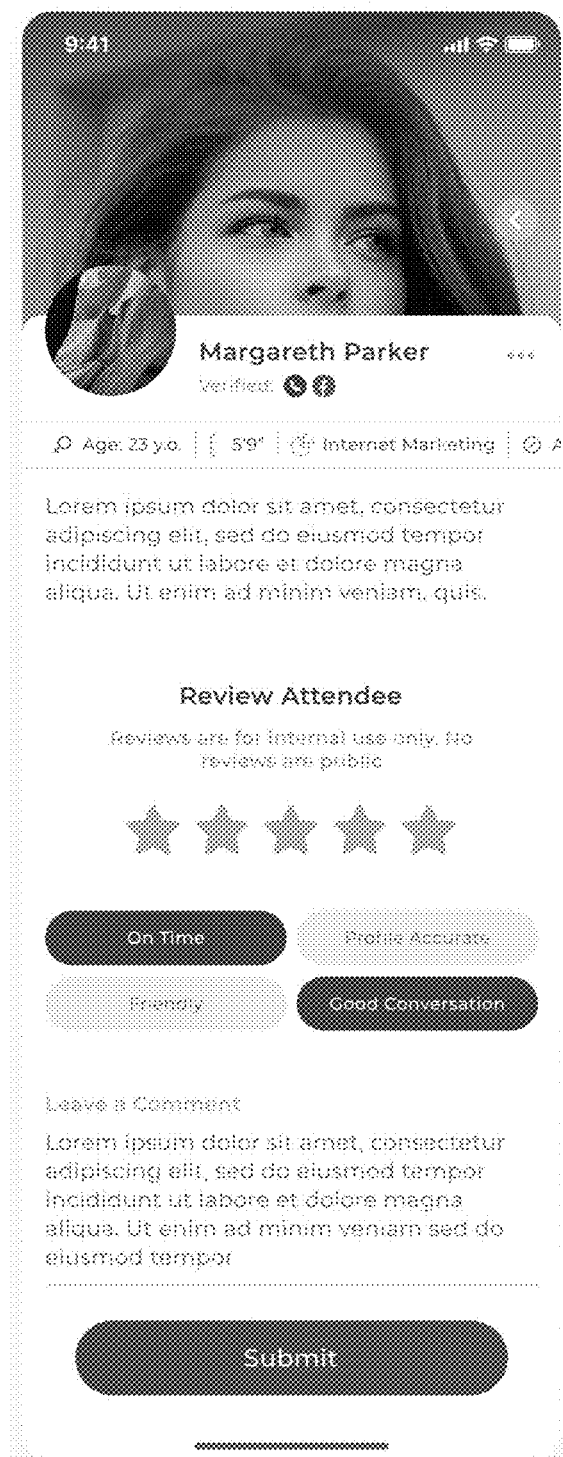

FIGS. 82-83 show non-limiting exemplary GUIs for providing reviews pertaining to completed events. In some embodiments, the review is shared with the reviewed user. In some embodiments, the review is not shared with the reviewed user. In some embodiments, the review is anonymous. In some embodiments, per FIG. 83, an attendee can be reviewed based on their being on time, having an accurate profile, being friendly, being a good conversationalist, or any other social characteristic.

Private Events

FIGS. 86-92 show non-limiting exemplary GUIs for configuring a private event.

Figure 86:
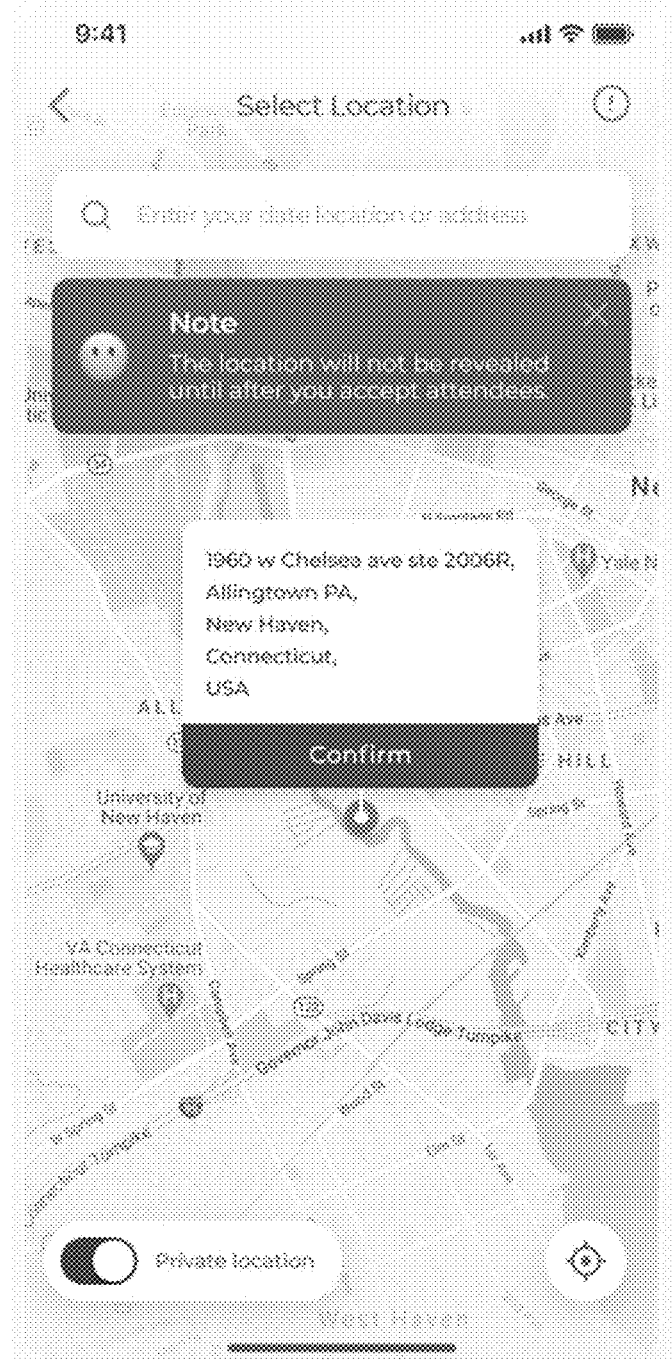
FIGS. 86-92 show non-limiting exemplary GUIs; in this case, GUIs including features for configuring a private event.
Figure 87:
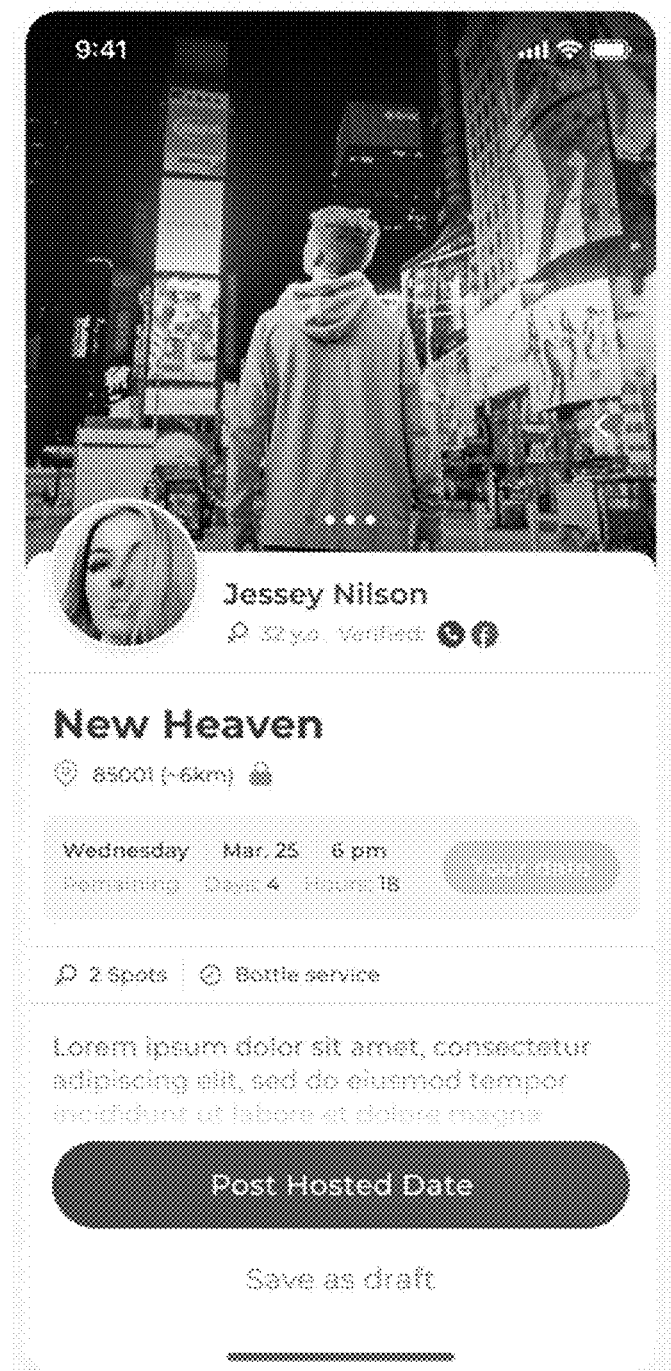
Figure 88:
Figure 89:
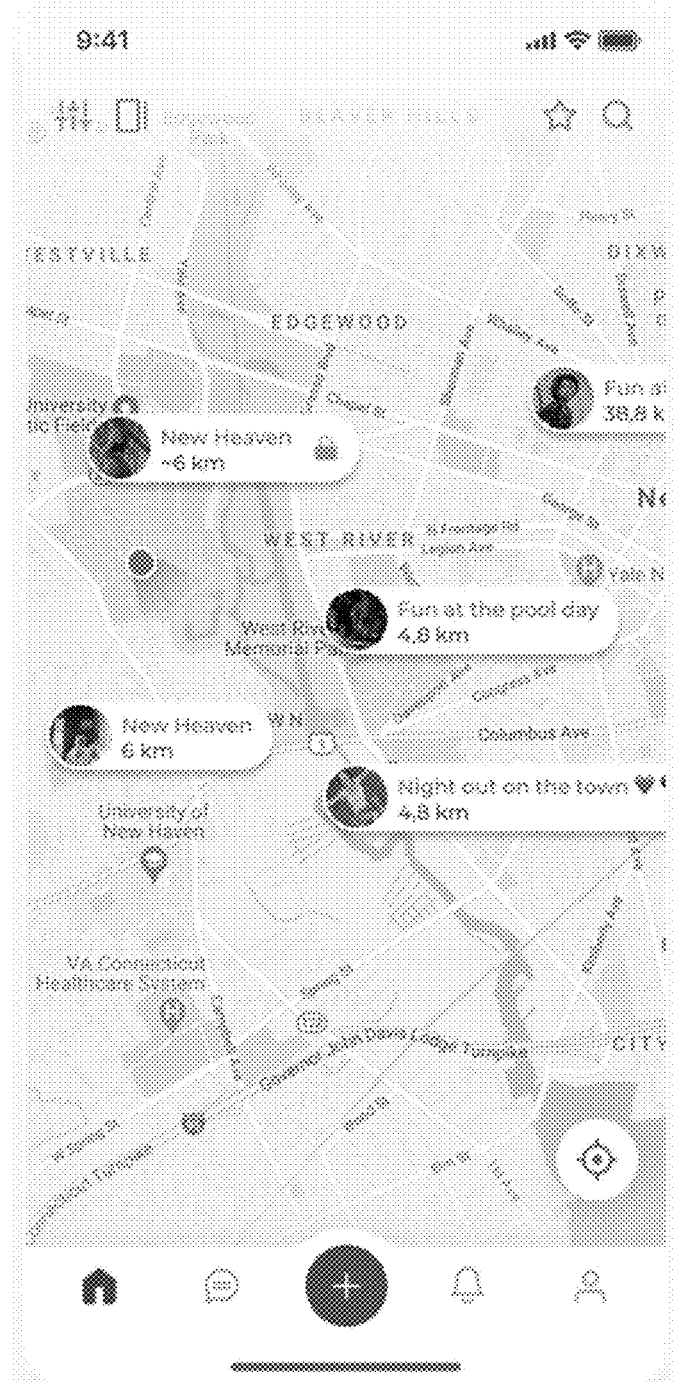
Figure 90:
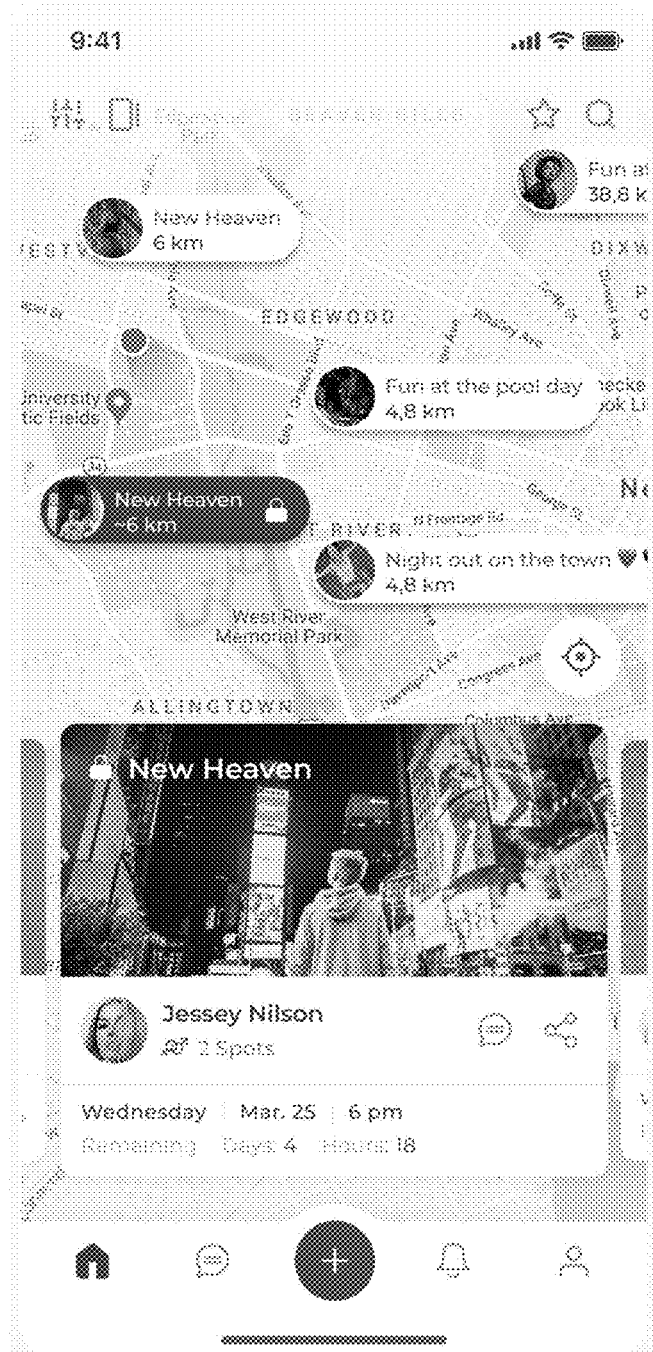
Figure 91:
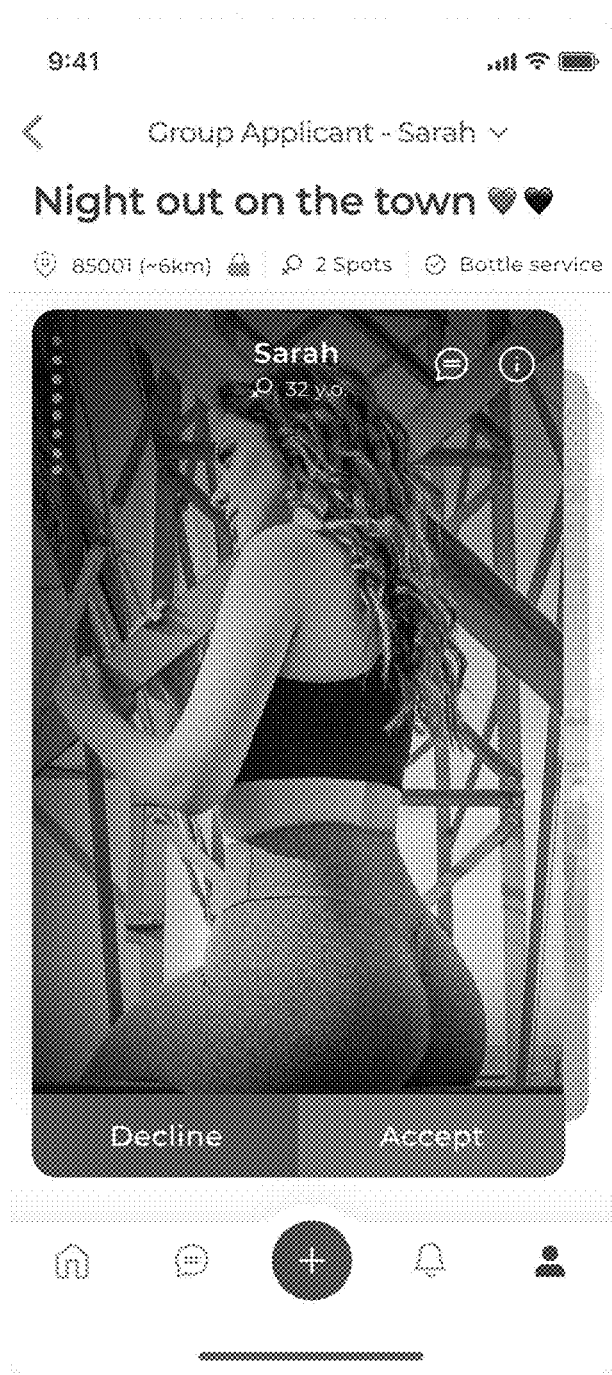
Figure 92:
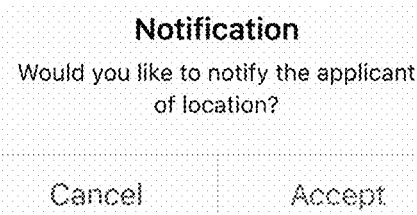

As seen in FIG. 86, when selecting a location for a private event, the location is not revealed until an applicant is accepted to the event by the host or requester. FIGS. 87 and 88 show an exemplary interface for a private event, wherein only a zip-code is displayed as the location and wherein a distance from a user to the event is shown as being approximate (for example with a character). FIG. 89 shows that, in some embodiments, a plurality of events are displayed on a map, wherein each event displays a thumbnail image of the event, the title of the event, a general location of the private. and a distance from a current location (denoted by the blue mark). In some embodiments, per FIG. 90, selecting an event on the map of FIG. 89 displays a popup with a larger version of the event's image, the name and picture of the host, an indication that two spots are available regardless of gender, that the event is on Wednesday March 25 at 6:00 pm and will begin in 4 days and 18 hours, and offers interfaces to contact the host, share the event, or both. Per FIGS. 91 and 92, in some embodiments, once the event host or requester accepts an applicant, a notification is provided confirm sharing of the location with the applicant.

Additional Features for Event-Centric Matching

Figure 28:
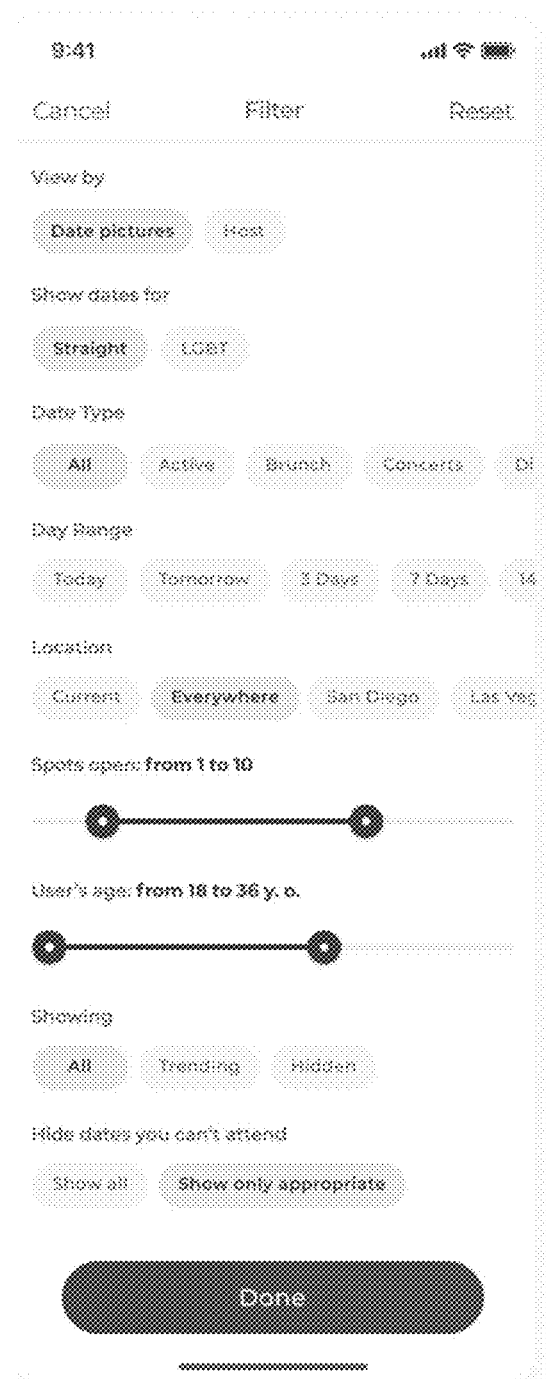
FIGS. 28-30 show non-limiting exemplary GUIs; in this case, GUIs including features for using filters to discover relevant events.
Figure 29:
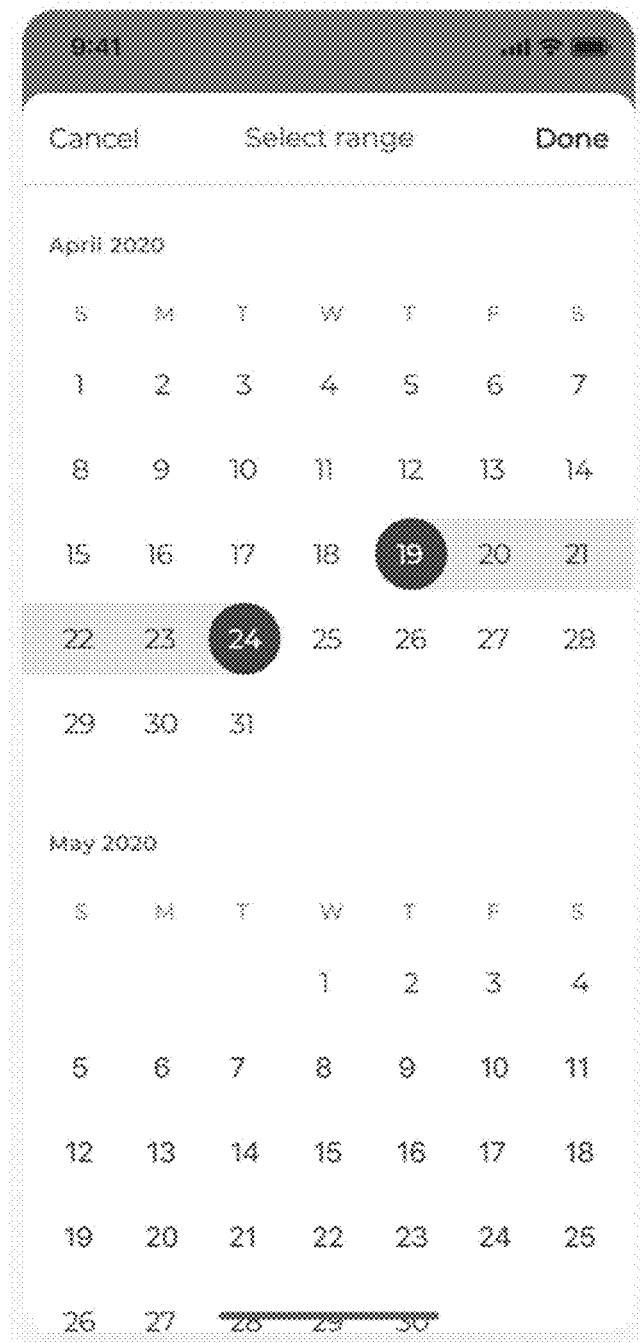
Figure 30:
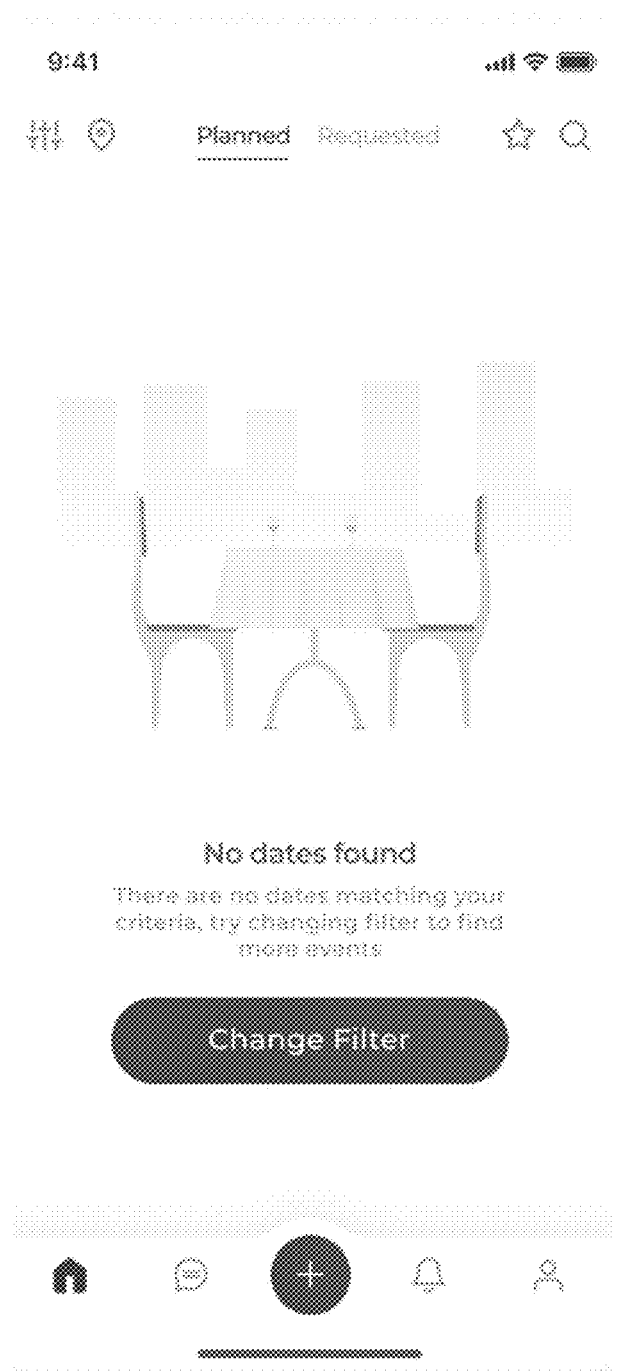

FIGS. 28-30 show non-limiting exemplary GUIs for using filters to discover relevant events. In some embodiments, per FIG. 28, a user can filter events by straight or LGBT status, event type, day range, location, number of spots, user age, or any combination thereof. In some embodiments, the event type comprises an active type, a brunch type, a concert type, an art type, a drink type, a festival type, a nightclub type, a sport type, an exercise type, a shopping type, a movie type, a hike type, a picnic type, a travel type, or any combination thereof. Further as shown, in some embodiments, the user can select to display events by the date picture or the host's picture, to display all, trending, or hidden events, to show all events or only appropriate events, or any combination thereof. Further, per FIG. 29, the user can search for events in a given time range, and receives a notification if no such events are available and enables the user to change the filter accordingly, as shown in FIG. 30.

Figure 31:
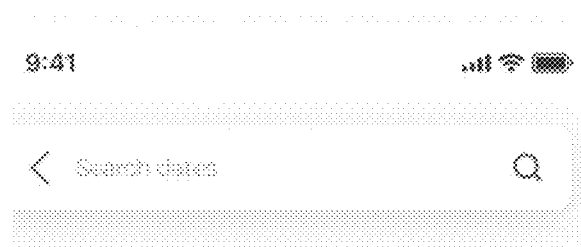
FIGS. 31-33 show non-limiting exemplary GUIs; in this case, GUIs including features for using searches to discover relevant events.
Figure 32:
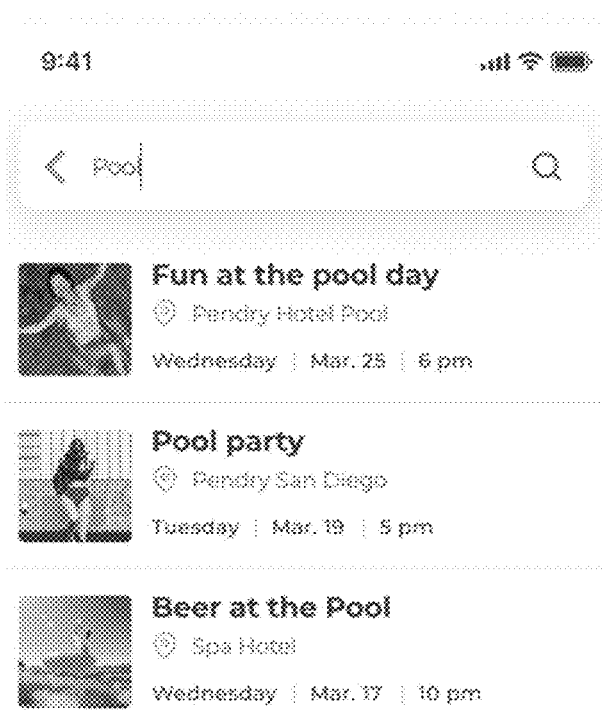
Figure 33:
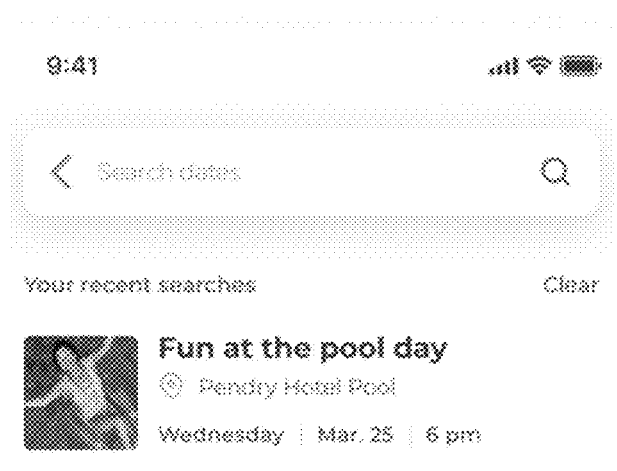

FIGS. 31-33 show non-limiting exemplary GUIs for using searches to discover relevant events. Per FIG. 31, in some embodiments, a search page allows a user to search dates by keywords, titles, hosts, locations, or any combination thereof. FIG. 32 shows an example search for the term "pool" which returns three events, wherein each event has the word "pool" in the title. Per FIG. 33, in some embodiments, the GUI presents a user with recent searches and/or recently viewed events based on previous searches.

Figure 34:
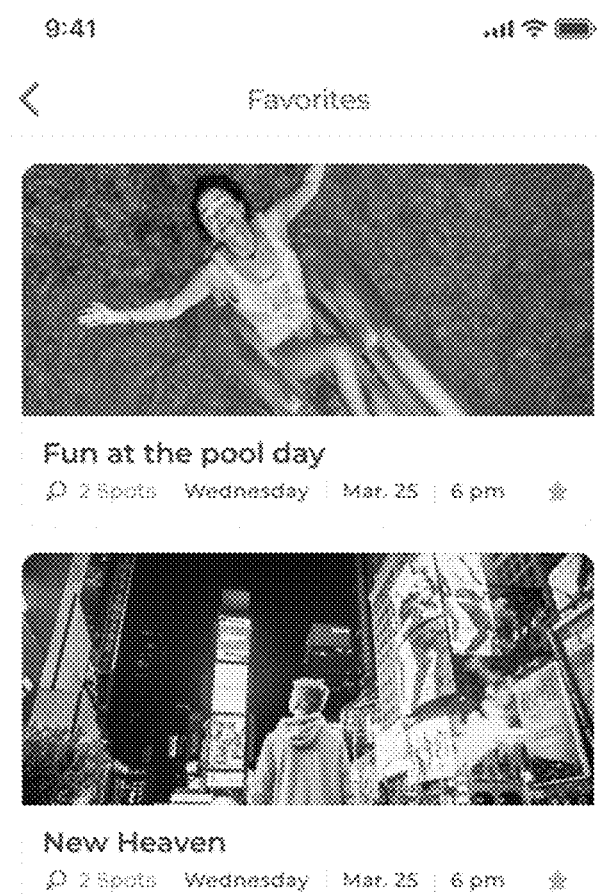
FIGS. 34-35 show non-limiting exemplary GUIs; in this case, GUIs including features for using favorites to organize events.
Figure 35:
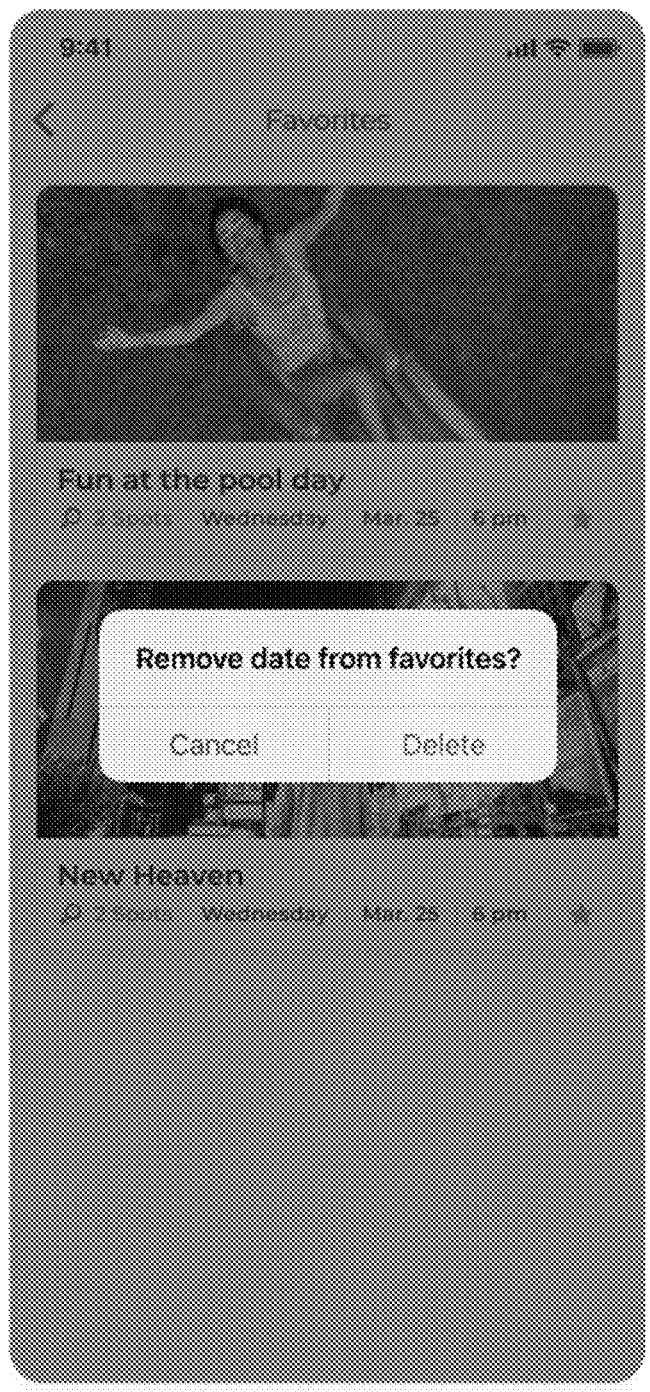

FIGS. 34-35 show non-limiting exemplary GUIs for using favorites to organize events. FIG. 34 shows an exemplary interface for viewing favorite events, wherein each favorite event is displayed as the event image, the number of available spots, the day, the date, the time, and a star icon indicating that that event has been marked as a favorite event. In some embodiments, the favorite event is a future event. In some embodiments, the favorite event is a past event. Further, in some embodiments, per FIG. 35, the user removes an event from their favorites by taping the star icon, and receives a confirmation request to remove the favorite event.

Notifications and Messaging

Figure 73:
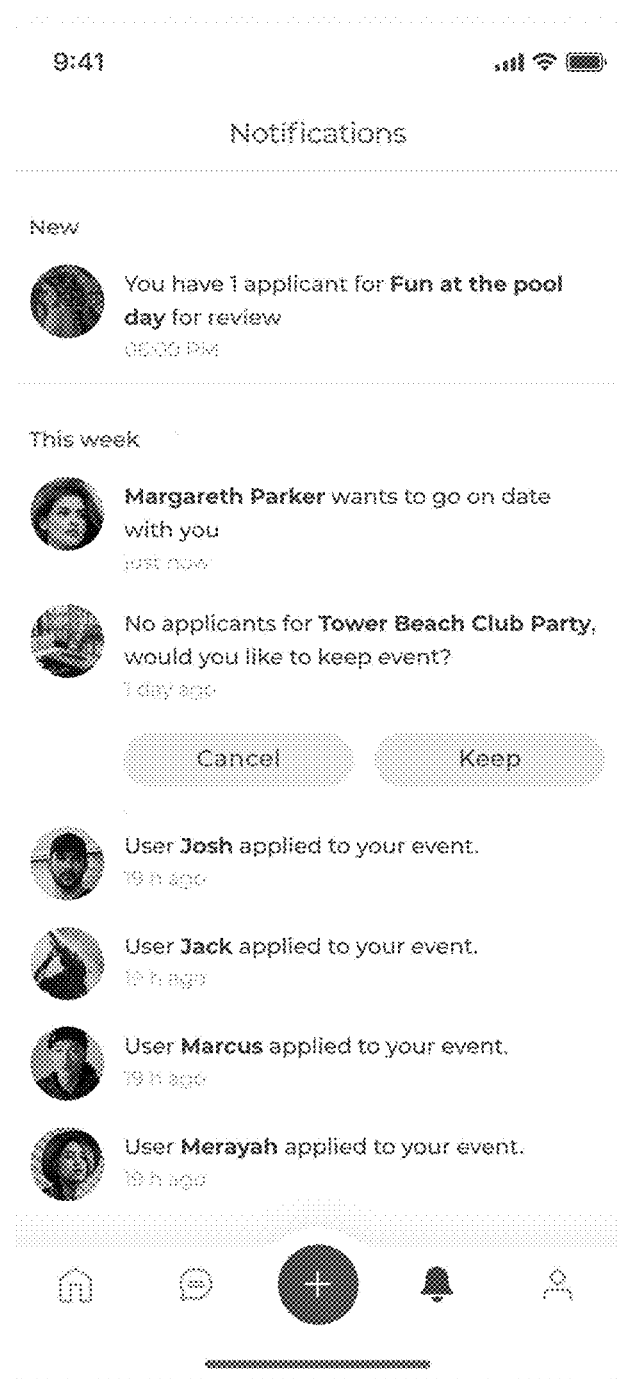
FIG. 73 shows a non-limiting exemplary GUI; in this case, a GUI including features for providing notifications.

FIG. 73 shows a non-limiting exemplary GUI. in this case, a GUI including features for providing notifications. As shown, in some embodiments, the notification alerts a user of a new applicant to their hosted or requested event, a new date request, a query to keep or cancel a hosted/requested event with no current applicants, a notification that a hosted/requested event has been favorited, a notification that an application to their hosted/requested event has been withdrawn, a notification that a requested host has been confirmed, or any combination thereof.

FIGS. 76-79 show non-limiting exemplary GUIs for conducting messaging with other users. As shown, per FIGS. 76-77, in some embodiments, each message preview displays an icon and name of the user being messaged, at least a portion of the text of the message, and which event the message pertains to. In some embodiments, per FIG. 78, each message shows a read or unread status and an indication of which event the message pertains to. Further, in some embodiments, a user can modify the notification settings, per FIG. 79, for each message. In some embodiments, a message is transmitted between only two people. In some embodiments, a message is transmitted between a plurality of users.

Figure 80:
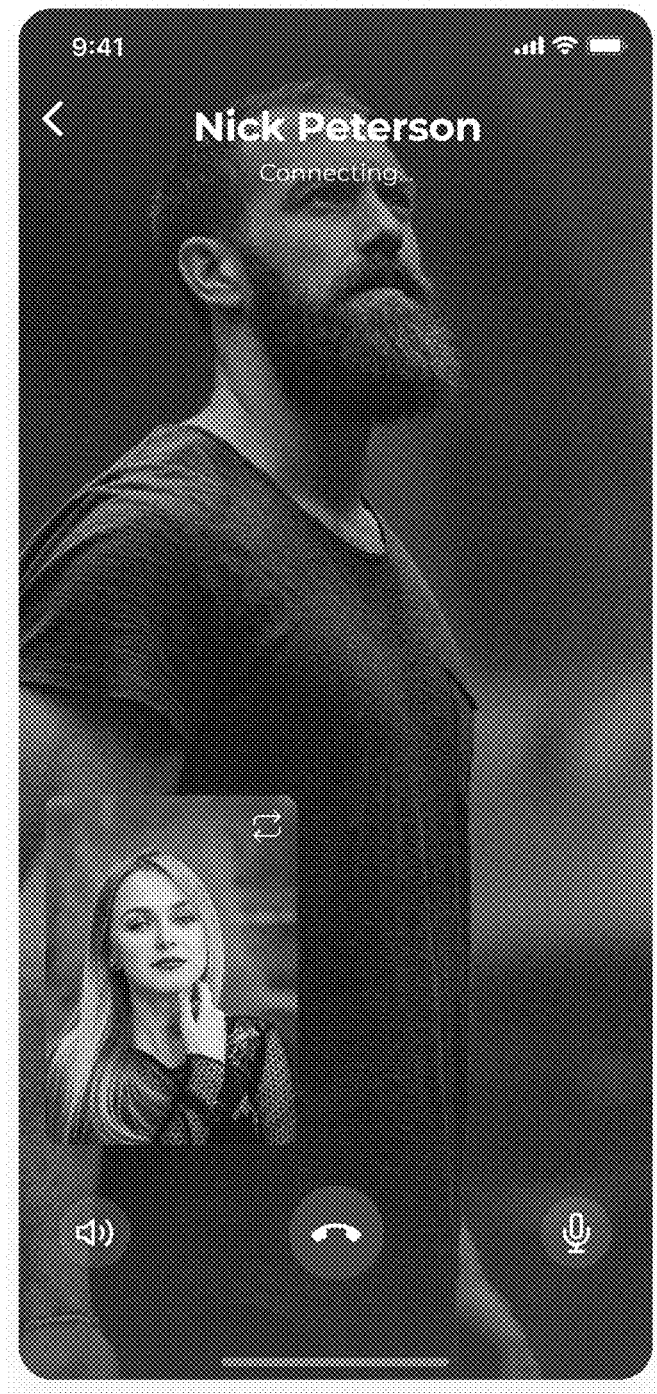
FIGS. 80-81 show non-limiting exemplary GUIs; in this case, GUIs including features for conducting audio and/or video messaging with other users.
Figure 81:

FIGS. 80-81 show non-limiting exemplary GUIs for conducting audio and/or video messaging with other users, wherein in some embodiments, each user's profile picture is displayed during the audio and/or video message.

Privacy Data Escrow

Provided herein are platforms, methods, and applications for exchanging escrowed data between multiple users by use of a multi-stage "privacy handshake" procedure. The platforms, methods, and applications described herein allow users to meet and interact without exchanging sensitive contact information. The text chat and video chat features described herein allow users to communicate freely without any contact information risk, reducing any hesitancy to engage with others. FIGS. 76-81 show non-limiting exemplary including features for conducting audio and/or video messaging with other users.

Described herein, in certain embodiments, are platforms for exchanging escrowed data between multiple users while preserving privacy. In some embodiments, the platform comprises at least one mobile device and at least one server.

In some embodiments, the at least one mobile device comprises at least one mobile processor configured to provide a mobile application. In some embodiments, the mobile application comprises: a touchscreen interface configured for a user to enter data; a software module accessing a GPS feature of the mobile device to determine a location; a software module transmitting the data and the location, to a remote escrow exchange server via a computer network.

In some embodiments, at least a portion of the data is marked as public data and at least a portion of the data is marked as private data. In some embodiments, the mobile application further comprises a software module stripping the entered data of embedded information identifying the user.

In some embodiments, one or more of a user's name, likes, occupation, description, education, gender, age, height, identification, social connections, phone number, or email address, can be marked by the user as private data. In some embodiments, one or more of a user's name, likes, occupation, description, education, gender, age, height, identification, social connections, phone number, or email address can be marked by the user as public data. In some embodiments, the user can mark a portion of their private data as public to their confirmed friends and/or connections. In some embodiments, the user can mark a portion of their private data as public to other users attending the same event, or that have attended the same event. In some embodiments, the user can mark a portion of their private data as public to their confirmed friends and/or connections. In some embodiments, the user can mark a portion of their private data as public to other that have attended the same event once the event has started.

In some embodiments, one or more of the activity type, date, time, accepted members, accepted groups of an event can be marked as private by the host, the event requestor, or both. In some embodiments, one or more of the activity type, date, time, accepted members, accepted groups of an event can be marked as public by the host, the event requestor, or both. In some embodiments, one or more of the activity type, date, time, accepted members, accepted groups of an event can be marked as private until the event starts by the host, the event requestor, or both. In some embodiments, one or more of the activity type, date, time, accepted members, accepted groups of an event can be marked as public until the event starts by the host, the event requestor, or both.

Per FIG. 2B, in some embodiments, only a user that is accepted to an event receives the activity type, date, time, accepted members, the accepted groups, or any combination thereof.

In some embodiments, the at least one server comprises a secure storage device comprising at least one server processor configured to provide an escrow exchange server application. In some embodiments, the escrow exchange server application comprises: a software module storing the public data and the private data in escrow at the secure storage device; a software module applying an algorithm to match the user to at least one other user based on the location, the stored public data, and the stored private data; and a software module conducting electronic communications with the at least one mobile device via the computer network to conduct a process comprising: pushing the user's public data to the at least one other user matched; receiving a request from the at least one other user to access the user's private data; notifying the user of the request to access their private data; and receiving a signal from the user accepting or rejecting the request to access their private data. In some embodiments, the escrow exchange server application further comprises a software module pushing via the computer network, if the user accepts the request to access their private data, an electronic transmission of the user's private data to the at least one other user.

In further embodiments, one or more features of the platform are restricted unless and until the user accepts the request to access their private data. In still further embodiments, the one or more features of the platform comprise messaging or data exchange between the user and the at least one other user matched. In various embodiments, the messaging comprises text messaging, audio messaging, video messaging, image exchange, document exchange, location exchange, or a combination thereof. In particular embodiments, the one or more features of the platform comprise the location. By way of example, a user can exchange in-app asynchronous messages (e.g., text messages) with others without being granted access to their private data. By way of further example, in-app synchronous messaging (e.g., voice or video calls) is a restricted feature of the platform and a user can exchange synchronous messages with others only after being granted access to their private data. In particular embodiments, applying to host an event and being accepted as host constitutes a grant of access to the private data of the host, the attendee, or both. In particular embodiments, applying to host a attend a hosted event and being accepted as an attendee constitutes a grant of access to the private data of the attendee, the host, or both.

Also described herein, in certain embodiments, are methods for exchanging escrowed data between users while preserving privacy. In some embodiments, the method comprises: receiving, at a remote escrow exchange server via a computer network, data entered by a user via a touchscreen interface of a mobile device and a location determined by accessing a GPS feature of the mobile device; marking, by the remote escrow exchange server, at least a portion of the data as public data and marking at least a portion of the data as private data; storing, by the remote escrow exchange server, the public data and the private data in escrow at a secure storage device; applying, by the remote escrow exchange server, an algorithm to match the user to at least one other user based on the location, the stored public data, and the stored private data; and conducting, by the remote escrow exchange server, electronic communications via the computer network to conduct a process comprising: pushing the user's public data to the at least one other user matched; receiving a request from the at least one other user to access the user's private data; notifying the user of the request to access their private data; and receiving a signal from the user accepting or rejecting the request to access their private data. In some embodiments, one or more of a user's name, likes, occupation, description, education, gender, age, height, identification, social connections, phone number, or email address, can be marked by the user as private data except to other users that the user has accepted their request for the private data. In some embodiments, a user can prevent other people from messaging them unless the other person's request has been accepted.

In some embodiments, the method further comprises stripping, by the remote escrow exchange server, the entered data of embedded information identifying the user. In some embodiments, the method further comprises pushing, by the remote escrow exchange server via the computer network, if the user accepts the request to access their private data, an electronic transmission of the user's private data to the at least one other user. In further embodiments, one or more features of the mobile device are restricted unless and until the user accepts the request to access their private data. In still further embodiments, the one or more features comprise messaging or data exchange between the user and the at least one other user matched. In various embodiments, the messaging comprises text messaging, audio messaging, video messaging, image exchange, document exchange, location exchange, or a combination thereof. In particular embodiments, the one or more features of the mobile device comprise the location.

Figure 93:
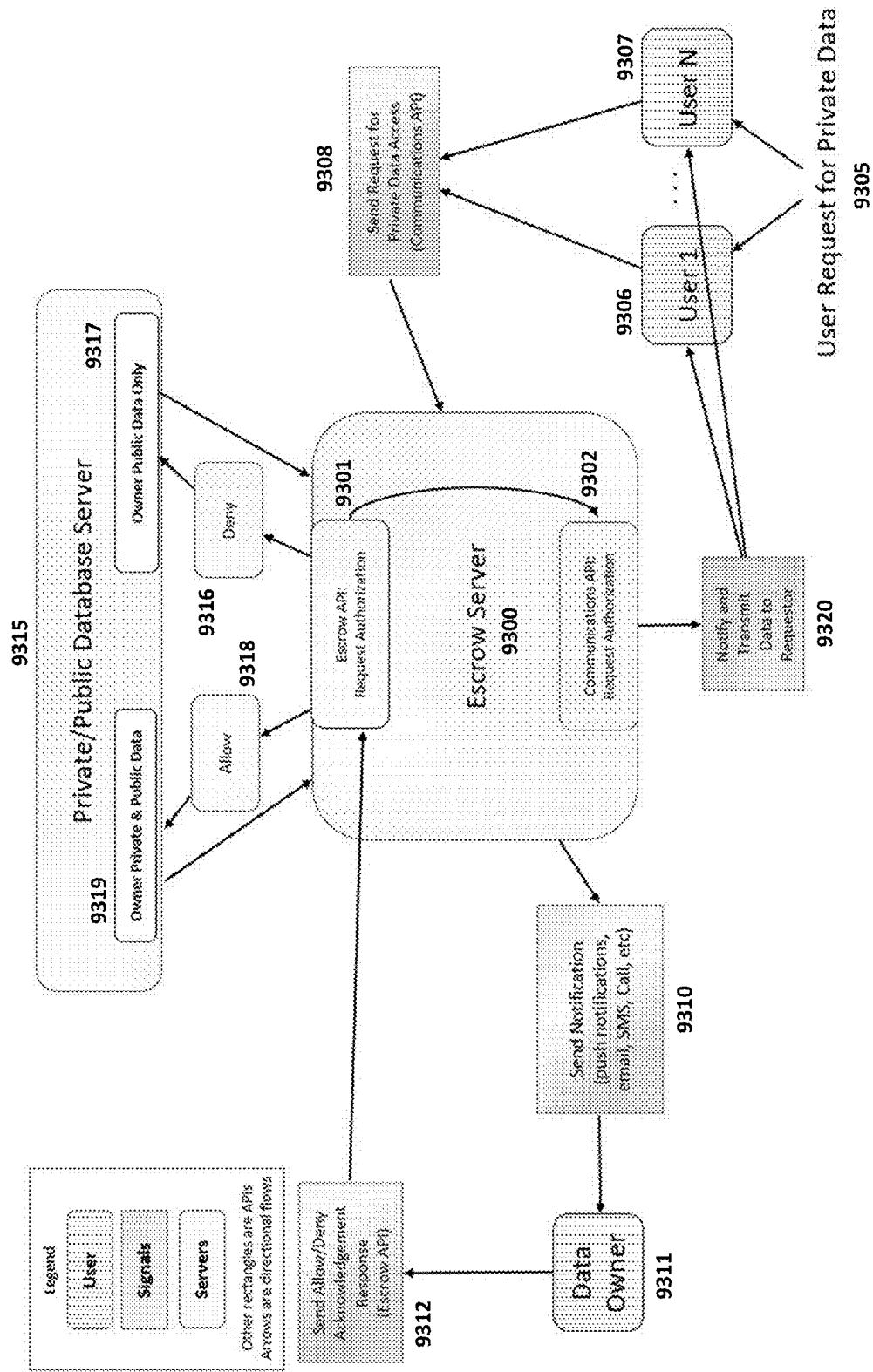
FIG. 93 shows a non-limiting example of an architecture diagram; in this case, an architecture for providing the platforms, systems, and methods for exchanging escrowed data between multiple users while preserving privacy described herein.

FIG. 93 shows a non-limiting example of an architecture diagram for providing the platforms, systems, and methods for exchanging escrowed data between multiple users while preserving privacy described herein. As shown in FIG. 93, exchange of escrowed data between users is suitably handed by a data escrow server 9300 comprising a communications API 9302 and an escrow API 9301. In this example, the data escrow server 9300 is in communication with a database server 9315 storing public and private user data. Further in this example, a user may request private data 9305 of one or more other users, for example User 1 9306-User N 9307. A request for private data access 9308 is sent to the communications API 9302 of the escrow server 9300. The escrow server 9300 sends a notification 9310 to the data owner 9311, by for example, push notification to an application such as a mobile application, SMS, MIMS, phone call, voice mail, and the like. Upon notification, the data owner 9311 optionally sends an acknowledgement response 9312 to the escrow API 9301 of the escrow server 9300 allowing or denying the request (or interacts with a presented GUI to allow or deny the request). As shown in the example of FIG. 93, if the request is denied 9316, the database server 9315 will return only public data 9317 of the data owner 9311. Conversely, if the request is allowed 9318, the database server 9315 will return both private and public data 9319 of the data owner 9311. Finally, in this example, the escrow server 9300 sends a notification to the requesting user 9320 and optionally transmits the requested data.

Exemplary Implementation

Figure 94:
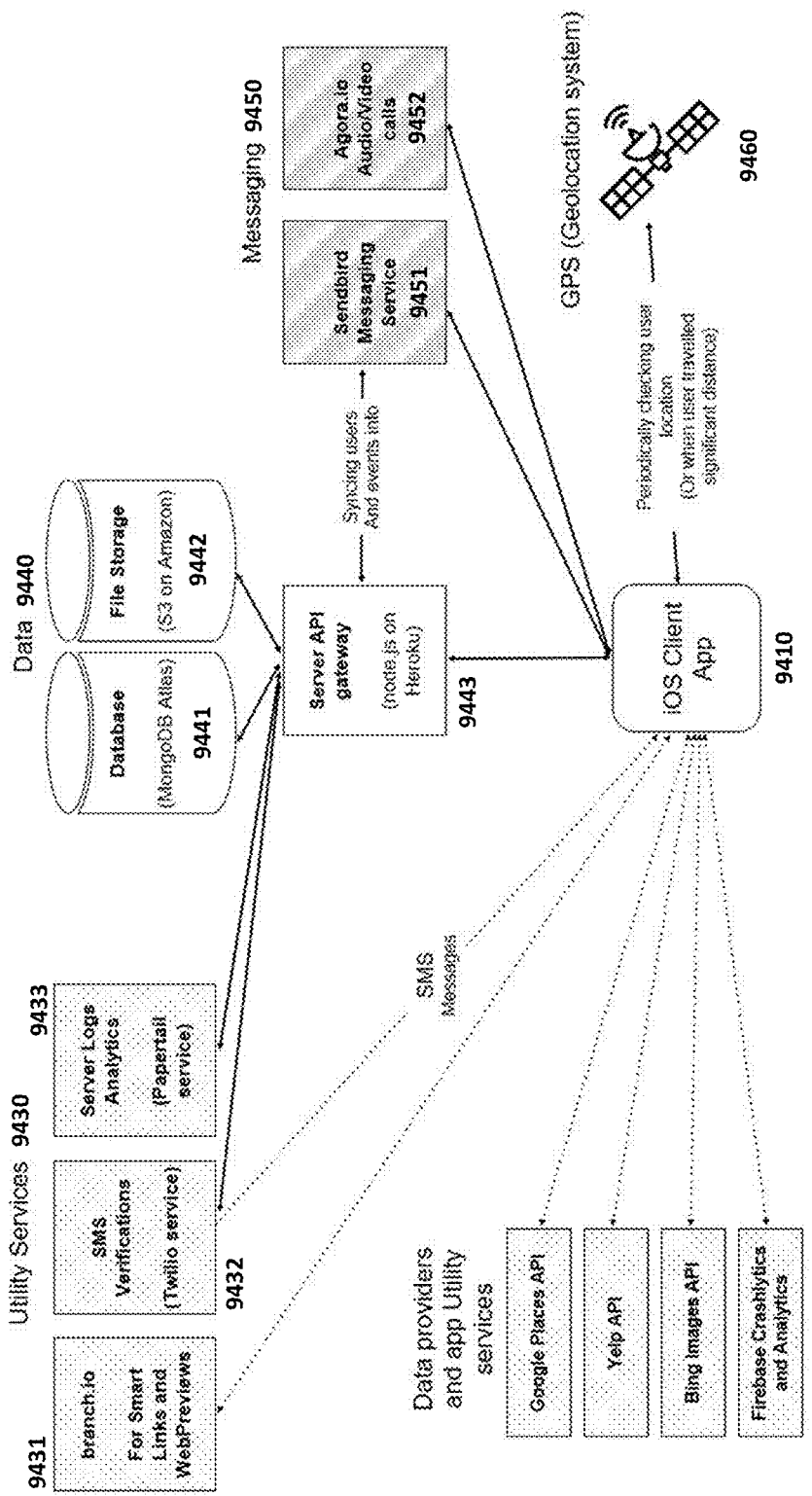
FIG. 94 shows a non-limiting example of a high-level architecture diagram; in this case, an architecture for providing the platforms, systems, and methods for event-centric matching and exchanging escrowed data described herein.

FIG. 94 shows a non-limiting example of a high-level architecture diagram for providing the platforms, systems, and methods described herein. As shown, in some embodiments, the client application 9410 transmits and receives data to and from an app utility service 9420 via an application programming interface, transmits and receives SMS messages to and from at least a portion of a utility service 9430, transmits and receives stored data to and from at least a portion of a data storage 9440, transmits and receives messaging from a messaging service 9450, and transmits and receives a position data to and from a geolocation system 9460.

As shown, in some embodiments, exemplary app utility services 9430 comprise a Google Places API, a Yelp API, a Bing Images API, a Firebase Crashlytics and Analytics API, or any combination thereof. Further as shown, in some embodiments, the utility services 9430 comprise branch.io for smart links and web previews 9431, SMS verification 9432 (e.g., Twillo service), and Server Logs Analysis 9433. In some embodiments, as shown, the data storage comprises a database 9441 (e.g., MongoDB on mLab), a file storage 9442 (e.g., S3 on Amazon), and a server API gateway 9443 (e.g., node.jos on Heroku). In some embodiments, as shown the messaging service comprises a Sendbird messaging service 9451 and an Agora.io Audio/video call 9452.

In some embodiments, as shown, the SMS verification 9431 and the server API gateway 9443 transmits data to and from the SMS verification 9432, the Server Log Analysis 9433, the database 9441, and the file storage 9442. Further as shown, in some embodiments, the Server API gateway 9443 sends and receives user and event information to and from the Sendbird Messaging Service 9451. Finally, in some embodiments, the GPS 9460 sends or receives the position data periodically, or when the user is traveling significant distances.

Computing System

Figure 95:
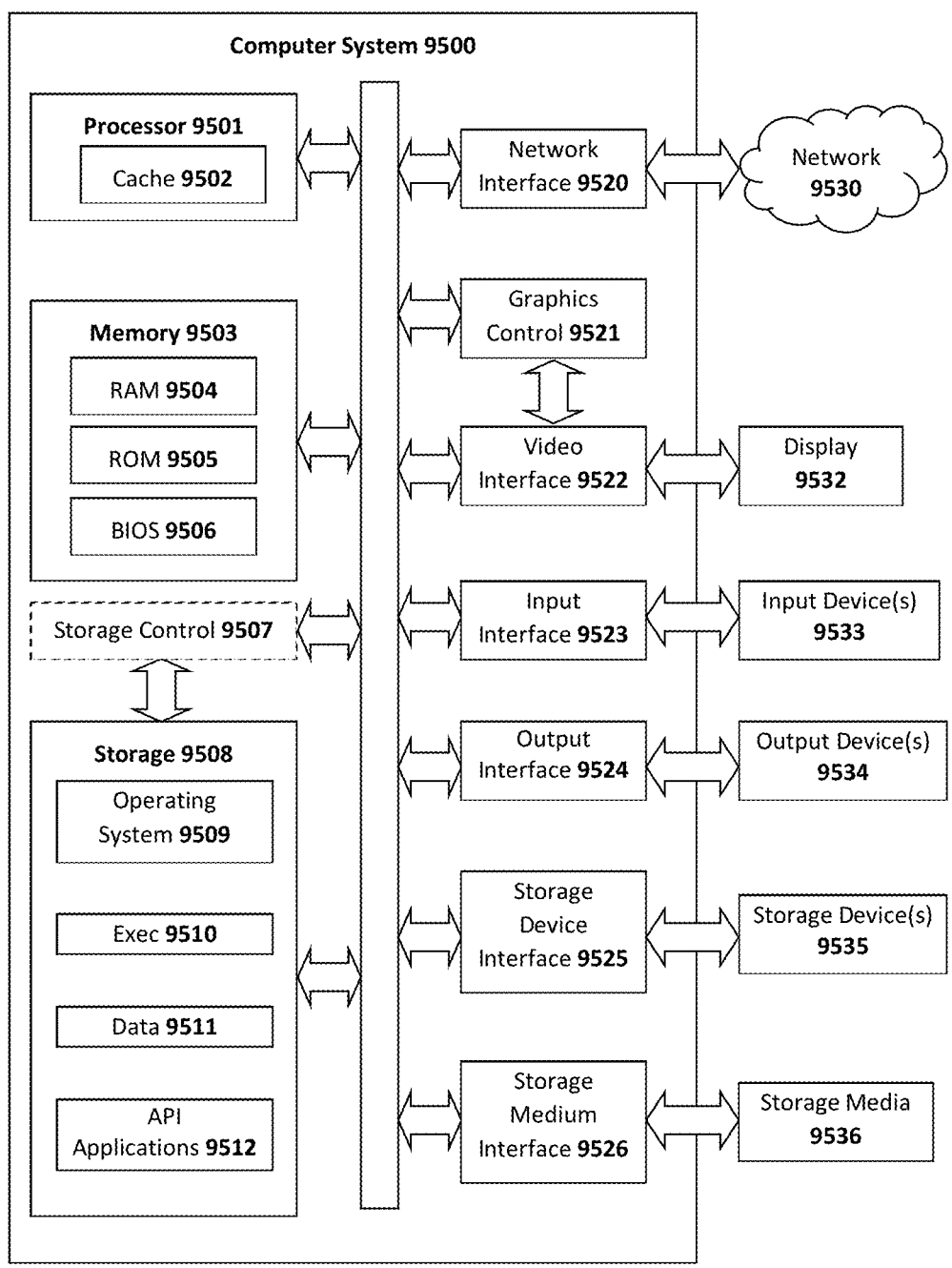
FIG. 95 shows a non-limiting example of a computing device; in this case, a device with one or more processors, memory, storage, and a network interface.

Referring to FIG. 95, a block diagram is shown depicting an exemplary machine that includes a computer system 9500 (e.g., a processing or computing system) within which a set of instructions can execute for causing a device to perform or execute any one or more of the aspects and/or methodologies for static code scheduling of the present disclosure. The components in FIG. 95 are examples only and do not limit the scope of use or functionality of any hardware, software, embedded logic component, or a combination of two or more such components implementing particular embodiments.

Computer system 9500 may include one or more processors 9501, a memory 9503, and a storage 9508 that communicate with each other, and with other components, via a bus 9540. The bus 9540 may also link a display 9532, one or more input devices 9533 (which may, for example, include a keypad, a keyboard, a mouse, a stylus, etc.), one or more output devices 9534, one or more storage devices 9535, and various tangible storage media 9536. All of these elements may interface directly or via one or more interfaces or adaptors to the bus 9540. For instance, the various tangible storage media 9536 can interface with the bus 9540 via storage medium interface 9526. Computer system 9500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 9500 includes one or more processor(s) 9501 (e.g., central processing units (CPUs), general purpose graphics processing units (GPGPUs), or quantum processing units (QPUs)) that carry out functions. Processor(s) 9501 optionally contains a cache memory unit 9502 for temporary local storage of instructions, data, or computer addresses. Processor(s) 9501 are configured to assist in execution of computer readable instructions. Computer system 9500 may provide functionality for the components depicted in FIG. 95 as a result of the processor(s) 9501 executing non-transitory, processor-executable instructions embodied in one or more tangible computer-readable storage media, such as memory 9503, storage 9508, storage devices 9535, and/or storage medium 9536. The computer-readable media may store software that implements particular embodiments, and processor(s) 9501 may execute the software. Memory 9503 may read the software from one or more other computer-readable media (such as mass storage device(s) 9535, 9536) or from one or more other sources through a suitable interface, such as network interface 9520. The software may cause processor(s) 9501 to carry out one or more processes or one or more steps of one or more processes described or illustrated herein. Carrying out such processes or steps may include defining data structures stored in memory 9503 and modifying the data structures as directed by the software.

The memory 9503 may include various components (e.g., machine readable media) including, but not limited to, a random access memory component (e.g., RAM 9504) (e.g., static RAM (SRAM), dynamic RAM (DRAM), ferroelectric random access memory (FRAM), phase-change random access memory (PRAM), etc.), a read-only memory component (e.g., ROM 9505), and any combinations thereof. ROM 9505 may act to communicate data and instructions unidirectionally to processor(s) 9501, and RAM 9504 may act to communicate data and instructions bidirectionally with processor(s) 9501. ROM 9505 and RAM 9504 may include any suitable tangible computer-readable media described below. In one example, a basic input/output system 9506 (BIOS), including basic routines that help to transfer information between elements within computer system 9500, such as during start-up, may be stored in the memory 9503.

Fixed storage 9508 is connected bidirectionally to processor(s) 9501, optionally through storage control unit 9507. Fixed storage 9508 provides additional data storage capacity and may also include any suitable tangible computer-readable media described herein. Storage 9508 may be used to store operating system 9509, executable(s) 9510, data 9511, applications 9512 (application programs), and the like. Storage 9508 can also include an optical disk drive, a solid-state memory device (e.g., flash-based systems), or a combination of any of the above. Information in storage 9508 may, in appropriate cases, be incorporated as virtual memory in memory 9503.

In one example, storage device(s) 9535 may be removably interfaced with computer system 9500 (e.g., via an external port connector (not shown)) via a storage device interface 9525. Particularly, storage device(s) 9535 and an associated machine-readable medium may provide non-volatile and/or volatile storage of machine-readable instructions, data structures, program modules, and/or other data for the computer system 9500. In one example, software may reside, completely or partially, within a machine-readable medium on storage device(s) 9535. In another example, software may reside, completely or partially, within processor(s) 9501.

Bus 9540 connects a wide variety of subsystems. Herein, reference to a bus may encompass one or more digital signal lines serving a common function, where appropriate. Bus 9540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 9500 may also include an input device 9533. In one example, a user of computer system 9500 may enter commands and/or other information into computer system 9500 via input device(s) 9533. Examples of an input device(s) 9533 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 9533 may be interfaced to bus 9540 via any of a variety of input interfaces 9523 (e.g., input interface 9523) including, but not limited to, serial, parallel, game port, USB, FIREWIRE, THUNDERBOLT, or any combination of the above.

In particular embodiments, when computer system 9500 is connected to network 9530, computer system 9500 may communicate with other devices, specifically mobile devices and enterprise systems, distributed computing systems, cloud storage systems, cloud computing systems, and the like, connected to network 9530. Communications to and from computer system 9500 may be sent through network interface 9520. For example, network interface 9520 may receive incoming communications (such as requests or responses from other devices) in the form of one or more packets (such as Internet Protocol (IP) packets) from network 9530, and computer system 9500 may store the incoming communications in memory 9503 for processing. Computer system 9500 may similarly store outgoing communications (such as requests or responses to other devices) in the form of one or more packets in memory 9503 and communicated to network 9530 from network interface 9520. Processor(s) 9501 may access these communication packets stored in memory 9503 for processing.

Examples of the network interface 9520 include, but are not limited to, a network interface card, a modem, and any combination thereof. Examples of a network 9530 or network segment 9530 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 9530, may employ a wired and/or a wireless mode of communication. In general, any network topology may be used.

Information and data can be displayed through a display 9532. Examples of a display 9532 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 9532 can interface to the processor(s) 9501, memory 9503, and fixed storage 9508, as well as other devices, such as input device(s) 9533, via the bus 9540. The display 9532 is linked to the bus 9540 via a video interface 9522, and transport of data between the display 9532 and the bus 9540 can be controlled via the graphics control 9521. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 9532, computer system 9500 may include one or more other peripheral output devices 9534 including, but not limited to, an audio speaker, a printer, a storage device, and any combinations thereof. Such peripheral output devices may be connected to the bus 9540 via an output interface 9524. Examples of an output interface 9524 include, but are not limited to, a serial port, a parallel connection, a USB port, a FIREWIRE port, a THUNDERBOLT port, and any combinations thereof.

In addition or as an alternative, computer system 9500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® P54®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 96:
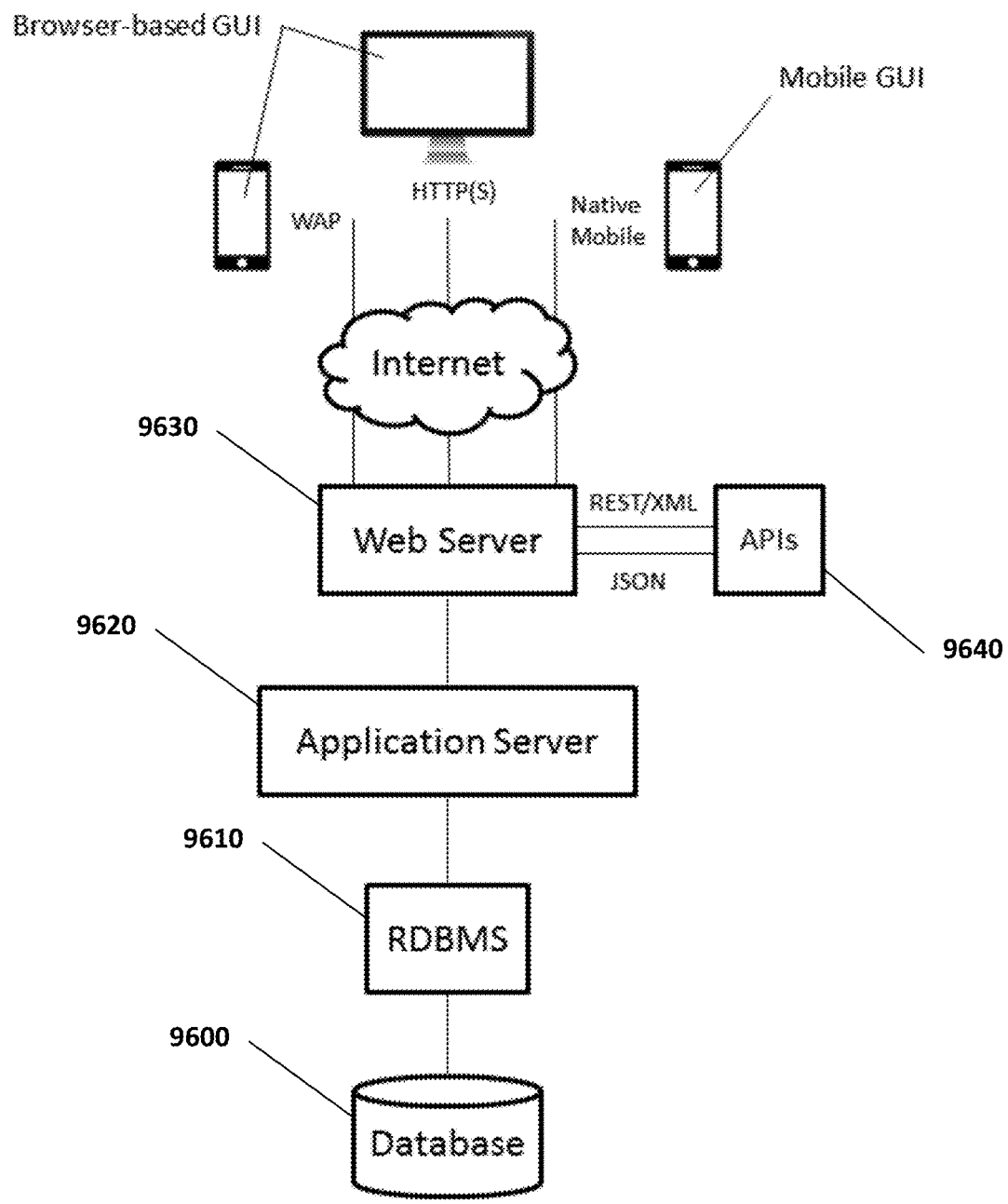
FIG. 96 shows a non-limiting example of a web/mobile application provision system; in this case, a system providing browser-based and/or native mobile user interfaces.

Referring to FIG. 96, in a particular embodiment, an application provision system comprises one or more databases 9600 accessed by a relational database management system (RDBMS) 9610. Suitable RDBMSs include Firebird, MySQL, PostgreSQL, SQLite, Oracle Database, Microsoft SQL Server, IBM DB2, IBM Informix, SAP Sybase, Teradata, and the like. In this embodiment, the application provision system further comprises one or more application severs 9620 (such as Java servers, .NET servers, PHP servers, and the like) and one or more web servers 9630 (such as Apache, IIS, GWS and the like). The web server(s) optionally expose one or more web services via app application programming interfaces (APIs) 9640. Via a network, such as the Internet, the system provides browser-based and/or mobile native user interfaces.

Figure 97:
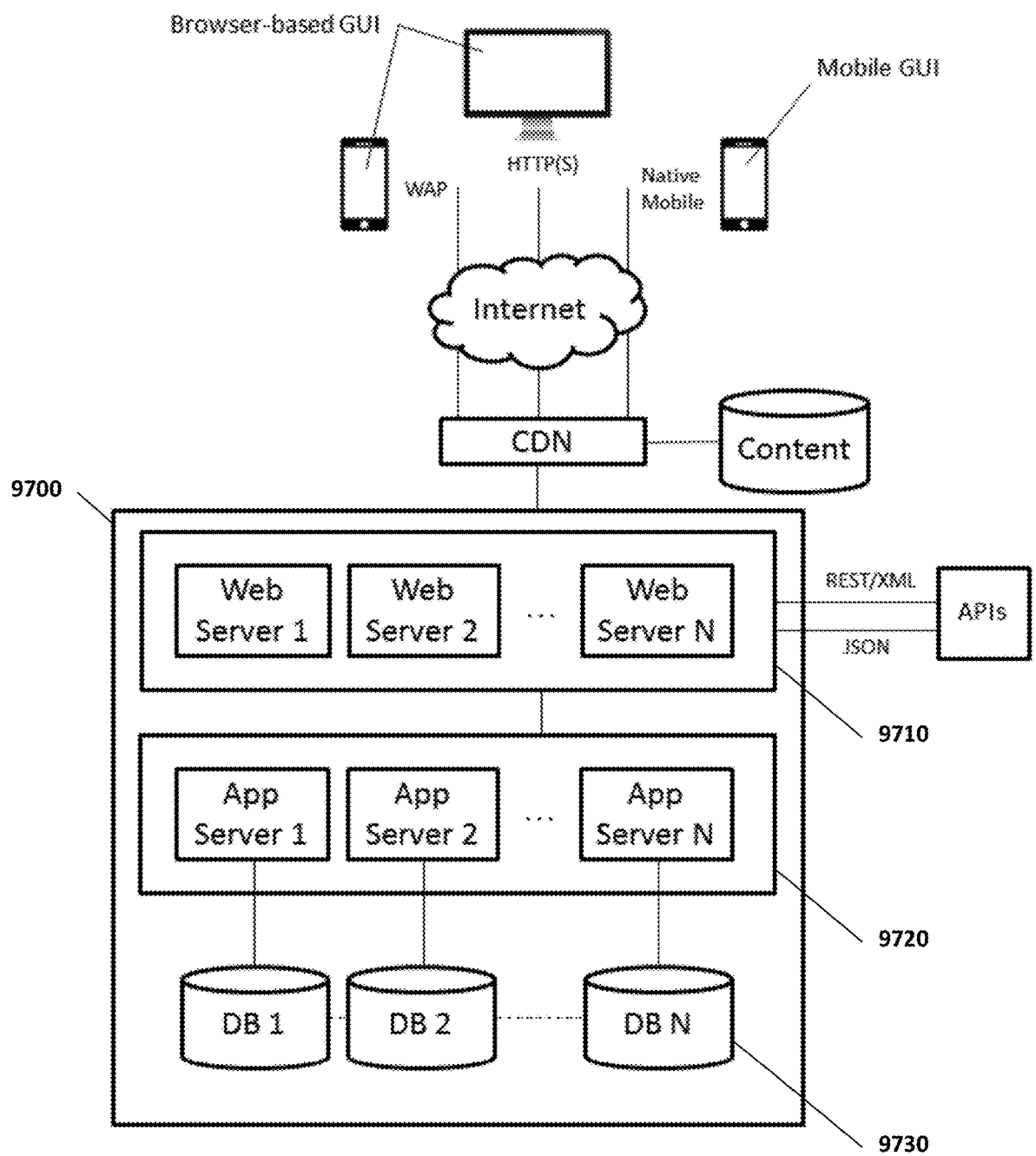
FIG. 97 shows a non-limiting example of a cloud-based web/mobile application provision system; in this case, a system comprising an elastically load balanced, auto-scaling web server and application server resources as well synchronously replicated databases.

Referring to FIG. 97, in a particular embodiment, an application provision system alternatively has a distributed, cloud-based architecture 9700 and comprises elastically load balanced, auto-scaling web server resources 9710 and application server resources 9720 as well synchronously replicated databases 9730.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and PhoneGap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of user, profile, settings, event, host, applicant, requester, algorithm, location, filter, and match information. In various embodiments, suitable databases include, by way of non-limiting examples, relational databases, non-relational databases, object oriented databases, object databases, entity-relationship model databases, associative databases, XML databases, and document oriented databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

Certain Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

EXAMPLES

The following illustrative examples are representative of embodiments of the platforms, software applications, systems, media, and methods described herein and are not meant to be limiting in any way.

Example 1

Joe wants to host a friendly game of poker and creates an event entitled "Let's Celebrate!" for New Year's Eve at his apartment. Joe selects to invite members of any gender, that are at least 21 years of age (as alcohol will be served), that are not older than his parents, and that live within 15 miles of his apartment. Joe selects to have the event name, and age restrictions public, but allows only accepted applications to view the event time and location. An event feed is created, with a generated image of confetti, allowing users to view and apply to attend the event and Joe is presented with a list of eligible attendees. Joe receives a notification on his mobile device that Jared has submitted an application to his event, and a notification that Stacy and Lisa both applied to Joe's event with the condition that both or none are accepted. Asynchronous messaging modes are active between users associated with an event. Joe receives a text message from Stacy asking what they can bring, to which Joe responds "chips." Lisa then sends a text message to Jared saying, "Long time no see." The applications by Jared, Stacy, and Lisa are marked as public, while their locations are marked as private. Joe has never met Jared and submits a request to Jared to view his private data. Jared approves the request, so Joe decides to accept the applications of Jared, Stacy, and Lisa. Upon acceptance of each application, synchronous messaging modes are activated between the host and each accepted attendee. Joe video calls Jared to introduce himself.

Example 2

Maya is new to town and is looking for events for her and her six month old daughter Miriam. Maya requests a hosted event for her and other young mothers on Tuesday mornings in a nearby park that has a restroom. Maya's request is stored publicly except for her location. Based on Maya's location a list of eligible hosts is generated. Tina submits an application to host Maya's event. Upon receiving a notification, Maya accepts Tina's application to host and both are connected via a communication platform to plan for their event.

Example 3

Tina, who is registered as a mother seeking events for her and her baby receives a notification that an event in her area is requesting a host. Tina submits an application to host the event, wherein the application is public, but Tina's age is private. Maya receives a notification regarding Tina's application and accepts Tina as a host. Tina adjusts the maximum age of event applicants, and adds the location of her favorite park to the event, with a recent picture of the location and invites her friend Tonia.

Example 4

Stacy receives a notification that an event entitled "Let's Celebrate!" has been created, and is to be hosted, by Joe. Having celebrated the last five New Year's Eves with her friend Lisa, Stacy applies to Joe's event for herself and Lisa and indicating that both her and her friend must be accepted or rejected as a group. Upon being accepted by Joe, Stacy and Lisa both receive notifications when Joe accepts an application to his event. After attending Joe's party, Stacy submits a review that the event was well hosted and fun, while Lisa submits a review that she found the party boring.

Example 5

Joe creates his user profile comprising his name (Joe), his username (PartyJoe), likes (poker and cooking), occupation (real estate agent), description (single extrovert), education (BS), gender (male), age (29), height (5'9") and email address (joe@joe.com). Joe enables all of his friends to view his entire profile, allows anyone attending the same event or that he has attended an event with to view his all but his age and height, and makes only his name and username public.

Joe also configures his profile such that messages can be received only from people who have attended, are attending, have hosted, or will host his events.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A platform for regulating communications and exchanging escrowed data between multiple users while preserving privacy comprising:
   a) at least one mobile device comprising at least one mobile processor configured to provide a mobile application comprising:
      i) a touchscreen interface configured for a first user to enter data;
      ii) a software module accessing a GPS feature of the mobile device to determine a location;
      iii) a software module transmitting the data and the location to a remote escrow exchange server via a computer network, wherein at least a portion of the data is marked as public data and at least a portion of the data and the location is marked as private data;
      iv) a software module providing a touchscreen interface configured to enable the first user to generate requests to view private data of other users and to accept or reject requests by other users to view their private data;
      v) a software module providing a touchscreen interface configured to enable the first user to conduct in-application asynchronous text chat messaging with other users without revealing the name, phone number, or email address of the first user;
      vi) a software module providing a touchscreen interface configured to enable the first user to conduct in-application synchronous audio and video communication with other users without revealing the name, phone number, or email address of the first user; and
   b) at least one server comprising a secure storage device comprising at least one server processor configured to provide an escrow exchange server application comprising:
      i) a software module storing the public data and the private data in escrow at the secure storage device;
      ii) a software module applying an algorithm to match the first user to at least one other user based on the location, the stored public data, and the stored private data; and
      iii) a software module conducting electronic communications with the at least one mobile device via the computer network to conduct a process comprising:
         1) pushing the first user's public data to the at least one other user matched;
         2) receiving a request from the at least one other user to access the first user's private data, wherein receiving the request forms a one-way privacy handshake;
         3) notifying the first user of the request to access their private data;
         4) receiving a signal from the first user accepting or rejecting the request to access their private data, wherein acceptance of the request forms a two-way privacy handshake; and
         5) pushing, via the computer network, if the first user accepts the request to access their private data, an electronic transmission of the first user's private data to the at least one other user;
   wherein formation of the one-way privacy handshake activates the in-application asynchronous text chat messaging between the first user and the at least one other user; and
   wherein formation of the two-way privacy handshake activates the in-application synchronous audio and video communication between the first user and the at least one other user.

2. The platform of claim 1, wherein the mobile application further comprises a software module stripping the entered data of embedded information identifying the user.

3. The platform of claim 1, wherein the in-application asynchronous text chat messaging comprises text messaging.

4. The platform of claim 1, wherein the in-application synchronous audio and video communication comprises one or more of: audio messaging, voice calling, video messaging, and video calling.

5. The platform of claim 1, wherein the request from the at least one other user to access the first user's private data is generated by the at least one other user interacting with a post made by the first user.

6. The platform of claim 1, wherein the acceptance by the first user of the request to access their private data by is generated by the first user responding to an asynchronous text chat message.

7. The platform of claim 1, wherein the software module providing a touchscreen interface configured to enable the first user to conduct in-application synchronous audio and video communication with other users is further configured to enable the first user to conduct in-application asynchronous exchange of photos and videos with the others users.

8. The platform of claim 7, wherein formation of the two-way privacy handshake activates the in-application asynchronous exchange of photos and videos.

9. A method for regulating communications and exchanging escrowed data between users while preserving privacy comprising:
   a) receiving, at a remote escrow exchange server, via a computer network, data entered by a first user via a touchscreen interface of a mobile device and a location determined by accessing a GPS feature of the mobile device;
   b) marking, by the remote escrow exchange server, at least a portion of the data as public data and marking at least a portion of the data and the location as private data;
   c) storing, by the remote escrow exchange server, the public data and the private data in escrow at a secure storage device;
   d) applying, by the remote escrow exchange server, an algorithm to match the first user to at least one other user based on the location, the stored public data, and the stored private data;
   e) transceiving, by the remote escrow exchange server, in-application asynchronous text chat messaging between the first user and other users conducted via the touchscreen interface of the mobile device without revealing the name, phone number, or email address of the first user;

f) transceiving, by the remote escrow exchange server, in-application synchronous audio and video communication between the first user and other users conducted via the touchscreen interface of the mobile device without revealing the name, phone number, or email address of the first user; and g) conducting, by the remote escrow exchange server, electronic communications via the computer network to conduct a process comprising:
  i) pushing the first user's public data to the at least one other user matched;
  ii) receiving a request from the at least one other user to access the first user's private data, wherein receiving the request forms a one-way privacy handshake;
  iii) notifying the first user of the request to access their private data;
  iv) receiving a signal from the first user accepting or rejecting the request to access their private data, wherein acceptance of the request forms a two-way privacy handshake; and
  v) pushing, if the first user accepts the request to access their private data, an electronic transmission of the first user's private data to the at least one other user;
  wherein formation of the one-way privacy handshake activates the in-application asynchronous text chat messaging between the first user and the at least one other user; and
  wherein formation of the two-way privacy handshake activates the in-application synchronous audio and video communication between the first user and the at least one other user.

10. The method of claim 9, further comprising stripping the data entered by the first user of embedded information identifying the first user.

11. The method of claim 9, wherein the in-application asynchronous text chat messaging comprises text messaging.

12. The method of claim 9, wherein the in-application synchronous audio and video communication comprises one or more of: audio messaging, voice calling, video messaging, and video calling.

13. The method of claim 9, wherein the request from the at least one other user to access the first user's private data is generated by the at least one other user interacting with a post made by the first user.

14. The method of claim 9, wherein the acceptance by the first user of the request to access their private data by is generated by the first user responding to an asynchronous text chat message.

15. The method of claim 9, wherein the transceiving in-application synchronous audio and video communication between the first user and other users conducted via the touchscreen interface of the mobile device further comprises transceiving in-application asynchronous exchange of photos and videos with the others users.

16. The method of claim 15, wherein formation of the two-way privacy handshake activates the in-application asynchronous exchange of photos and videos.

\* \* \* \* \*